US012789469B2

(12) United States Patent
Thompson et al.

(10) Patent No.: US 12,789,469 B2
(45) Date of Patent: Nov. 10, 2026

(54) SYSTEMS AND METHODS FOR ADDITIVE MANUFACTURING USING PIXEL SHIFTING

(71) Applicant: General Electric Company, Schenectady, NY (US)

(72) Inventors: Mary Kathryn Thompson, Fairfield Township, OH (US); Travis Gene Sands, Lebanon, OH (US); Kevin Robert Dickson, Dayton, OH (US); William Joseph Steele, Lawrenceburg, IN (US); Trent William Muhlenkamp, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 634 days.

(21) Appl. No.: 18/446,931

(22) Filed: Aug. 9, 2023

(65) Prior Publication Data

US 2024/0059023 A1 Feb. 22, 2024

Related U.S. Application Data

(60) Provisional application No. 63/398,920, filed on Aug. 18, 2022.

(51) Int. Cl.
*B29C 64/393* (2017.01)
*B29C 64/124* (2017.01)
(Continued)

(52) U.S. Cl.
CPC .......... *B29C 64/393* (2017.08); *B29C 64/124* (2017.08); *B33Y 30/00* (2014.12); *B33Y 50/02* (2014.12)

(58) Field of Classification Search
USPC .................................................. 700/98, 120
See application file for complete search history.

(56) References Cited

U.S. PATENT DOCUMENTS 1,990,749 A 2/1935 Phillips et al.
2,259,517 A 10/1941 Drenkard, Jr.
(Continued)

FOREIGN PATENT DOCUMENTS

CN 103522546 A 1/2014
CN 104175559 A 12/2014
(Continued)

OTHER PUBLICATIONS

U.S. Non-Final Office Action for U.S. Appl. No. 18/446,875 dated Dec. 1, 2025 (18 pages).
(Continued)

*Primary Examiner* — Mohammad Ali
*Assistant Examiner* — Joshua T Sanders
(74) *Attorney, Agent, or Firm* — Dinsmore & Shohl LLP

(57) ABSTRACT

An additive manufacturing apparatus includes a support plate defining a window and a resin support configured to support an uncured layer of resin. A stage is configured to hold one or more cured layers of the resin to form a component positioned opposite a support plate. A radiant energy device is positioned on an opposite side of the resin support from the stage and is operable to project radiant energy in a grid through the window. The grid and/or pixels thereof are intelligently shifted to efficiently print one or more layers of a component.

20 Claims, 36 Drawing Sheets

(51) Int. Cl.
*B33Y 30/00* (2015.01)
*B33Y 50/02* (2015.01)

(56) References Cited

U.S. PATENT DOCUMENTS 3,264,103 A 8/1966 Cohen et al.
3,395,014 A 7/1968 Cohen et al.
3,486,482 A 12/1969 Hunger
3,710,846 A 1/1973 Properzi
3,875,067 A 4/1975 DeSorgo et al.
3,991,149 A 11/1976 Hurwitt
4,041,476 A 8/1977 Swainson
4,292,827 A 10/1981 Waugh
4,575,330 A 3/1986 Hull
4,752,498 A 6/1988 Fudim
4,945,032 A 7/1990 Murphy et al.
5,015,312 A 5/1991 Kinzie
5,026,146 A 6/1991 Hug et al.
5,031,120 A 7/1991 Pomerantz et al.
5,058,988 A 10/1991 Spence et al.
5,059,021 A 10/1991 Spence et al.
5,088,047 A 2/1992 Bynum
5,094,935 A 3/1992 Vassiliou et al.
5,096,530 A 3/1992 Cohen
5,104,592 A 4/1992 Hull et al.
5,123,734 A 6/1992 Spence et al.
5,126,259 A 6/1992 Weiss et al.
5,126,529 A 6/1992 Weiss et al.
5,133,987 A 7/1992 Spence et al.
5,162,167 A 11/1992 Minh et al.
5,174,931 A 12/1992 Almquist et al.
5,175,077 A 12/1992 Grossa
5,182,055 A 1/1993 Allison et al.
5,183,598 A 2/1993 Helle et al.
5,192,559 A 3/1993 Hull et al.
5,203,944 A 4/1993 Prinz et al.
5,204,055 A 4/1993 Sachs et al.
5,207,371 A 5/1993 Prinz et al.
5,236,326 A 8/1993 Grossa
5,236,637 A 8/1993 Hull
5,236,812 A 8/1993 Vassiliou et al.
5,247,180 A * 9/1993 Mitcham ............ G02B 26/0841
347/241
5,248,456 A 9/1993 Evans, Jr. et al.
5,258,146 A 11/1993 Almquist et al.
5,314,711 A 5/1994 Baccini
5,340,656 A 8/1994 Sachs et al.
5,387,380 A 2/1995 Cima et al.
5,432,045 A 7/1995 Narukawa et al.
5,447,822 A 9/1995 Hull et al.
5,454,069 A 9/1995 Knapp et al.
5,460,758 A 10/1995 Langer et al.
5,496,682 A 3/1996 Quadir et al.
5,607,540 A 3/1997 Onishi
5,610,824 A 3/1997 Vinson et al.
5,626,919 A 5/1997 Chapman et al.
5,650,260 A 7/1997 Onishi
5,660,621 A 8/1997 Bredt
5,665,401 A 9/1997 Serbin et al.
5,688,464 A 11/1997 Jacobs et al.
5,693,144 A 12/1997 Jacobs et al.
5,697,043 A 12/1997 Baskaran et al.
5,717,599 A 2/1998 Menhennett et al.
5,718,279 A 2/1998 Saoth et al.
5,746,833 A 5/1998 Gerhardt
5,764,521 A 6/1998 Batchelder et al.
5,807,437 A 9/1998 Sachs et al.
5,824,184 A 10/1998 Kamijo et al.
5,851,465 A 12/1998 Bredt
5,866,058 A 2/1999 Batchelder et al.
5,895,547 A 4/1999 Kathrein et al.
5,900,207 A 5/1999 Danforth et al.
5,939,008 A 8/1999 Comb et al.
5,940,674 A 8/1999 Sachs et al.
5,945,058 A 8/1999 Manners et al.
5,968,561 A 10/1999 Batchelder et al.
5,980,813 A 11/1999 Narang et al.
5,985,204 A 11/1999 Otsuka et al.
6,051,179 A 4/2000 Hagenau
6,067,480 A 5/2000 Stuffle et al.
6,068,367 A 5/2000 Fabbri
6,110,411 A 8/2000 Clausen et al.
6,146,567 A 11/2000 Sachs et al.
6,193,923 B1 2/2001 Leyden et al.
6,200,646 B1 3/2001 Neckers et al.
6,206,672 B1 3/2001 Grenda
6,363,606 B1 4/2002 Johnson et al.
6,375,451 B1 4/2002 Robinson et al.
6,376,148 B1 4/2002 Liu et al.
6,391,245 B1 5/2002 Smith
6,399,010 B1 6/2002 Guertin et al.
6,401,002 B1 6/2002 Jang et al.
6,403,002 B1 6/2002 van der Geest
6,436,520 B1 8/2002 Yamamoto
6,450,393 B1 9/2002 Doumanidis et al.
6,463,349 B2 10/2002 White et al.
6,471,800 B2 10/2002 Jang et al.
6,500,378 B1 12/2002 Smith
6,512,869 B1 1/2003 Imayama et al.
6,543,506 B1 4/2003 Phillips
6,575,218 B1 6/2003 Burns et al.
6,596,224 B1 7/2003 Sachs et al.
6,641,897 B2 11/2003 Gervasi
6,649,113 B1 11/2003 Manners et al.
6,660,209 B2 12/2003 Leyden et al.
6,668,892 B2 12/2003 Vasilakes et al.
6,682,598 B1 1/2004 Steinmueller et al.
6,780,368 B2 8/2004 Liu et al.
6,786,711 B2 9/2004 Koch et al.
6,838,035 B1 1/2005 Ederer et al.
6,850,334 B1 2/2005 Gothait
6,852,272 B2 2/2005 Artz et al.
6,896,839 B2 5/2005 Kubo et al.
6,914,406 B1 7/2005 Wilkes et al.
6,930,144 B2 8/2005 Oriakhi
6,947,058 B1 9/2005 Elmquist
6,966,960 B2 11/2005 Boyd et al.
6,974,521 B2 12/2005 Schermer
6,986,654 B2 1/2006 Imiolek et al.
7,008,209 B2 3/2006 Iskra et al.
7,016,738 B1 3/2006 Karunasiri
7,022,207 B2 4/2006 Hirsch
7,045,738 B1 5/2006 Kovacevic et al.
7,052,263 B2 5/2006 John
7,070,250 B2 7/2006 Lester et al.
7,074,029 B2 7/2006 Stockwell et al.
7,084,875 B2 8/2006 Plante
7,087,109 B2 8/2006 Bredr et al.
7,158,849 B2 1/2007 Huang et al.
7,164,420 B2 1/2007 Ard
7,195,472 B2 3/2007 John
7,261,542 B2 8/2007 Hickerson et al.
7,270,528 B2 9/2007 Sherwood
7,300,613 B2 11/2007 Sano et al.
7,351,304 B2 4/2008 Liang et al.
7,402,219 B2 7/2008 Graf
7,438,846 B2 10/2008 John
7,455,804 B2 11/2008 Patel et al.
7,520,740 B2 4/2009 Wahlstrom et al.
7,550,518 B2 6/2009 Bredt et al.
7,555,726 B2 6/2009 Kurtenbach et al.
7,569,174 B2 8/2009 Ruatta et al.
7,572,403 B2 8/2009 Gu et al.
7,575,682 B2 8/2009 Olsta et al.
7,578,958 B2 8/2009 Patel et al.
7,614,866 B2 11/2009 Sperry et al.
7,614,886 B2 11/2009 Sperry et al.
7,636,610 B2 12/2009 Schillen et al.
7,698,947 B2 4/2010 Sarr
7,706,910 B2 4/2010 Hull et al.
7,742,060 B2 6/2010 Maillot
7,758,799 B2 7/2010 Hull et al.
7,767,132 B2 8/2010 Patel et al.
7,771,183 B2 8/2010 Hull et al.

(56) References Cited

U.S. PATENT DOCUMENTS 7,780,429 B2 8/2010 Kikuchi
7,783,371 B2 8/2010 John et al.
7,785,093 B2 8/2010 Holmboe et al.
7,790,093 B2 9/2010 Shkolnik et al.
7,795,349 B2 9/2010 Bredt et al.
7,815,826 B2 10/2010 Serdy et al.
7,845,930 B2 12/2010 Shkolnik et al.
7,867,302 B2 1/2011 Nevoret et al.
7,892,474 B2 2/2011 Shkolnik et al.
7,894,921 B2 2/2011 John et al.
7,931,460 B2 4/2011 Scott et al.
7,962,238 B2 6/2011 Shkolnik et al.
7,964,047 B2 6/2011 Ishida
7,995,073 B1 8/2011 Shemanarev et al.
8,003,040 B2 8/2011 El-Siblani
8,029,642 B2 10/2011 Hagman
8,048,261 B2 11/2011 McCowin
8,070,473 B2 12/2011 Kozlak
8,071,055 B2 12/2011 Newcombe
8,096,262 B2 1/2012 Ederer et al.
8,105,066 B2 1/2012 Sperry et al.
8,110,135 B2 2/2012 El-Siblani
8,126,580 B2 2/2012 El-Siblani et al.
8,157,908 B2 4/2012 Williams
8,185,229 B2 5/2012 Davidson
8,191,500 B2 6/2012 Dohring et al.
8,211,226 B2 7/2012 Bredt et al.
8,232,444 B2 7/2012 Bar Nathan et al.
8,259,103 B2 9/2012 Glueck et al.
8,269,767 B2 9/2012 Glueck et al.
8,282,866 B2 10/2012 Hiraide
8,326,024 B2 12/2012 Shkolnik
8,372,330 B2 2/2013 El-Siblani et al.
8,394,313 B2 3/2013 El-Siblani et al.
8,413,578 B2 4/2013 Doyle
8,424,580 B2 4/2013 Anderson et al.
8,444,903 B2 5/2013 Lyons et al.
8,454,879 B2 6/2013 Kuzusako et al.
8,475,946 B1 7/2013 Dion et al.
8,506,862 B2 8/2013 Giller et al.
8,506,870 B2 8/2013 Hochsmann et al.
8,513,562 B2 8/2013 Bichsel
8,522,159 B2 8/2013 Kurtenbach et al.
8,540,501 B2 9/2013 Yasukochi
8,568,646 B2 10/2013 Wang et al.
8,568,649 B1 10/2013 Balistreri et al.
8,593,083 B2 11/2013 Firhoj et al.
8,616,872 B2 12/2013 Matsui et al.
8,623,264 B2 1/2014 Rohner et al.
8,636,494 B2 1/2014 Gothait et al.
8,636,496 B2 1/2014 Das et al.
8,658,076 B2 2/2014 El-Siblani
8,663,568 B2 3/2014 Bar Nathan et al.
8,666,142 B2 3/2014 Shkolnik et al.
8,703,037 B2 * 4/2014 Hull ...................... B33Y 50/02
382/269
8,715,832 B2 5/2014 Ederer et al.
8,718,522 B2 5/2014 Chillscyzn et al.
8,737,862 B2 5/2014 Manico et al.
8,741,194 B1 6/2014 Ederer et al.
8,741,203 B2 6/2014 Liska et al.
8,744,184 B2 6/2014 Ameline et al.
8,761,918 B2 6/2014 Silverbrook
8,801,418 B2 8/2014 El-Siblani et al.
8,805,064 B2 8/2014 Ameline et al.
8,815,143 B2 8/2014 John et al.
8,844,133 B2 9/2014 Fuller
8,845,316 B2 9/2014 Schillen et al.
8,845,953 B1 9/2014 Balistreri et al.
8,862,260 B2 10/2014 Shkolnik et al.
8,872,024 B2 10/2014 Jamar et al.
8,873,024 B2 10/2014 Jamar et al.
8,876,513 B2 11/2014 Lim et al.
8,877,115 B2 11/2014 Elsey
8,888,480 B2 11/2014 Yoo et al.
8,905,739 B2 12/2014 Vermeer et al.
8,915,728 B2 12/2014 Mironets et al.
8,926,304 B1 1/2015 Chen
8,932,511 B2 1/2015 Napendensky
8,968,625 B2 3/2015 Tan
8,974,717 B2 3/2015 Maguire et al.
8,991,211 B1 3/2015 Arlotti et al.
8,992,816 B2 3/2015 Jonasson et al.
8,998,601 B2 4/2015 Busato
9,011,982 B2 4/2015 Muller et al.
9,031,680 B2 5/2015 Napadensky
9,063,376 B2 6/2015 Mizumura
9,064,922 B2 6/2015 Nakajima et al.
9,067,359 B2 6/2015 Rohner et al.
9,067,360 B2 6/2015 Wehning et al.
9,067,361 B2 6/2015 El-Siblani
9,073,260 B2 7/2015 El-Siblani et al.
9,079,357 B2 7/2015 Ebert et al.
9,101,321 B1 8/2015 Kiesser
9,149,986 B2 10/2015 Huang et al.
9,150,032 B2 10/2015 Roof et al.
9,153,052 B2 10/2015 Ameline et al.
9,159,155 B2 10/2015 Andersen
9,186,847 B2 11/2015 Fruth et al.
9,193,112 B2 11/2015 Ohkusa et al.
9,205,601 B2 12/2015 DeSimone et al.
9,211,678 B2 12/2015 DeSimone et al.
9,216,546 B2 12/2015 DeSimone et al.
9,221,100 B2 12/2015 Schwarze et al.
9,233,504 B2 1/2016 Douglas et al.
9,248,600 B2 2/2016 Goodman et al.
9,259,880 B2 2/2016 Chen
9,308,690 B2 4/2016 Boyer et al.
9,327,385 B2 5/2016 Webb et al.
9,346,217 B2 5/2016 Huang et al.
9,346,218 B2 5/2016 Chen et al.
9,360,757 B2 6/2016 DeSimone et al.
9,364,848 B2 6/2016 Silverbrook
9,403,322 B2 8/2016 Das et al.
9,403,324 B2 8/2016 Ederer et al.
9,415,443 B2 8/2016 Ljungblad et al.
9,415,544 B2 8/2016 Kerekes et al.
9,415,547 B2 8/2016 Chen et al.
9,429,104 B2 8/2016 Fuller
9,434,107 B2 9/2016 Zenere
9,446,557 B2 9/2016 Zenere et al.
9,453,142 B2 9/2016 Rolland et al.
9,456,884 B2 10/2016 Uckelmann et al.
9,457,374 B2 10/2016 Hibbs et al.
9,463,488 B2 10/2016 Ederer et al.
9,469,074 B2 10/2016 Ederer et al.
9,486,944 B2 11/2016 El-Siblani et al.
9,486,964 B2 11/2016 Joyce
9,487,443 B2 11/2016 Watanabe
9,498,920 B2 11/2016 DeSimone et al.
9,498,921 B2 11/2016 Teulet
9,511,546 B2 12/2016 Chen et al.
9,517,591 B2 12/2016 Yoo et al.
9,517,592 B2 12/2016 Yoo et al.
9,527,244 B2 12/2016 El-Siblani
9,527,272 B2 12/2016 Steele
9,529,371 B2 12/2016 Nakamura
9,533,450 B2 1/2017 El-Siblani et al.
9,539,762 B2 1/2017 Durand et al.
9,545,753 B2 1/2017 Costabeber
9,545,784 B2 1/2017 Nakamura
9,550,326 B2 1/2017 Costabeber
9,561,622 B2 2/2017 Das et al.
9,561,623 B2 2/2017 El-Siblani et al.
9,578,695 B2 2/2017 Jerby et al.
9,579,852 B2 2/2017 Okamoto
9,581,530 B2 2/2017 Guthrie et al.
9,592,635 B2 3/2017 Ebert et al.
9,604,411 B2 3/2017 Rogren
9,610,616 B2 4/2017 Chen et al.
9,616,620 B2 4/2017 Hoechsmann et al.
9,632,037 B2 4/2017 Chen et al.
9,632,420 B2 4/2017 Allanic
9,632,983 B2 4/2017 Ueda et al.

(56) References Cited

U.S. PATENT DOCUMENTS 9,636,873 B2 5/2017 Joyce
9,649,812 B2 5/2017 Hartmann et al.
9,649,815 B2 5/2017 Atwood et al.
9,656,344 B2 5/2017 Kironn et al.
9,670,371 B2 6/2017 Pervan et al.
9,676,143 B2 6/2017 Kashani-Shirazi
9,676,963 B2 6/2017 Rolland et al.
9,682,166 B2 6/2017 Watanabe
9,682,425 B2 6/2017 Xu et al.
9,688,027 B2 6/2017 Batchelder et al.
9,707,720 B2 7/2017 Chen et al.
9,720,363 B2 8/2017 Chillscyzn et al.
9,738,034 B2 8/2017 Gruber et al.
9,738,564 B2 8/2017 Capobianco et al.
9,751,292 B2 9/2017 Jamar et al.
9,764,513 B2 9/2017 Stampfl et al.
9,764,535 B2 9/2017 Xie et al.
9,821,546 B2 11/2017 Schaafsma et al.
9,862,146 B2 1/2018 Driessen et al.
9,862,150 B2 1/2018 Chen et al.
9,868,255 B2 1/2018 Comb et al.
9,885,987 B2 2/2018 Chillscysn et al.
9,895,843 B2 2/2018 Lobovsky et al.
9,901,983 B2 2/2018 Hovel et al.
9,908,293 B2 3/2018 Yoo et al.
9,919,474 B2 3/2018 Napadensky
9,919,515 B2 3/2018 Daniell et al.
9,950,368 B2 4/2018 Lampenscherf et al.
9,956,727 B2 5/2018 Steele
9,962,767 B2 5/2018 Buller et al.
9,981,411 B2 5/2018 Green et al.
10,000,023 B2 6/2018 El-Siblani et al.
10,011,076 B2 7/2018 El-Siblani et al.
10,061,302 B2 8/2018 Jacobs et al.
10,071,422 B2 9/2018 Buller et al.
10,124,532 B2 11/2018 El-Siblani et al.
10,150,254 B2 12/2018 Bauman et al.
10,155,345 B2 12/2018 Ermoshkin et al.
10,155,882 B2 12/2018 Rolland et al.
10,183,330 B2 1/2019 Buller et al.
10,183,444 B2 1/2019 Campbell
10,240,066 B2 3/2019 Rolland et al.
10,245,784 B2 4/2019 Teken et al.
10,245,822 B2 4/2019 El-Siblani
10,317,882 B2 6/2019 de Pena et al.
10,335,995 B2 7/2019 Condello et al.
10,336,055 B2 7/2019 Das et al.
10,336,057 B2 7/2019 Moore et al.
10,350,823 B2 7/2019 Rolland et al.
10,357,956 B2 7/2019 Usami et al.
10,406,748 B2 9/2019 Honda
10,612,112 B2 4/2020 Yang et al.
10,639,843 B2 5/2020 Yuan et al.
10,682,808 B2 6/2020 Fujita et al.
10,695,988 B2 6/2020 Hanyu et al.
10,717,212 B2 7/2020 Parkinson et al.
10,737,479 B2 8/2020 El-Siblani et al.
10,994,941 B1 5/2021 Dwivedi et al.
11,141,909 B2 10/2021 Kuijpers et al.
11,179,891 B2 11/2021 Dubelman et al.
11,524,457 B2 12/2022 Steege
2002/0164069 A1 11/2002 Nagano et al.
2003/0102682 A1 6/2003 Kurokawa
2003/0180171 A1 9/2003 Artz et al.
2003/0209836 A1 11/2003 Sherwood
2004/0042789 A1 3/2004 Puffer, Jr. et al.
2005/0012239 A1 1/2005 Nakashima
2005/0019016 A1 1/2005 Nakashika et al.
2005/0056677 A1 3/2005 Talken
2005/0248062 A1* 11/2005 Shkolnik ................ B33Y 50/02
264/401
2006/0230984 A1 10/2006 Bredt et al.
2006/0248062 A1 11/2006 Libes et al.
2007/0063366 A1 3/2007 Cunningham et al.
2007/0116937 A1 5/2007 Lazzerini
2008/0170112 A1 7/2008 Hull et al.
2008/0179787 A1 7/2008 Sperry et al.
2008/0224352 A1 9/2008 Narukawa et al.
2008/0241404 A1 10/2008 Allaman et al.
2009/0133800 A1 5/2009 Morohoshi et al.
2009/0140466 A1* 6/2009 Kuzusako .............. B33Y 50/00
425/169
2010/0003619 A1 1/2010 Das et al.
2010/0196694 A1 8/2010 Yamazaki et al.
2010/0290016 A1 11/2010 Kaehr et al.
2011/0089610 A1 4/2011 El-Siblani et al.
2011/0101570 A1 5/2011 John et al.
2011/0162989 A1 7/2011 Ducker et al.
2011/0196529 A1 8/2011 Shkolnik et al.
2011/0207057 A1 8/2011 Hull et al.
2012/0007287 A1 1/2012 Vermeer et al.
2012/0195994 A1 8/2012 El-Siblani et al.
2012/0292800 A1 11/2012 Higuchi et al.
2012/0313294 A1 12/2012 Vermeer et al.
2013/0008879 A1 1/2013 Bichsel
2013/0052332 A1 2/2013 Roof et al.
2013/0140741 A1 6/2013 El-Siblani et al.
2013/0241113 A1 9/2013 Geers et al.
2014/0099476 A1 4/2014 Subramanian et al.
2014/0103581 A1 4/2014 Das et al.
2014/0191442 A1 7/2014 Elsey
2014/0200865 A1 7/2014 Lehmann et al.
2014/0239554 A1 8/2014 El-Siblani et al.
2014/0246813 A1 9/2014 Bauman et al.
2014/0275317 A1 9/2014 Moussa
2014/0319735 A1 10/2014 El-Siblani et al.
2014/0322374 A1 10/2014 El-Siblani et al.
2014/0332507 A1 11/2014 Fockele
2014/0339741 A1 11/2014 Aghababaie et al.
2014/0348691 A1 11/2014 Ljungblad et al.
2014/0348692 A1 11/2014 Bessac et al.
2015/0004042 A1 1/2015 Nimal
2015/0004046 A1 1/2015 Graham et al.
2015/0056365 A1 2/2015 Miyoshi
2015/0086409 A1 3/2015 Hellestam
2015/0102531 A1 4/2015 El-Siblani et al.
2015/0104563 A1 4/2015 Lowe et al.
2015/0140152 A1 5/2015 Chen
2015/0140155 A1 5/2015 Ohno et al.
2015/0145174 A1 5/2015 Comb
2015/0158111 A1 6/2015 Schwarze et al.
2015/0165695 A1 6/2015 Chen et al.
2015/0210013 A1 7/2015 Teulet
2015/0224710 A1 8/2015 El-Siblani
2015/0231798 A1 8/2015 Goto
2015/0231828 A1 8/2015 El-Siblani et al.
2015/0231831 A1 8/2015 El-Siblani
2015/0246487 A1 9/2015 El-Siblani
2015/0251351 A1 9/2015 Feygin
2015/0266237 A1 9/2015 Comb et al.
2015/0268099 A1 9/2015 Craig et al.
2015/0298396 A1 10/2015 Chen et al.
2015/0301517 A1 10/2015 Chen et al.
2015/0306819 A1 10/2015 Ljungblad
2015/0306825 A1 10/2015 Chen et al.
2015/0321421 A1 11/2015 Ding
2015/0352668 A1 12/2015 Scott et al.
2015/0352791 A1 12/2015 Chen et al.
2015/0355553 A1 12/2015 Allanic
2015/0375452 A1 12/2015 Huang et al.
2016/0016361 A1 1/2016 Lobovsky et al.
2016/0031010 A1 2/2016 O'Neill et al.
2016/0046075 A1 2/2016 DeSimone et al.
2016/0046080 A1 2/2016 Thomas et al.
2016/0052205 A1 2/2016 FrantzDale
2016/0059484 A1 3/2016 DeSimone et al.
2016/0059485 A1 3/2016 Ding et al.
2016/0067921 A1 3/2016 Willis et al.
2016/0082662 A1 3/2016 Majer
2016/0082671 A1 3/2016 Joyce
2016/0096332 A1 4/2016 Chen et al.
2016/0107340 A1 4/2016 Joyce
2016/0107383 A1 4/2016 Dikovsky et al.
2016/0107387 A1 4/2016 Ooba et al.

(56) References Cited

U.S. PATENT DOCUMENTS

2016/0129631 A1 5/2016 Chen et al.
2016/0137839 A1 5/2016 Rolland et al.
2016/0167160 A1* 6/2016 Hellestam ............ B23K 26/342 219/76.12
2016/0176114 A1 6/2016 Tsai et al.
2016/0184931 A1 6/2016 Green
2016/0193785 A1 7/2016 Bell et al.
2016/0200052 A1 7/2016 Moore et al.
2016/0214327 A1 7/2016 Ucklemann et al.
2016/0221262 A1 8/2016 Das et al.
2016/0223117 A1 8/2016 Hitzelberger
2016/0243649 A1 8/2016 Zheng et al.
2016/0303798 A1 10/2016 Mironets et al.
2016/0332386 A1 11/2016 Kuijpers
2016/0361871 A1 12/2016 Jeng et al.
2016/0361872 A1 12/2016 El-Siblani
2016/0368221 A1 12/2016 Ueda et al.
2017/0008234 A1 1/2017 Cullen et al.
2017/0008236 A1 1/2017 Easter et al.
2017/0021562 A1 1/2017 El-Siblani et al.
2017/0028472 A1 2/2017 Shaw et al.
2017/0066185 A1 3/2017 Ermoshkin et al.
2017/0066196 A1 3/2017 Beard et al.
2017/0072635 A1 3/2017 El-Siblani et al.
2017/0080641 A1 3/2017 El-Siblani
2017/0087670 A1 3/2017 Kalentics et al.
2017/0100895 A1 4/2017 Chou et al.
2017/0100897 A1 4/2017 Chou et al.
2017/0100899 A1 4/2017 El-Siblani et al.
2017/0102679 A1 4/2017 Greene et al.
2017/0113409 A1 4/2017 Patrov
2017/0120332 A1 5/2017 DeMuth et al.
2017/0120333 A1 5/2017 DeMuth et al.
2017/0120334 A1 5/2017 DeMuth et al.
2017/0120335 A1 5/2017 DeMuth et al.
2017/0120336 A1 5/2017 DeMuth et al.
2017/0120387 A1 5/2017 DeMuth et al.
2017/0120518 A1 5/2017 DeMuth et al.
2017/0120529 A1 5/2017 DeMuth et al.
2017/0120530 A1 5/2017 DeMuth et al.
2017/0120537 A1 5/2017 DeMuth et al.
2017/0120538 A1 5/2017 DeMuth et al.
2017/0123222 A1 5/2017 DeMuth et al.
2017/0123237 A1 5/2017 DeMuth et al.
2017/0136688 A1 5/2017 Knecht et al.
2017/0136708 A1 5/2017 Das et al.
2017/0157841 A1 6/2017 Green
2017/0157862 A1 6/2017 Bauer
2017/0165916 A1 6/2017 El-Siblani
2017/0173865 A1 6/2017 Dikovsky et al.
2017/0182708 A1 6/2017 Lin et al.
2017/0190120 A1 7/2017 Bloome et al.
2017/0276651 A1 9/2017 Hall
2017/0284971 A1 10/2017 Hall
2017/0291804 A1 10/2017 Craft et al.
2017/0297108 A1 10/2017 Gibson et al.
2017/0297109 A1 10/2017 Gibson et al.
2017/0297261 A1 10/2017 Schultheiss et al.
2017/0305136 A1 10/2017 Elsey
2017/0326786 A1* 11/2017 Yuan ..................... B29C 64/268
2017/0326807 A1 11/2017 Greene et al.
2017/0368816 A1 12/2017 Batchelder et al.
2018/0001567 A1 1/2018 Juan et al.
2018/0015672 A1 1/2018 Shusteff et al.
2018/0043619 A1 2/2018 Kim et al.
2018/0056585 A1 3/2018 Du Toit
2018/0056604 A1* 3/2018 Sands ................... B29C 64/386
2018/0056605 A1 3/2018 Chen et al.
2018/0079137 A1 3/2018 Herzog et al.
2018/0085998 A1 3/2018 von Burg
2018/0117219 A1 5/2018 Yang et al.
2018/0117790 A1 5/2018 Yun
2018/0134029 A1 5/2018 Myerberg et al.
2018/0141270 A1* 5/2018 Steege .................. B29C 64/218
2018/0162045 A1 6/2018 Guimbretiere
2018/0169969 A1 6/2018 Deleon et al.
2018/0200948 A1 7/2018 Kuijpers et al.
2018/0201021 A1 7/2018 Beaver et al.
2018/0229332 A1 8/2018 Tsai et al.
2018/0229436 A1 8/2018 Gu et al.
2018/0272603 A1 9/2018 MacCormack et al.
2018/0272608 A1 9/2018 Yun
2018/0304369 A1 10/2018 Myerberg et al.
2018/0345600 A1 12/2018 Holford et al.
2018/0370214 A1 12/2018 Comb et al.
2019/0022937 A1 1/2019 Stelter et al.
2019/0039299 A1 2/2019 Busbee et al.
2019/0047211 A1 2/2019 Herring et al.
2019/0061230 A1 2/2019 Ermoshkin et al.
2019/0070777 A1 3/2019 Wu et al.
2019/0112499 A1 4/2019 Rolland et al.
2019/0126533 A1 5/2019 Thompson
2019/0126548 A1 5/2019 Barnhart et al.
2019/0146344 A1 5/2019 Shimoaoki et al.
2019/0217540 A1 7/2019 Tomioka
2019/0232369 A1 8/2019 Strobner et al.
2019/0232550 A1 8/2019 Mark et al.
2019/0240932 A1 8/2019 Graf
2019/0263054 A1 8/2019 Kotler et al.
2019/0270254 A1 9/2019 Mark et al.
2019/0283316 A1 9/2019 Rolland et al.
2019/0299524 A1 10/2019 Hill et al.
2019/0315064 A1 10/2019 Budge et al.
2019/0344381 A1 11/2019 Pomerantz et al.
2019/0389137 A1 12/2019 Frohnmaier et al.
2020/0001398 A1 1/2020 Mellor et al.
2020/0031051 A1 1/2020 Wynne et al.
2020/0039142 A1 2/2020 Childers
2020/0079008 A1 3/2020 Chowdry et al.
2020/0079017 A1 3/2020 MacNeish, III et al.
2020/0101564 A1 4/2020 Shibazaki
2020/0108553 A1 4/2020 Rogren
2020/0122394 A1 4/2020 Sheng et al.
2020/0164437 A1 5/2020 Goth et al.
2020/0171741 A1 6/2020 Han et al.
2020/0198224 A1 6/2020 Dubelman et al.
2020/0230938 A1 7/2020 Menchik et al.
2020/0238624 A1 7/2020 Dubelman et al.
2020/0247040 A1 8/2020 Green
2020/0262150 A1 8/2020 Dubelman et al.
2020/0290275 A1 9/2020 Dubelman et al.
2020/0298485 A1 9/2020 Tsai
2020/0307075 A1 10/2020 Mattes et al.
2020/0307100 A1 10/2020 Sabo
2020/0376775 A1 12/2020 Das et al.
2021/0023776 A1 1/2021 Van Esbroeck et al.
2021/0046695 A1 2/2021 Thompson et al.
2021/0129437 A1 5/2021 Li et al.
2021/0156779 A1 5/2021 Medalsy
2021/0187859 A1 6/2021 Gmeiner et al.
2021/0316367 A1 10/2021 Padilla et al.
2021/0402677 A1 12/2021 Khusnatdinov et al.
2022/0001525 A1 1/2022 Panetta et al.
2022/0040921 A1 2/2022 Dubelman et al.
2022/0063196 A1* 3/2022 Steege .................. B29C 64/165
2022/0088853 A1 3/2022 Nawada
2022/0088868 A1 3/2022 Duoss et al.
2022/0161488 A1 5/2022 Dubelman et al.
2022/0274335 A1 9/2022 Thompson et al.
2022/0339859 A1 10/2022 Steele et al.
2022/0402198 A1 12/2022 Thompson et al.
2022/0402212 A1 12/2022 Dubelman et al.
2022/0410481 A1 12/2022 Muhlenkamp et al.
2022/0410482 A1 12/2022 Dubelman et al.
2022/0410486 A1 12/2022 Liu et al.
2023/0012168 A1 1/2023 Dubelman et al.
2023/0050127 A1 2/2023 Duebelman et al.
2023/0064479 A1 3/2023 Barnhill et al.
2023/0067394 A1 3/2023 Barnhill et al.

(56) References Cited

U.S. PATENT DOCUMENTS

| | | | |
|---|---|---|---|
| 2023/0138135 | A1 | 5/2023 | Goldman |
| 2023/0302723 | A1 | 9/2023 | Korten et al. |

FOREIGN PATENT DOCUMENTS

| | | | |
|---|---|---|---|
| CN | 105711101 | A | 6/2016 |
| CN | 105773962 | A | 7/2016 |
| CN | 107322930 | A | 11/2017 |
| CN | 208946717 | U | 6/2019 |
| CN | 109968661 | A | 7/2019 |
| CN | 111497231 | A | 8/2020 |
| CN | 113927897 | A | 1/2022 |
| DE | 102007010624 | A1 | 9/2008 |
| EP | 3053729 | A1 | 8/2016 |
| EP | 3356121 | B1 | 10/2020 |
| JP | H06246839 | A | 9/1994 |
| JP | H07164534 | A | 6/1995 |
| JP | 2004/257929 | A | 9/2004 |
| JP | 2014090210 | A | 5/2014 |
| JP | 2016196098 | A | 11/2016 |
| KR | 20170108729 | A | 9/2017 |
| KR | 102109664 | B1 | 5/2020 |
| WO | WO9600422 | A1 | 1/1996 |
| WO | WO9806560 | | 2/1998 |
| WO | WO0100390 | A1 | 1/2001 |
| WO | WO2006/077665 | A1 | 7/2006 |
| WO | WO2006/109355 | A1 | 10/2006 |
| WO | 2016164629 | A1 | 10/2016 |
| WO | 2016179661 | A1 | 11/2016 |
| WO | WO2017/098968 | A1 | 6/2017 |
| WO | WO2019/159936 | A1 | 8/2019 |
| WO | 2022038441 | A1 | 2/2022 |

OTHER PUBLICATIONS

U.S. Final Office Action for U.S. Appl. No. 18/446,899 dated Dec. 16, 2025 (12 pages).

European Patent Office Action for Application No. 23 191 673.5 dated Sep. 12, 2025 (6 pages).

European Patent Office Action for Application No. 23 191 675.0 dated Sep. 15, 2025 (4 pages).

European Patent Office Action for Application No. 23 191 964.8 dated Sep. 15, 2025 (5 pages).

European Patent Intent to Grant for Application No. 23 192 014.1 dated Oct. 17, 2025 (8 pages).

U.S. Non-Final Office Action for U.S. Appl. No. 18/446,899 dated Aug. 5, 2025 (11 pages).

U.S. Non-Final Office Action for U.S. Appl. No. 18/446,850 dated Oct. 28, 2025 (27 pages).

Admatec, Admaflex 300 DLP 3D Printer, Specifications, Features, Design and Functions, Netherlands, 2 Pages. Retrieved Nov. 5, 2020 from Webpage: https://admateceurope.com/files/10fla369c2239943e6506f27ba920bd4dd9359078e744369695ab6ffbde75c6c?filename=Admaflex%20300%20brochure.pdf&sig=hQvDlzxkSmFOZwjM.

Carbon, Carbon SpeedCell: Additive Manufacturing Reinvented, Redwood City California, Mar. 16, 2017, 4 Pages. Retrieved from Webpage: https:/ www.carbon3d.com/news/carbon-speedcell-additive-manufacturing-reinvented/.

Carbon, The 3D Printer for Products that Outperform, 8 Pages. Retrieved from Webpage: https://www.carbon3d.com.

DDM Systems, Disruptive Technologies for Additive Manufacturing, 2014. Retrieved on Jul. 7, 2020 from Web Link: http://www.ddmsys.com/.

Designing Buildings Wiki, Types of Brick Bonding, 6 Pages. Retrieved Mar. 25, 2021 from Webpage: https://www.designingbuildings.co.uk/wiki/Types_of_brick bonding.

Doctor Blade with Micrometer Screw Gauge, The Tape Casting Warehouse, Inc., Morrisville PA, 6 Pages. Retrieved Mar. 23, 2021 from Webpage: https://www.drblade.com/.

Envisiontec, Advanced DLP for Superior 3D Printing, Mar. 9, 2017, 8 Pages. https://envisiontec.com/wp-content/uploads/2016/12/Why-EnvisionTEC-DLP-3D-Printing-is-Better-rebranded.pdf.

Feng et al., Exposure Reciprocity Law in Photopolymerization of Multi-Functional Acrylates and Methacrylates, Macromolecular Chemistry and Physics, vol. 208, 2007, pp. 295-306.

Formlabs, An Introduction to Post-Curing SLA 3D Prints, 8 Pages. Retrieved from Webpage: https://formlabs.com/blog/introduction-post-curing-sla-3d-prints.

Formlabs, Form Wash & Form Cure, 8 Pages. Retrieved from Webpage: https://formlabs.com/tools/wash-cure/.

Hafkamp et al., A Feasibility Study on Process Monitoring and Control in Vat Photopolymerization of Ceramics, Mechatronics, vol. 56, The Netherlands, Dec. 2018, pp. 220-241. Retrieved from https://doi.org/10.1016/j.mechatronics.2018.02.006.

Kudo3d, Post-Process Your SLA Prints in 4 Easy Steps, 8 Pages. Retrieved from Webpage: https://www.kudo3d.com/post-process-your-sla-prints-in-4-easy-steps/.

Leap, Low-Frequency Sonic Mixing Technology, Energy Efficiency & Renewable Energy, Energy.Gov, 5 Pages. Retrieved Mar. 17, 2021 from Webpage: https://www.energy.gov/eere/amo/low-frequency-sonic-mixing-technology.

Lee et al., Development of a 3D Printer Using Scanning Projection Stereolithography, Scientific Reports, vol. 5, Article No. 9875, 2015, 5 pages. https://www.nature.com/articles/srep09875#s1.

Lee et al., Large-Area Compatible Laser Sintering Schemes with a Spatially Extended Focused Beam, Journal, Micromachines, vol. 8, No. 153, Seoul University, Seoul Korea, May 11, 2017, 8 Pages. http://dx.doi.org/10.3390/mi8050153.

Limaye, Multi-Objective Process Planning Method for Mask Projection Stereolithography, Dissertation Georgia Institute of Technology, Dec. 2007, 324 Pages.

Lithoz, CeraCleaning Station Ultra Technical Data, 2 Pages.

Matthews et al., Diode-Based Additive Manufacturing of Metals Using an Optically-Addressable Light Valve, Optic Express Research Article, vol. 25, No. 10, Lawrence Livermore National Laboratory, Livermore CA, May 10, 2017.

Micron3d, Cleaning of Printed Models, YouTube, Dec. 5, 2016, 1 Page. Retrieved from Webpage: https://www.youtube.com/watch=v=soAIrSsIBY.

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa Florida.

Omegasonics, Ultrasonic Cleaning of 3D Printer Parts, YouTube, Feb. 26, 2014, 1 Page. Retrieved from Webpage: https://www.youtube.com/watch?v=Gxi47OS5ohk.

Park et al., Development of Multi-Material DLP 3D Printer, Journal of the Korean Society of Manufacturing Technology Engineers, vol. 26, Issue 1, Seoul Korea, Feb. 15, 2017, pp. 100-107. https://doi.org/10.7735/ksmte.2017.26.1.100.

Prodways Tech, Prodways Movinglight Technology Retrieved on Jul. 2, 2020 from Web Link: https:/www.prodways.com/en/the-prodways-movinglight-technology/.

Ramco Equipment Corporation, Ramco RamTough—Fully Automated Wash/Rinse/Dry System, YouTube, Jul. 9, 2013, 1 Page. Retrieved from Webpage: https://www.youtube.com/watch?v=i8S5Oc3FVFU.

Ricoh Imaging Company Ltd., The Advanced Pixel Shift Resolution System II for Super-High-Resolution Images, Pentax K-1 Mark II, Pixel Shift Resolution System, 4 Pages. Retrieved on Mar. 30, 2021 from Webpage: http://www.ricoh-imaging.co.jp/english/products/k-1-2/feature/02.html.

Sonics & Materials, Inc., Ultrasonic Food Cutting Equipment, Sonics & Materials, Inc., Retrieved on Jun. 26, 2020, 4 Pages. https://www.sonics.com/food-cutting.

Stemmer Imaging, Ultra-High Resolution for Industrial Imaging, Germany, 9 Pages. Retrieved on Mar. 30, 2021 from Webpage: https://www.stemmer-imaging.com/en/knowledge-base/base/pixel-shift-technology/.

(56) References Cited

OTHER PUBLICATIONS

Stevenson, Admatec's Ceramic 3D Printers, Ceramic, Metal, Fabbaloo 3D Printing News, Jan. 21, 2019, 8 Pages. Retrieved Nov. 24, 2020 from Weblink: https://www.fabbaloo.com/blog/2019/1/21/admatecs-ceramic-3d-printers.
Techmetals, Electroless Nickel (TM 117C), Engineered Metal Finishing & Performance Coatings, 1 Page. Retrieved from Webpage: https://techmetals.com/pdfs/TM_117C.pdf https://techmetals.com/tm117c-2/.
Telsonic Ultrasonics, Cutting Awning Fabrics and Sealing the Edge, The Powerhouse of Ultrasonics, 2017, 1 Page. https://www.telsonic.com/fileadmin/applications/AS_206_Cut_Seal_Markisengewebe_EN.pdf.
Telsonic Ultrasonics, Integrated Power Actuator—IPA 3505, Telsonic Ultrasonics, Retrieved Jun. 26, 2020, 2 Pages. https://www.telsonic.com/en/products/integrated-power-actuator-ipa-3505/.
Tok et al., Tape Casting of High Dielectric Ceramic Substrates for Microelectronics Packaging, Journal of Materials Engineering and Performance, vol. 8, 1999, pp. 469-472. (Abstract Only) https://link.spinger.com/article/10.1361/105994999770346783.
Wikipedia, Pixel Shifting, 2 Pages. Retrieved Mar. 30, 2021 from Webpage: https://en.wikipedia.org/wiki/Pixel_shifting.
Wikipedia, Standing Wave, 11 Pages. Retrieved Mar. 17, 2021 from Webpage: https://en.wikipedia.org/wiki/Standing_wave.

* cited by examiner

Layer Build Plan 160

| Flash # | Grid Position | Pixels to Flash | Flash Intensity |
|---|---|---|---|
| 1 | X1, Y1 | $P_{11}$, $P_{12}$, $P_{21}$, $P_{22}$ | $I_{11}$, $I_{12}$, $I_{21}$, $I_{22}$ |
| 2 | X2, Y2 | $P_{13}$ | $I_{13}$ |

SYSTEMS AND METHODS FOR ADDITIVE MANUFACTURING USING PIXEL SHIFTING

CROSS-REFERENCE TO RELATED APPLICATION

This application claims the benefit of priority to U.S. Provisional Patent Application No. 63/398,920, entitled "SYSTEMS AND METHODS FOR ADDITIVE MANUFACTURING USING PIXEL SHIFTING," filed on Aug. 18, 2022, and the disclosure of which is incorporated by reference herein in its entirety.

FIELD

The present subject matter relates generally to an additive manufacturing apparatus and methods of operating the same.

BACKGROUND

Additive manufacturing is a process in which material is built up layer-by-layer to form a component. Stereolithography (SLA) is a type of additive manufacturing process that employs a tank of radiant-energy curable photopolymer "resin" and a curing energy source such as a laser. Similarly, Digital Light Processing (DLP) three-dimensional (3D) printing employs a two-dimensional image projector to build components one layer at a time. For each layer, the energy source draws or flashes a radiation image of the cross section of the component onto the surface of the resin. Exposure to the radiation cures and solidifies the pattern in the resin and joins it to a previously-cured layer.

Additive manufacturing processes may be used to form various components. There has been some challenges efficiently printing components, printing large components, and printing components with fidelity-critical features. Accordingly, additive manufacturing processes and systems that address such challenges would be a welcome addition to the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1A:
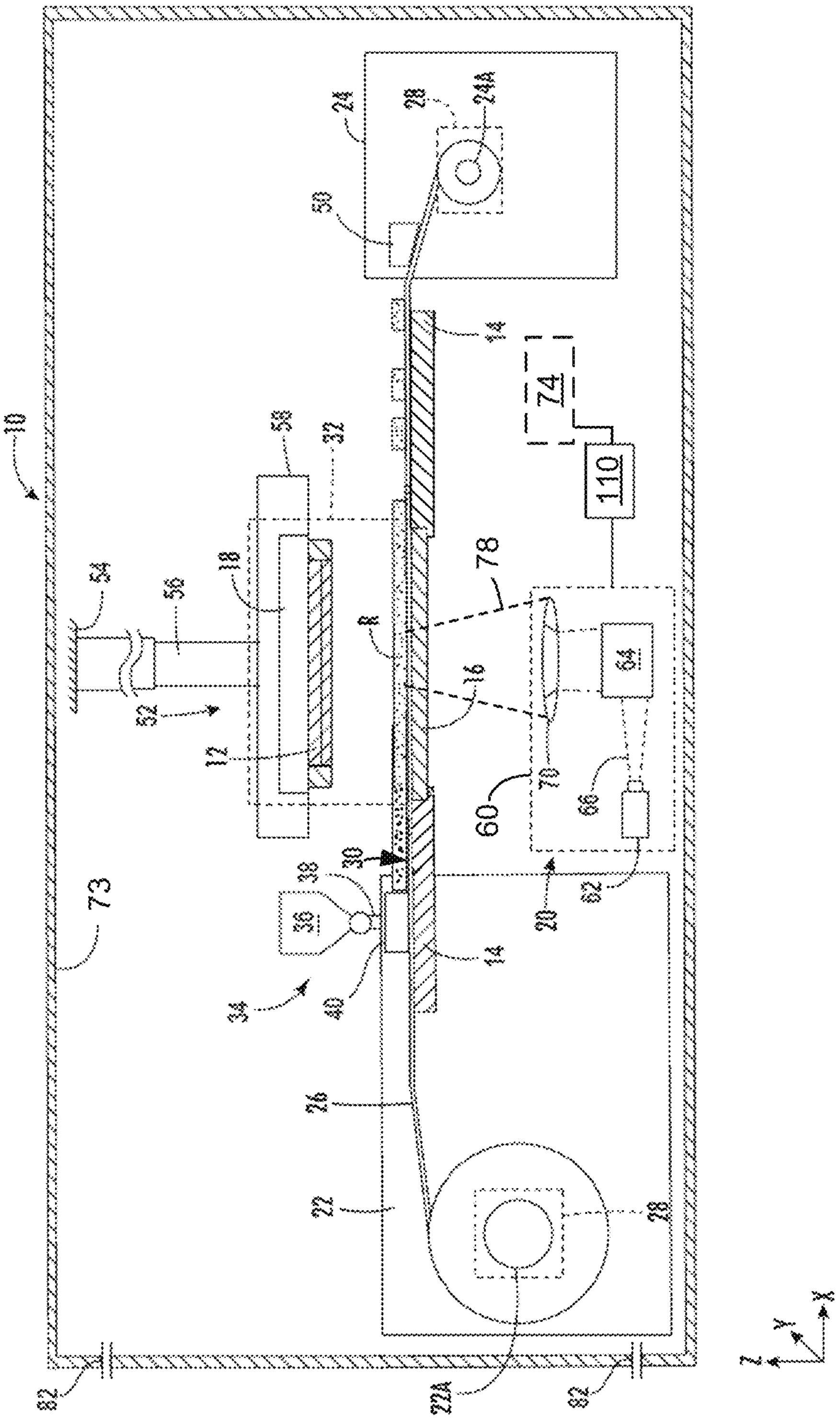
FIG. 1A is a schematic front view of an additive manufacturing apparatus in accordance with various aspects of the present disclosure.

Repeat use of reference characters in the present specification and drawings is intended to represent the same or analogous features or elements of the present disclosure.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a resin support movement along the manufacturing apparatus. For example, "upstream" refers to the direction from which the resin support moves, and "downstream" refers to the direction to which the resin support moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally directed to an additive manufacturing apparatus that implements various manufacturing processes such that successive layers of material(s) are provided on each other to "build-up," layer-by-layer, a three-dimensional component. The successive layers generally cure together to form a monolithic component which may have a variety of integral sub-components.

In one example aspect, an additive manufacturing apparatus includes a support plate defining a window and a resin support configured to support an uncured layer of resin. A stage is configured to hold one or more cured layers of the resin to form a component positioned opposite a support plate. A radiant energy device is positioned on an opposite side of the resin support from the stage and is operable to project radiant energy in a grid through the window. The grid and/or pixels thereof are intelligently shifted and flashed to efficiently print one or more layers of a component. By moving the grid and/or pixels and flashing them intelligently as disclosed herein, pixelization can be minimized. For instance, round features of a component can be made rounder and sharp edges can be made sharper. Moreover, by intelligently shifting and flashing the grid and/or pixels, larger components may be produced without loss of resolution. This allows for more diverse part creation and/or reduces the overall packaging of the apparatus.

Figure 1B:
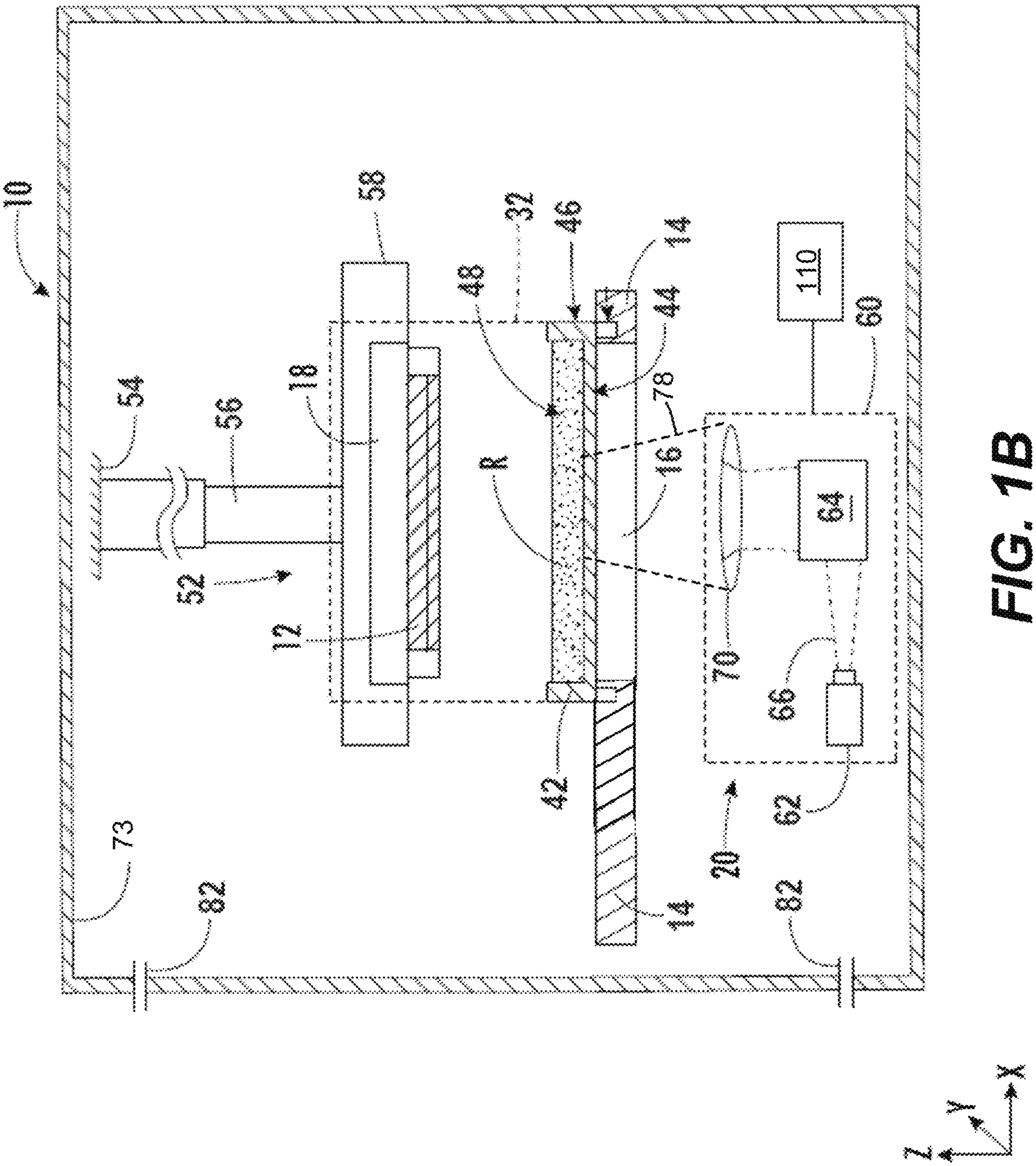
FIG. 1B is a schematic front view of an additive manufacturing apparatus in accordance with various aspects of the present disclosure.

Referring to the drawings wherein identical reference numerals denote the similar elements throughout, FIGS. 1A and 1B schematically illustrate an example apparatus 10 for forming a component 12. The apparatus 10 can include one or more of a support plate 14, a window 16, a stage 18 that is movable relative to the window 16, and a radiant energy device 20, which, in combination, may be used to form any number (e.g., one or more) of additively manufactured components 12. For reference, the apparatus 10 defines a Z-axis direction (labeled as Z in FIGS. 1A and 1B), an X-axis direction (labeled as X in FIGS. 1A and 1B), and a Y-axis direction (labeled as Y in FIGS. 1A and 1B), each of which is mutually perpendicular such that an orthogonal coordinate system is defined. The Z-axis direction can be a vertical direction, for example.

As depicted in FIG. 1A, the apparatus 10 includes a feed module 22, which may include a first mandrel 22A, and a take-up module 24, which may include a take-up mandrel 24A, that are spaced-apart with a resin support 26 extending therebetween. A portion of the resin support 26 can be supported from underneath by the support plate 14. Suitable mechanical supports (frames, brackets, etc.) and/or alignment devices may be provided for the mandrels 22A, 24A and the support plate 14. The first mandrel 22A and/or the take-up mandrel 24A can be configured to control the speed and direction of the resin support 26 such that the desired tension and speed is maintained in the resin support 26 through a drive system 28. By way of example and not limitation, the drive system 28 can be configured as individual motors associated with the first mandrel 22A and/or the take-up mandrel 24A. Moreover, various components, such as motors, actuators, feedback sensors, and/or controls can be provided for driving the mandrels 22A, 24A in such a manner to maintain the resin support 26 tensioned between the aligned mandrels 22A, 24A and to wind the resin support 26 from the first mandrel 22A to the take-up mandrel 24A.

In various embodiments, the window 16 is transparent and can be operably supported by the support plate 14. Further, the window 16 and the support plate 14 can be integrally formed such that one or more windows 16 are integrated within the support plate 14. Likewise, the resin support 26 is also transparent or includes transparent portions. As used herein, the terms "transparent" and "radiotransparent" refer to a material that allows at least a portion of radiant energy of a selected wavelength to pass through. For example, the radiant energy that passes through the window 16 and the resin support 26 can be in the ultraviolet spectrum, the infrared spectrum, the visible spectrum, or any other practicable radiant energy. Non-limiting examples of transparent materials include polymers, glass, and crystalline minerals, such as sapphire or quartz.

The resin support 26 extends between the feed module 22 and the take-up module 24 and defines a resin surface 30, which is shown as being planar, but could alternatively be arcuate (depending on the shape of the support plate 14). In some instances, the resin surface 30 may be defined by the resin support 26 and may be positioned to face the stage 18 with the window 16 on an opposing side of the resin support 26 from the stage 18. For purposes of convenient description, the resin surface 30 may be considered to be oriented parallel to an X-Y plane of the apparatus 10. As used herein, the X-axis refers to the machine direction along the length of the resin support 26. As used herein, the Y-axis refers to the transverse direction across the width of the resin support 26 and generally perpendicular to the machine direction. As used herein, the Z-axis refers to the stage direction that can be defined as the direction of movement of the stage 18 relative to the window 16.

The resin surface 30 may be configured to be "non-stick", that is, resistant to adhesion of a cured resin R. The non-stick properties may be embodied by a combination of variables such as the chemistry of the resin support 26, its surface finish, and/or applied coatings. For instance, a permanent or semi-permanent non-stick coating may be applied. One non-limiting example of a suitable coating is polytetrafluoroethylene ("PTFE"). In some examples, all or a portion of the resin surface 30 may incorporate a controlled roughness or surface texture (e.g. protrusions, dimples, grooves, ridges, etc.) with nonstick properties. Additionally or alternatively, the resin support 26 may be made in whole or in part from an oxygen-permeable material.

For reference purposes, an area or volume immediately surrounding the location of the resin support 26 and the window 16 or transparent portion defined by the support plate 14 may be defined as a build zone 32.

A deposition assembly 34 may be positioned along the resin support 26. In the illustrated embodiment, the material deposition assembly 34 includes a vessel 36 and a reservoir 40. A conduit 38 extends from the vessel 36 to direct resin from the vessel 36 to the reservoir 40. The conduit 38 may be positioned along a bottom portion of the vessel 36 such that the resin R may be gravity fed from the vessel 36 to the conduit 38, which may generally prevent the introduction of air to the resin R as the resin R is transferred into and/or through the conduit 38. In some instances, a filter may be positioned upstream, downstream, and/or within the conduit 38 with respect to the flow of resin from the vessel 36 to the reservoir 40. In such instances, the resin may be gravity fed through the filter prior to entering the reservoir 40 to catch various agglomerates, partially cured resin pieces, and/or other foreign objects that may affect the resin once it is thinned out on the resin support 26 or may affect the quality of the component 12.

The reservoir 40 may include any assembly to control the thickness of the resin R applied to the resin support 26, as the resin support 26 passes under and/or through the reservoir 40. The reservoir 40 may be configured to maintain a first amount volume of the resin R and define a thickness of the resin R on the resin support 26 as the resin support 26 is translated in the X-axis direction. The vessel 36 may be positioned above the reservoir 40 in the Z-axis direction, or in any other position, and configured to maintain a second amount volume of the resin R. In various embodiments, when the first amount volume of the resin R deviates from a predefined range, additional resin R is supplied from the vessel 36 to the reservoir 40.

In the illustrated example of FIG. 1B, the resin support 26 may be in the form of a vat 42 that is configured to isolate debris that could contaminate the build from usable resin R. The vat 42 may include a floor 44 and a perimeter wall 46. The perimeter wall 46 extends from the floor 44. Inner surfaces of the floor 44 and the perimeter wall 46 define a receptacle 48 for receiving the resin R. A drive system may be provided for moving the vat 42 relative to the stage 18 parallel to the X-direction between the build zone 32 and a position at least partially external to the build zone 32. However, it will be appreciated that, in other embodiments, the resin support 26 may be stationary.

Referring still to FIGS. 1A and 1B, the resin R includes any radiant-energy curable material, which is capable of adhering or binding together the filler (if used) in the cured state. As used herein, the term "radiant-energy curable" refers to any material which solidifies or partially solidifies in response to the application of radiant energy of a particular frequency and energy level. For example, the resin R may include a photopolymer resin containing photo-initiator compounds functioning to trigger a polymerization reaction, causing the resin R to change from a liquid (or powdered) state to a solid state. Alternatively, the resin R may include a material that contains a solvent that may be evaporated out by the application of radiant energy. The uncured resin R may be provided in solid (e.g. granular) or liquid form, including a paste or slurry. Furthermore, the resin R can have a relatively high viscosity resin that will not "slump" or run off during the build process. The composition of the resin R may be selected as desired to suit a particular application. Mixtures of different compositions may be used. The resin R may be selected to have the ability to out-gas or burn off during further processing, such as a sintering process.

Additionally or alternatively, the resin R may be selected to be a viscosity reducible composition. These compositions reduce in viscosity when a shear stress is applied or when they are heated. For example, the resin R may be selected to be shear-thinning such that the resin R exhibits reduced viscosity as an amount of stress applied to the resin R increases. Additionally or alternatively, the resin R may be selected to reduce in viscosity as the resin R is heated.

The resin R may incorporate a filler. The filler may be pre-mixed with resin R, then loaded into the deposition assembly 34. Alternatively, the filler may be mixed with the resin R on the apparatus 10. The filler includes particles, which are conventionally defined as "a very small bit of matter." The filler may include any material that is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used. In some examples, the filler composition may be selected for its electrical or electromagnetic properties, e.g. it may specifically be an electrical insulator, a dielectric material, an electrical conductor, and/or magnetic.

The filler may be "fusible," meaning it is capable of consolidation into a mass upon application of sufficient energy. For example, fusibility is a characteristic of many available powders including but not limited to polymeric, ceramic, glass, and metallic. The proportion of filler to resin R may be selected to suit a particular application. Generally, any amount of filler may be used so long as the combined material is capable of flowing and being leveled, and there is sufficient resin R to hold together the particles of the filler in the cured state.

In some embodiments, a reclamation system 50 may be configured to remove at least a portion of the resin R that remains on the resin support 26 after the resin support 26 is removed from a build zone 32. For example, the reclamation system 50 may include a collection structure, such as a wiper assembly, a blade assembly, and/or any other removal assembly.

With further reference to FIGS. 1A and 1B, the stage 18 is capable of being oriented parallel to the resin surface 30. Various devices may be provided for moving the stage 18 relative to the window 16 parallel to the Z-axis direction. For example, as illustrated in FIGS. 1A and 1B, the movement may be provided through an actuator assembly 52 that may be coupled with a static support 54. In some embodiments, the actuator assembly 52 may include a vertical actuator 56 between the stage 18 and the static support 54 that allows for movement of the stage 18 in a first, vertical direction (e.g., along the Z-axis direction). The actuator assembly 52 may additionally or alternatively include a lateral actuator 58 between the stage 18 and the vertical actuator 56 and/or the static support 54 that allows for movement in a second, horizontal direction (e.g., along the X-axis direction and/or the Y-axis direction). In some embodiments, the vertical actuator 56 may be operably coupled with the lateral actuator 58 such that the stage 18 and vertical actuator 56 move along the lateral actuator 58 simultaneously. The actuator assembly 52 may include any device practicable of moving the stage 18 in the first and/or second direction, such as ballscrew electric actuators, linear electric actuators, pneumatic cylinders, hydraulic cylinders, delta drives, belt systems, or any other practicable device.

The radiant energy device 20 may be configured as any device or combination of devices operable to generate and project radiant energy at the resin R in a suitable pattern and with a suitable energy level and other operating characteristics to cure the resin R during the build process. For example, as shown in FIGS. 1A and 1B, the radiant energy device 20 may include a projector 60, which may generally refer to any device operable to generate a radiant energy image of suitable energy level and other operating characteristics to cure the resin R. As used herein, the term "patterned image" refers to a projection of radiant energy including an array of one or more individual pixels. Non-limiting examples of patterned image devices include a DLP projector or another Digital Micromirror Device (DMD), a two-dimensional array of LEDs, a two-dimensional array of lasers, and/or optically addressed light valves. In the illustrated example, the projector 60 includes a radiant energy source 62, such as a UV lamp, an image forming apparatus 64 operable to receive a source beam 66 from the radiant energy source 62 and generate a grid 78 or pixelated image to be projected onto the surface of the resin R, and optionally focusing optics 70, such as one or more lenses. In some example embodiments, the pixels may have dimensions in the range of 10-100 micrometers (μm).

The image forming apparatus 64 may include one or more mirrors, prisms, and/or lenses and is provided with suitable actuators, and arranged so that the source beam 66 from the radiant energy source 62 can be transformed can be transformed into the grid 78 in an X-Y plane coincident with the surface of the resin R. In the illustrated example, the image forming apparatus 64 may be a DMD. The projector 60 may incorporate additional components, such as actuators, mirrors, etc. configured to selectively move the image forming apparatus 64 or another part of the projector 60 with the effect of rastering or shifting the location of the grid 78 on the resin surface 30. Stated another way, the grid 78 may be moved to various grid positions. The radiant energy device 20 can project the grid 78 onto the resin R to cure various portions of the resin R to form the component 12 layer-by-layer. As will be explained in greater detail herein, the apparatus 10 may be controlled to ensure that the grid 78 is intelligently shifted to align with the features associated with a layer to be built, thereby ensuring component quality and/or consistency as well as build efficiency.

In some further embodiments, the radiant energy device 20 can include multiple projectors. For instance, as depicted in FIG. 1A, the radiant energy device 20 can include the projector 60, or first projector, as well as a second projector 74. The projector 74 can include all the features of projector 60, for example. In some embodiments, the projector 60 can be a larger projector providing coarser resolution (relative to the second projector 74) and can be fixed to cover the full desired printable footprint. The second projector 74 can be a smaller projector providing finer resolution (relative to the projector 60), and optionally, can be movable to print fine features where needed. Such printers may print features within the same print area, and in some instances, at different resolutions.

In some other embodiments, the radiant energy device 20 may include a "scanned beam apparatus" used herein to refer generally to any device operable to generate a radiant energy beam of suitable energy level and other operating characteristics to cure the resin R and to scan the beam over the surface of the resin R in a desired pattern. For example, the scanned beam apparatus can include a radiant energy source 62 and a beam steering apparatus. The radiant energy source 62 may include any device operable to generate a beam of suitable power and other operating characteristics to cure the resin R. Non-limiting examples of suitable radiant energy sources 62 include lasers or electron beam guns.

Optionally, the modules of the apparatus 10 may be surrounded by a housing 73, which may be used to provide a shielding or inert gas (e.g., a "process gas") atmosphere using gas ports 82. Optionally, pressure within the housing 73 could be maintained at a desired level greater than or less than atmospheric. Optionally, the housing 73 could be temperature and/or humidity controlled. Optionally, ventilation of the housing 73 could be controlled based on factors such as a time interval, temperature, humidity, and/or chemical species concentration. In some embodiments, the housing 73 can be maintained at a pressure that is different than an atmospheric pressure.

The apparatus 10 can include or may be operably coupled with a computing system 110. The computing system 110 in FIG. 1A is a generalized representation of the hardware and software that may be implemented to control the operation of the apparatus 10, including some or all of the stage 18, the drive system 28, the radiant energy device 20, the actuator assembly 52, actuators, and the various parts of the apparatus 10 described herein. The computing system 110 may be embodied, for example, by software running on one or more processors embodied in one or more devices such as a programmable logic controller ("PLC") or a microcomputer. Such processors may be coupled to process sensors and operating components, for example, through wired or wireless connections. The same processor or processors may be used to retrieve and analyze sensor data for statistical analysis and for feedback control. Numerous aspects of the apparatus 10 may be subject to closed-loop control.

Figure 2:
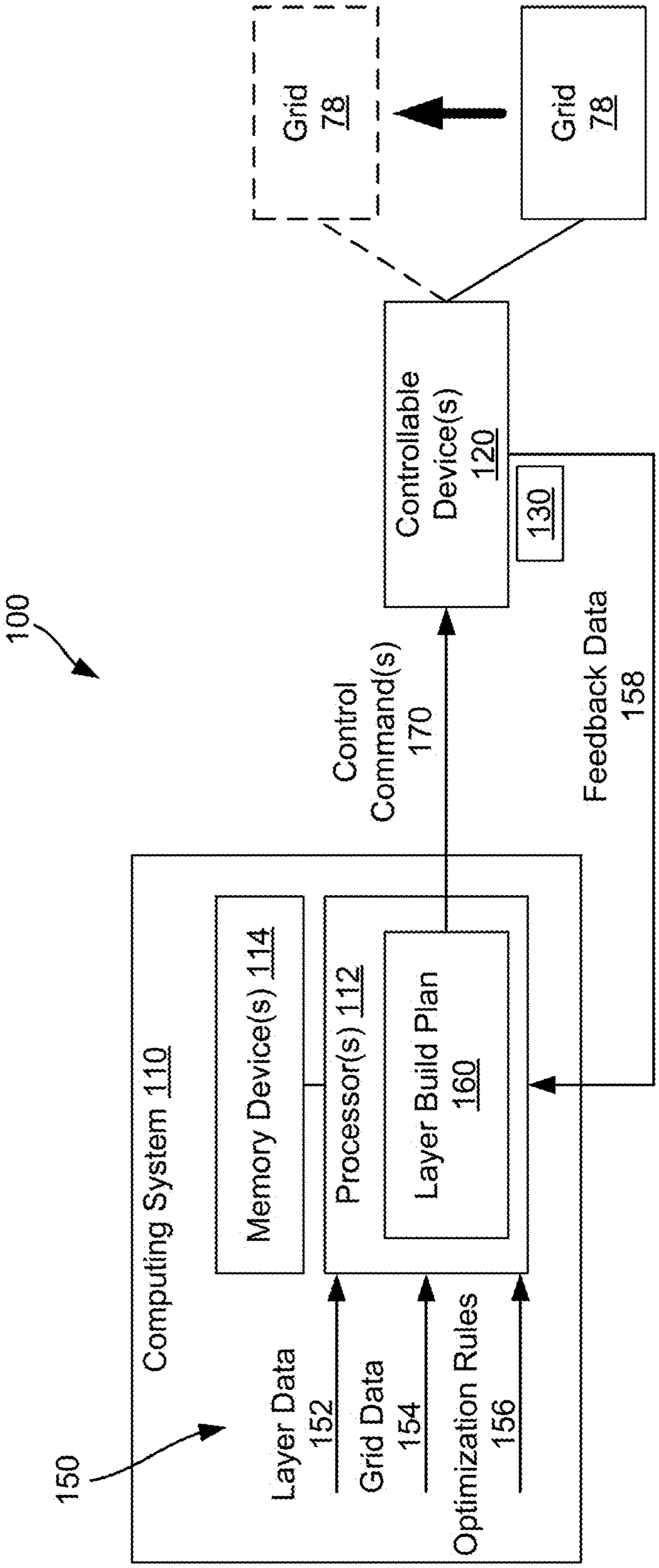
FIG. 2 is a block diagram of a control system of the additive manufacturing apparatus of FIG. 1A.

With reference now to FIGS. 1 and 2, FIG. 2 provides a block diagram of a control system 100 of the additive manufacturing apparatus 10 of FIG. 1A. The control system 100 can include the computing system 110 as well as one or more controllable devices 120, such as the stage 18, the drive system 28, the radiant energy device 20, the actuator assembly 52, and other controllable components of the apparatus 10 described herein. The computing system 110 can include one or more processors 112 and one or more memory devices 114. Generally, the control system 100 is operable to control operation of the additive manufacturing apparatus 10. Particularly, one or more of the controllable devices 120 can be controlled to shift a grid 78 of pixels from grid position to grid position so as to align the pixels of the grid 78 with features of the layer 68. In this way, the features of the layer 68 can be flashed with radiant energy in an intelligent manner. In FIG. 2, the grid 78 is shown being moved from one grid position to another.

Figures 3, 4:
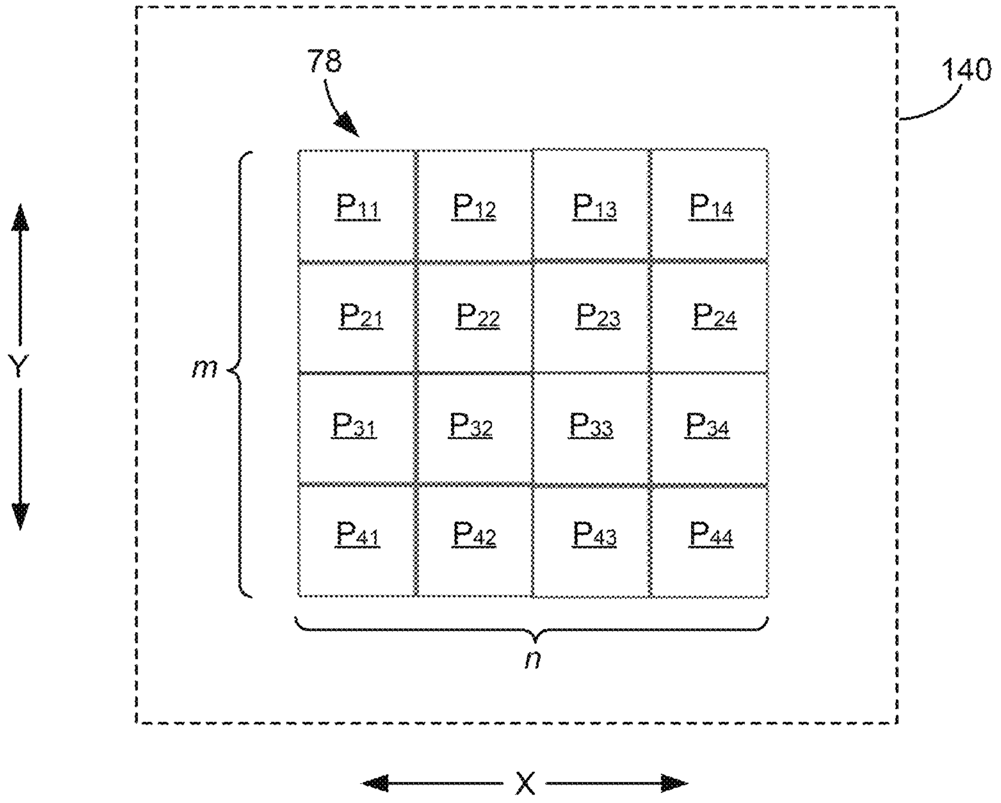
FIG. 3 depicts one example grid of fixed spacing that may be projected by the additive manufacturing apparatus of FIG. 1A.
FIG. 4 depicts one example layer build plan according to various aspects of the present disclosure.

The grid 78 can have a plurality of pixels and can be of a fixed geometry. The grid 78 can be moved or shifted with independent fine control (e.g. by a ¼, ⅓, or ½ shift, or by distance, e.g., 5 um, 10 um, etc.). The grid 78 is movable along the X-axis direction and/or the Y-axis direction. In some embodiments, optionally, the grid 78 may be rotated about an axis of rotation. By way of example, FIG. 3 depicts one example grid 78 of fixed spacing that may be projected by the additive manufacturing apparatus 10, or more particularly, by the radiant energy device 20 thereof. As shown, the grid 78 has a plurality of pixels. Specifically, the grid 78 of FIG. 3 includes pixels arranged in rows m and columns n. The pixels of grid 78 include pixels $P_{11}$, $P_{12}$, $P_{13}$, and $P_{14}$ arranged within a first row, pixels $P_{21}$, $P_{22}$, $P_{23}$, and $P_{24}$ arranged within a second row, pixels $P_{31}$, $P_{32}$, $P_{33}$, and $P_{34}$ arranged in a third row, and pixels $P_{41}$, $P_{42}$, $P_{43}$, and $P_{44}$ arranged in a fourth row. While the grid 78 of FIG. 3 has four rows and four columns, it will be appreciated that the grid 78 can have other suitable numbers of rows and/or columns. It will also be appreciated that the grid 78 need not have the same number of rows and columns. For instance, in some alternative implementations, the grid 78 may have ten rows and six columns. Also, in some embodiments, the grid 78 can have a non-traditional layout that is not in a traditional X-Y grid configuration.

As noted, the grid 78 projected by the additive manufacturing apparatus 10 may be shifted to a plurality of different grid positions. Particularly, the grid 78 may be shifted to any suitable position within an exposure area 140 or area of regard. The exposure area 140 can be any suitable size. The exposure area 140 may be practically limited by the hardware and arrangement of the additive manufacturing apparatus 10. The grid 78 is movable along the X-axis direction and/or the Y-axis direction. The grid 78 can be moved by actuating one or more components of the additive manufacturing apparatus 10, such as by actuating the projector 64 or optical components. In FIG. 3, the exposure area 140 is shown having a rectangular shape. In other embodiments, the exposure area 140 can have other suitable shapes.

With reference now to FIGS. 1, 2, and 3, to summarize the general control scheme for shifting the grid 78, the one or more processors 112 of the computing system 110 can receive data 150. The data 150 can include data associated with the layer to be printed, or layer data 152. The layer data 152 can include or indicate a geometry of the layer to be printed. The layer data 152 can also include or indicate a geometry of layers adjacent to the present layer. Further, in some embodiments, the layer data 152 can include or indicate a geometry of all layers of the component 12 to be built. In addition, the data 150 received by the one or more processors 112 of the computing system 110 can include data associated with the grid, or grid data 154. The grid data 154 can include or indicate a geometry of the grid. Further, the grid data 154 can include or indicate a present location of the grid 78, e.g., in coordinates, an offset from a home grid position, a combination of the two, etc.

Based at least in part on the layer data 152 and the grid data 154, the one or more one or more processors 112 of the computing system 110 can generate a layer build plan 160. The layer build plan 160 can indicate a manner in which the grid 78 projected by the additive manufacturing apparatus 10 is to be shifted to one or more grid positions during printing of the layer 68 as well as which pixels of the grid 78 are to be flashed at each grid position. In addition, the layer build plan 160 can indicate the radiant energy intensity or "flash intensity" associated with each pixel that is flashed at a given grid position. Effectively, the layer build plan 160 provides instructions for shifting the grid 78 from one grid position to the next and instructions for which of the pixels of the grid 78 are to be flashed and at what flash intensity for a given grid position.

By way of example, FIG. 4 provides one example layer build plan 160 according to various aspects of the present disclosure. For this example, the layer build plan 160 includes two flashes or shots of radiant energy, including a first flash and a second flash. For the first flash, the layer build plan 160 instructs that the grid position that the grid 78 is to be positioned in is a first grid position X1, Y1. The pixels to be flashed at the first grid position X1, Y1 are pixels $P_{11}$, $P_{12}$, $P_{21}$, and $P_{22}$. Pixels $P_{11}$, $P_{12}$, $P_{21}$, and $P_{22}$ are to be flashed at respective flash intensities $I_{11}$, $I_{12}$, $I_{21}$, and $I_{22}$, which can be the same or different flash intensities from one another. After flashing the noted pixels at the first grid position X1, Y1, the grid 78 is shifted to the second grid position X2, Y2 for the second flash or shot. For the second flash, the layer build plan 160 instructs that the grid position that the grid 78 is to be positioned in is second grid position X2, Y2. The pixels to be flashed at the second grid position X2, Y2 is pixel $P_{13}$. Pixels $P_{13}$ is to be flashed at a flash intensity $I_{13}$. It will be appreciated that the generated layer build plan 160 depicted in FIG. 4 is provided as an example and is not intended to be limiting. It will be appreciated that other generated layer build plans can have more than two flashes or shots and that various other pixels and flash intensities are possible. It will further be appreciated that a layer build plan can be generated for each layer of the component 12.

Notably, with reference again to FIGS. 1 and 2, the layer build plan 160 can be generated based at least in part on one or more optimization rules 156 in addition to the layer data 152 and the grid data 154. The optimization rules 156 can be received as part of the data 150. The optimization rules 156 can dictate or instruct how the layer build plan 160 is constructed, or rather, how the grid 78 is to be moved around and flashed to build the layer 68. That is, the one or more optimization rules can include a set of rules that constrain and prioritize certain aspects of building up the layer. For instance, such optimization rules 156 can include, without limitation, rules associated with: minimizing the shifting distance from one grid position to the next, minimizing the number of shifts needed for printing the layer, avoiding or minimizing flashing overlap to prevent print through or uneven material properties, reducing the intensity at the overlap regions, and selecting the starting grid position as the position in which a greatest number of the plurality of the pixels of the grid 78 can be flashed at once to form at least part of the layer 68 with each subsequent grid position having less than or a same number of pixels of the grid 78 to be flashed at once. The priority that one optimization rule 156 takes over another can change as the number of flashes increases for a given layer. In this regard, each rule of the optimization rules 156 can have a rule priority associated therewith, which as noted, may vary as the number of flashes increases for a given layer.

As further shown in FIG. 2, the data 150 received by the one or more processors 112 can include feedback data 158. The feedback data 158 can include data from one or more sensors 130 or controllable devices 120. The feedback data 158 can indicate, for example, the actual status, position, etc. of the various controllable devices 120 and/or the conditions associated with the apparatus 10 as captured by the one or more sensors 130. The layer build plan 160 can be generated based at least in part on the feedback data 158.

With the layer build plan 160 generated, the one or more one or more processors 112 of the computing system 110 can generate one or more control commands 170 that can be routed to the various controllable devices 120 of the apparatus 10. In this way, the grid 78 may be shifted from grid position to grid position and the selected pixels of the grid 78 may be flashed at the designated grid position and at the desired flash intensity in accordance with the layer build plan 160.

For instance, in one example aspect, the one or more processors 112 can cause the grid 78 to shift or remain in place in a first grid position in accordance with the layer build plan 160. Specifically, the one or more control commands 170 can be routed to the one or more controllable devices 120 and the controllable devices 120 can shift the grid 78 to the first grid position. The one or more processors 112 can cause the radiant energy device 20, which is represented in FIG. 2 as one of the controllable devices 120, to flash one or more of the plurality of pixels of the grid 78 with the grid 78 positioned in the first grid position to form at least a part of the layer 68. As noted, the optimization rules 156 can be set so that the first grid position can be a position in which a greatest number of the plurality of the pixels of the grid 78 can be flashed at once to form at least a part of the layer 68.

The one or more processors 112 can cause the grid 78 to shift from the first grid position to a second grid position in accordance with the layer build plan 160. For instance, in FIG. 2 the grid 78 is shown being shifted from the first grid position to the second grid position. The one or more control commands 170 can be routed to the one or more controllable devices 120 and the controllable devices 120 can shift the grid 78 from the first grid position to the second grid position. The one or more processors 112 can cause the radiant energy device 20 to flash one or more of the plurality of pixels of the grid 78 with the grid 78 positioned in the second grid position to form at least a part of the layer 68. This process may iterate until the entirety of layer 68 is printed. The process noted above can be repeated for each layer of the component 12 to be printed. Example methods in which a grid may be shifted so that the layer or sections thereof can be flashed with radiant energy in an intelligent manner will be further described below with reference to methods 200, 200A, 200B.

In some embodiments, the layer build plan 160 can be generated "on the fly" wherein a first layer is built up with a first generated build plan and then a second build plan is generated for a second layer to be built on the first layer based at least in part on the first build plan, the conditions during the build of the first layer, the current position of the grid 78 after building the first layer, etc., with this process repeating for each subsequent layer. In other embodiments, the layer build plan 160 can be generated as a file that includes build instructions or a build plan for each layer of the component, e.g., before any layers of the component are built. The file can be uploaded or stored on one or more memory devices of the computing system 110, and one or more processors can execute the file to build the component.

Figure 5:
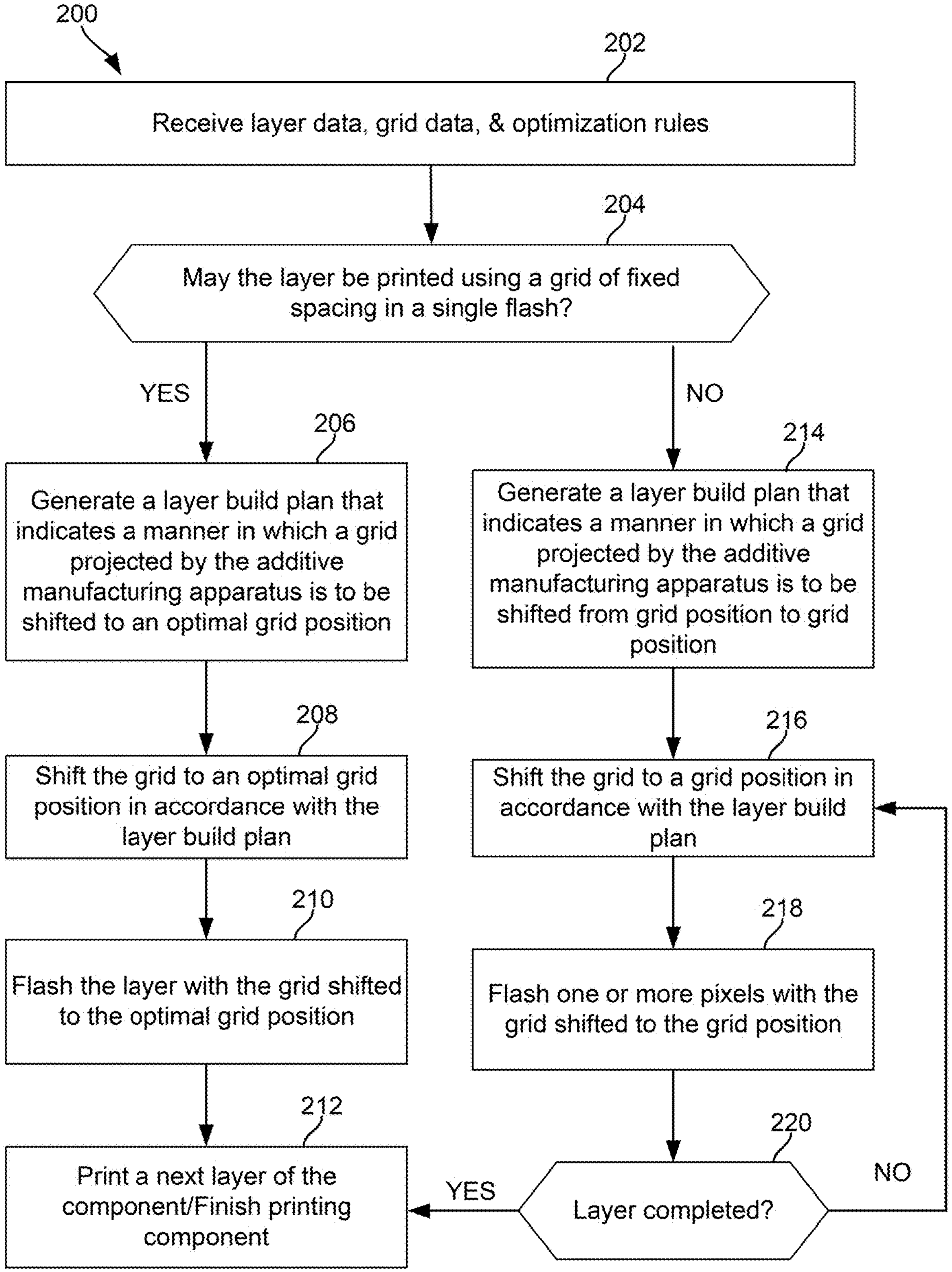
FIG. 5 is a flow diagram for a method of operating an additive manufacturing apparatus in accordance with various aspects of the present disclosure.

FIG. 5 provides a flow diagram for a method 200 of operating an additive manufacturing apparatus in accordance with various aspects of the present disclosure. The method 200 can be used to operate the additive manufacturing apparatus 10 or any other suitable additive manufacturing apparatus. It should be appreciated that the example method 200 is discussed herein only to describe example aspects of the present subject matter and is not intended to be limiting. Reference will be made generally to FIGS. 1 through 4 below to provide context to the method 200 of FIG. 5.

At 202, the method 200 includes receiving data. In some implementations, the data can include layer data indicating a geometry of a layer of a component to be printed by an additive manufacturing apparatus. For instance, the one or more processors 112 of the computing system 110 of the additive manufacturing apparatus 10 can receive layer data 152 as part of the data 150 as depicted in FIG. 2. The layer data 152 can be uploaded to the computing system 110, e.g., via a suitable 3D data file, and ultimately received by the one or more processors 112. The layer data 152 can include all relevant information relating to the geometry of the layer to be built, including the thickness, width, length, as well as other features of the layer to be printed. In some implementations, in addition to the geometry of the present layer, the layer data 152 can include or indicate a geometry of one or more layers adjacent to the present layer. In some implementations, in addition to the geometry of the present layer, the layer data 152 can include or indicate a geometry of each layer of the component 12 to be printed by the additive manufacturing apparatus 10.

Further, at 202, the data 150 received can include grid data 154. For instance, the one or more processors 112 of the computing system 110 of the additive manufacturing apparatus 10 can receive the grid data 154 as depicted in FIG. 2. The grid data 154 can include or indicate a geometry of the grid 78. Further, the grid data 154 can include or indicate a present location of the grid 78, e.g., in coordinates, an offset from a home grid position, etc.

In addition, at 202, the data 150 received can include one or more optimization rules 156. The one or more optimization rules 156 can dictate how the layer build plan 160 is constructed at 206 or 214 as will be explained further below. As noted, optimization rules 156 can include, without limitation, rules associated with: minimizing the shifting distance from one grid position to the next, minimizing the number of shifts needed for printing the layer, avoiding or minimizing flashing overlap to prevent print through or uneven material properties, reducing the intensity at the overlap regions, and selecting the starting grid position as the position in which a greatest number of the plurality of the pixels of the grid 78 can be flashed at once to form at least part of the layer with each subsequent grid position having less than or a same number of pixels of the grid 78 to be flashed at once. The priority that one optimization rule takes over another can change as the number of flashes increases for a given layer. The data 150 received can also include feedback data 158 as noted above.

At 204, the method 200 includes determining whether the layer to be printed may be printed in a single flash or shot using the grid of fixed spacing projected by the additive manufacturing apparatus. For instance, the one or more processors 112 of the computing system 110 can determine whether the layer to be printed may be printed in a single flash using the grid 78. That is, the one or more processors 112 can determine whether the grid 78 of fixed spacing will align "well" to the features of the layer 68 to be printed (e.g., to cover a preconfigured percentage of the cross-sectional area of the layer 68), regardless of where the grid 78 might need to be positioned within the exposure area 140.

The one or more processors 112 can make such a determination based at least in part on the geometry of the layer to be printed and the geometry of the grid 78 of fixed spacing. In some implementations, the one or more processors 112 can determine whether the layer 68 to be printed may be printed in a single flash using the grid 78 by determining whether one or more pixels of the grid 78 can be aligned to the features of the layer 68 and subsequently flashed so that the layer 68 is formed within a predetermined tolerance of a design specification associated with the layer 68. In other implementations, the one or more processors 112 can determine whether the layer 68 to be printed may be printed in a single flash using the grid 78 by determining whether one or more pixels of the grid 78 can be aligned to the features of the layer 68 and subsequently flashed so that a predetermined percentage of an area of the layer 68 is formed, e.g., 95%. In some implementations, the one or more processors 112 can determine whether the layer 68 to be printed may be printed in a single flash using the grid 78 by determining whether one or more pixels of the grid 78 can be aligned to the features of the layer 68 and subsequently flashed so that the layer 68 is formed within a predetermined tolerance of a design specification of the layer 68 and so that a predetermined percentage of an area of the layer 68 is formed. When the one or more processors 112 determine that the layer 68 to be printed may be printed in a single flash or shot using the grid 78, the method 200 proceeds to 206 as depicted in FIG. 5.

At 206, the method 200 includes generating the layer build plan 160. The layer build plan 160 generated at 206 indicates a manner in which the grid 78 projected by the additive manufacturing apparatus 10 is to be shifted to an optimal grid position for the single flash, as well as which pixels of the grid 78 are to be flashed at the optimal grid position. In addition, the layer build plan 160 generated at 206 can indicate the radiant energy intensity or "flash intensity" associated with each pixel that is flashed at the optimal grid position. The layer build plan 160 can be generated by the one or more processors based at least in part on the geometry of the layer 68, the geometry of the grid 78, and the current position of the grid 78, as well as any applicable optimization rules 156.

Figure 6:
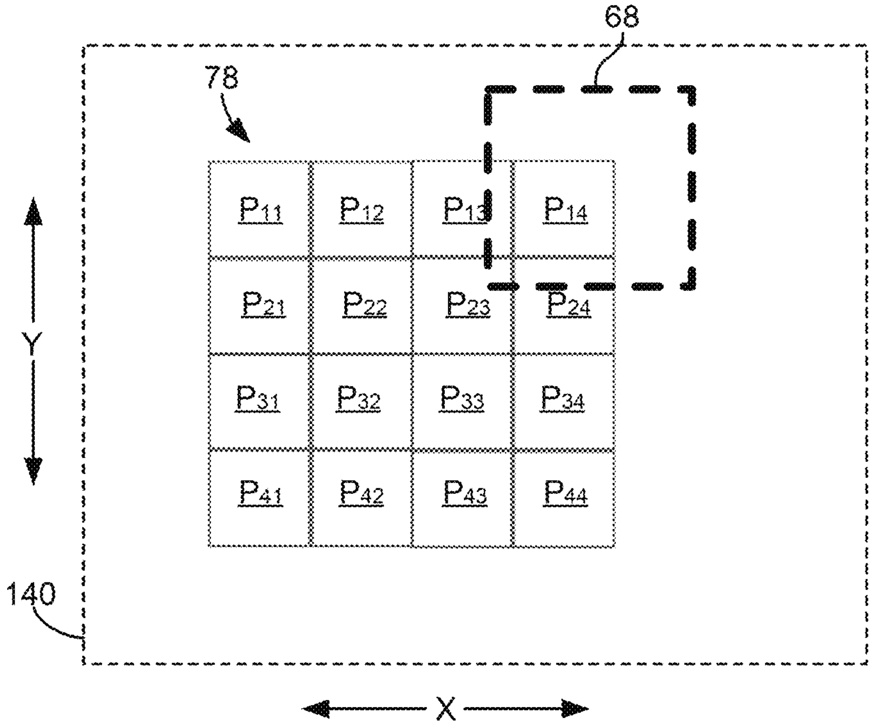
FIG. 6 depicts a layer to be printed by a grid in accordance with various aspects of the present disclosure.

By way of example, FIG. 6 depicts a layer 68 to be printed by the grid 78. In this example, the layer 68 is a rectangle located in the upper right portion of the exposure area 140. Based on the known geometry of the layer 68 and the known geometry of the grid 78, which can include the known size of the pixels of the grid 78, the one or more processors 112 of the computing system 110 can determine at 204 that the layer 68 to be printed may be printed in a single flash or shot using the grid 78. Accordingly, at 206, the one or more processors 112 of the computing system 110 can generate the layer build plan 160 that indicates the manner in which the grid 78 is to be moved or shifted to the optimal grid position for flashing the layer 68 in a single flash. The layer build plan 160 can also indicate which pixels of the grid 78 are to be flashed when the grid 78 is shifted to the optimal grid position as well as their respective flash intensities. Thus, the layer build plan 160 generated at 206 can include the same or similar information as the layer build plan 160 depicted in FIG. 4, except of course that there is only a single flash number for the layer build plan 160 generated at 206 for the layer 68 of FIG. 6.

The layer build plan 160 can also be generated based at least in part on the one or more optimization rules 156. For instance, for this example, the optimization rules 156 considered by the one or more processors 112 can include a first rule of first priority that instructs that the grid 78 is to be shifted so that the pixels of the grid 78 align as close as possible to the features of the layer 68. The one or more processors 112 can also consider a second rule of second priority, the second priority being a lower priority than the first priority, which instructs that a grid shift distance is to be minimized. The one or more processors 112 can further consider other optimization rules 156 as well. The optimal grid position can be determined based at least in part on the optimization rules 156.

Figure 7:
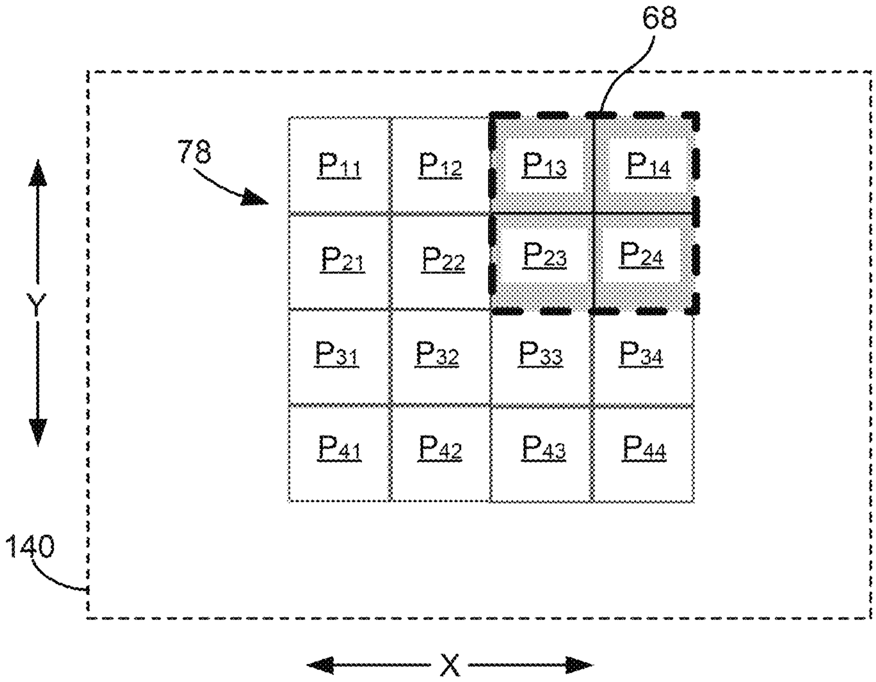
FIG. 7 depicts the grid of FIG. 6 shifted to an optimal grid position with respect to the layer to be printed.

Accordingly, for this example, the layer build plan 160 is generated so that instructions are provided to shift the grid 78 from its current position shown in FIG. 6 to the optimal grid position shown in FIG. 7. The optimal grid position is determined based at least in part on the optimization rules 156 and their respective priorities. Particularly, for this example, as the first rule and the second rule noted above can both be satisfied, the optimal grid position is selected so that the pixels of the grid 78 align as close as possible to the features of the layer 68 and so that a grid shift distance is minimized, or the distance the grid 78 is shifted from its current position to the optimal grid position.

At 208, the method 200 includes positioning (e.g., maintaining the grid in place or shifting) the grid to the optimal grid position in accordance with the layer build plan. For instance, the one or more processors 112 can cause the one or more controllable devices 120 to move or shift the grid 78 from its position in FIG. 6 to the optimal grid position shown in FIG. 7. Particularly, the one or more processors 112 can generate one or more control commands 170 based at least in part on the layer build plan 160 generated at 206. The generated control commands 170 can be routed to the one or more controllable devices 120 and such controllable devices 120 can shift the grid 78 to the optimal grid position. As one example, the image forming apparatus 64 may be controlled in accordance with the control commands 170 so that the grid 78 is shifted to the optimal grid position.

Continuing with the example, FIG. 7 depicts the grid 78 shifted to the optimal grid position. As shown, pixels $P_{13}$, $P_{14}$, $P_{23}$, and $P_{24}$ of the grid 78 closely align with the features of the layer 68 and fill the area of the layer 68. Moreover, while other combinations of pixels would also align with the features of the layer 68 as well, pixels $P_{13}$, $P_{14}$, $P_{23}$, and $P_{24}$ of the grid 78 were selected as being the pixels to align with the layer 68 so as to minimize the shifting distance of the grid 78.

At 210, the method 200 includes flashing one or more of the plurality of pixels of the grid with the grid positioned in the optimal grid position to create the layer. For instance, the one or more processors 112 can cause the radiant energy device 20 of the additive manufacturing apparatus 10 to flash one or more of the plurality of pixels of the grid 78. For example, as shown in FIG. 7, the one or more processors 112 can cause the radiant energy device 20 to flash pixels $P_{13}$, $P_{14}$, $P_{23}$, and $P_{24}$ of the grid 78 at their respective flash intensities to create layer 68. The other pixels of the grid 78 would not be flashed. Accordingly, the layer 68 is formed having a rectangular shape.

At 212, the method 200 ends and either the next layer is printed, e.g., using method 200, or if the layer 68 is the last layer, the component 12 is completed and printing may cease.

As noted above, in some instances, the layer data 152 received by the one or more processors 112 can include data 150 associated with a geometry of a layer adjacent to the present layer to be printed. For instance, the layer data 152 can include data indicating a geometry of a layer to be printed immediately after the present layer. In such implementations, in generating the layer build plan 160 at 206, the optimization rules 156 considered by the one or more processors 112 can include a first rule of first priority that instructs that the grid 78 is to be shifted so that the pixels of the grid 78 align as close as possible to the features of the layer 68. The one or more processors 112 can also consider a second rule of second priority, the second priority being a lower priority than the first priority, which instructs that, if possible, the grid 78 is to be shifted so as to eliminate the need to shift the grid 78 from one layer to the next. The one or more processors 112 can further consider a third rule of third priority, the third priority being a lower priority than the second priority, which instructs that a grid shift distance is to be minimized from the current position of the grid 78 to the optimal grid position.

Figure 8:
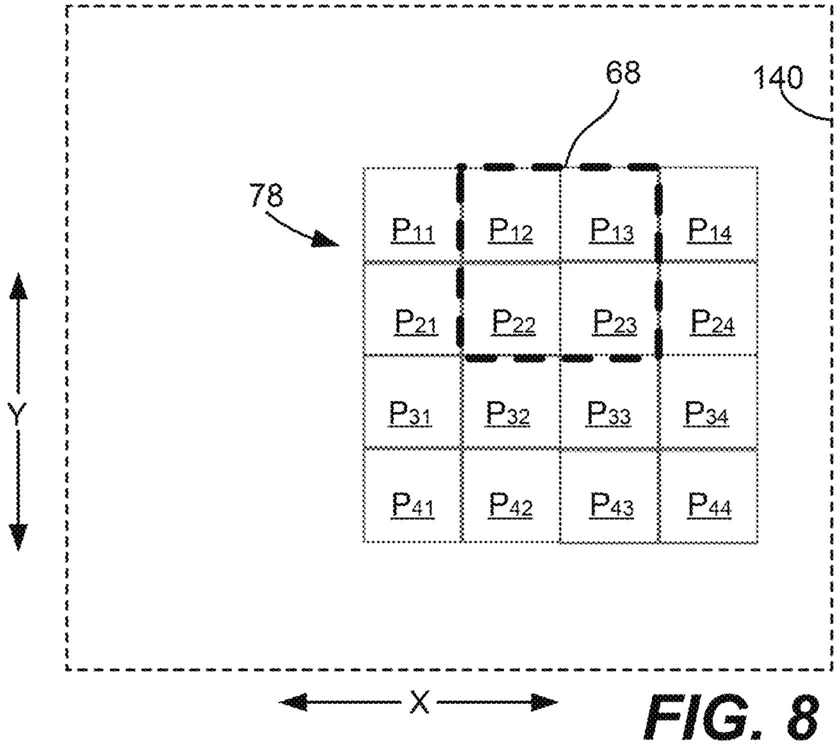
FIG. 8 depicts a layer to be printed by a grid in accordance with various aspects of the present disclosure.
Figure 9:
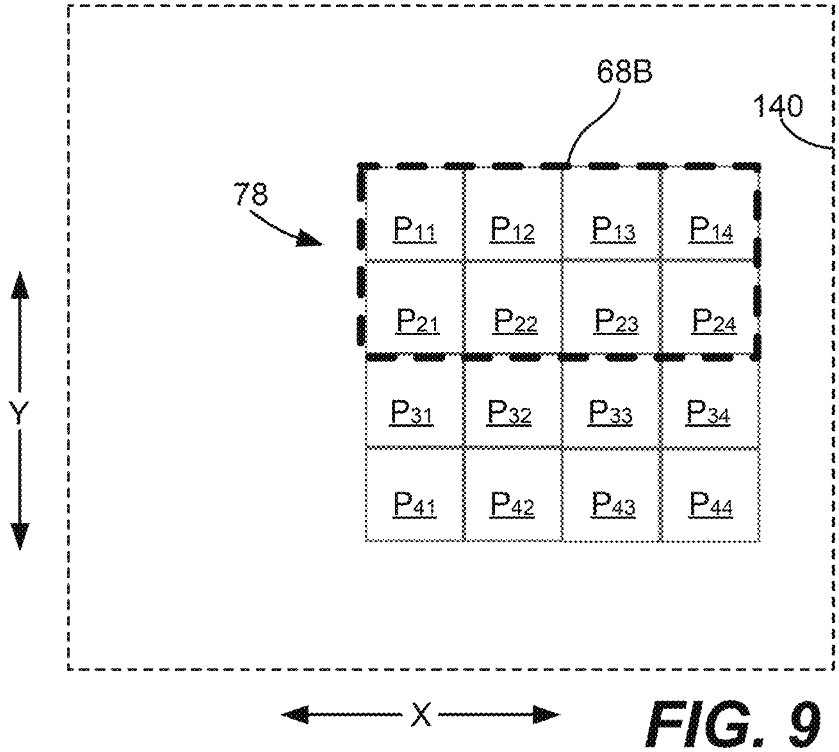
FIG. 9 depicts a subsequent layer to be printed after the layer of FIG. 8.

By way of example and with reference now to FIGS. 6, 8, and 9, as noted, the layer build plan 160 is generated at 206 so that instructions are provided to shift the grid 78 from its current position shown in FIG. 6 to the optimal grid position. The optimal grid position can be determined by the one or more processors 112 based at least in part on the optimization rules 156 and their respective priorities. Accordingly, for this example, the first rule may be satisfied as the pixels of the grid 78 may be shifted so that the pixels of the grid 78 align well to the features of the layer 68, e.g., so that the pixels aligned with the features of the layer 68 align with the features so that, when the pixels are flashed, the layer is formed within a predetermined tolerance of a design specification of the layer 68 and/or so that a predetermined percentage of an area of the layer 68 is formed, e.g., 90%.

In this example, there are a number of possible pixel combinations that may achieve this result. For instance, as noted above and depicted in FIG. 7, pixels $P_{13}$, $P_{14}$, $P_{23}$, and $P_{24}$ of the grid 78 may align well with the features of layer 68. However, in considering the second rule, the one or more processors 112 can determine that it is possible to eliminate the need to shift the grid 78 from one layer to the next. That is, the one or more processors 112 may determine that it may be possible to flash one, some, or all pixels of the grid 78 with the grid 78 in a particular grid position to create the present layer 68 and then to flash one, some, or all pixels of the grid 78 with the grid 78 in the same grid position to create a subsequent layer or at least a part thereof.

For instance, suppose the current or present layer 68 to be printed is shown in FIG. 8 while the next or subsequent layer 68B to be printed is shown in FIG. 9. As shown, the grid 78 can be moved or shifted so that the pixels of the grid 78 are aligned well with the features of the present layer 68 and so that the pixels of the grid 78 are aligned well with the features of the subsequent layer 68B. More specifically, the grid 78 can be moved or shifted to a grid position so that pixels $P_{12}$, $P_{13}$, $P_{22}$, and $P_{23}$ are aligned with the features of the present layer 68 as shown in FIG. 8. As depicted in FIG. 9, this strategic grid position allows for pixels $P_{11}$, $P_{12}$, $P_{13}$, $P_{14}$, $P_{21}$, $P_{22}$, $P_{23}$, and $P_{24}$ to align with the features of the subsequent layer 68B. In this regard, the grid 78 need not be shifted after flashing the present layer 68 and before flashing the subsequent layer 68B.

Although the grid 78 is shifted a slightly greater distance from its position in FIG. 6 to its position depicted in FIGS. 8 and 9 than the distance from its position in FIG. 6 to its position in FIG. 7, the priority of minimizing the shifts between layers is of a higher priority in this example than minimizing the shifting distance of the grid 78 from its current position to align with the features of the present layer 68. Accordingly, the optimal grid position is determined as the position of the grid 78 shown in FIGS. 8 and 9 for this example. With the grid 78 shifted to the optimal grid position as shown in FIGS. 8 and 9, pixels $P_{12}$, $P_{13}$, $P_{22}$, and $P_{23}$ of the grid 78 can be flashed to form the present layer 68 and pixels $P_{11}$, $P_{12}$, $P_{13}$, $P_{14}$, $P_{21}$, $P_{22}$, $P_{23}$, and $P_{24}$ can be flashed to form the subsequent layer 68B without need to shift the grid 78. In this way, the grid 78 is shifted intelligently to provide improved printing efficiency.

Returning now to FIG. 5, when the one or more processors determine that the layer to be printed may not be printed in a single flash or shot using a grid of fixed spacing projected by the additive manufacturing apparatus as determined at 204, the method 200 proceeds to 214.

At 214, the method 200 includes generating a layer build plan that indicates a manner in which the grid projected by the additive manufacturing apparatus is to be shifted from grid position to grid position during printing of the layer. The generated layer build plan 160 can also include or indicate which of the pixels of the grid 78 are to be flashed and at what level or flash intensity the pixels are to be flashed. For instance, the one or more processors 112 of the computing system 110 can generate the layer build plan 160 based at least in part on the geometry of the layer 68 to be printed, the geometry of the grid 78, including the geometry and arrangement of the pixels of the grid 78, and in some instances, one or more optimization rules 156. In accordance with the layer build plan generated at 214, the grid can be shifted to a grid position at 216, one or more pixels of the grid can be flashed at 218 with the grid 78 positioned in or shifted to the grid position, and the grid 78 can be iteratively shifted and flashed at one or more subsequent grid positions in an intelligent manner. Actions 216 and 218 may iterate in accordance with the layer build plan 160 generated at 214 until the one or more processors 112 determine at 220 that the layer 68 is completed.

By way of example, FIGS. 10 through 16 depict a sequence of a layer 68 being formed by flashing certain pixels of grid 78 projected by apparatus 10. For this example, the layer 68 to be printed has an oval shape as outlined by its perimeter 71. The layer 68 to be printed is located generally in the middle of the exposure area 140. Based on the known geometry of the layer 68 and the known geometry of the grid 78, which can include the known geometry of the pixels of the grid 78, the one or more processors of the computing system 110 can determine at 204 of the method 200 that the layer 68 to be printed may not be printed in a single flash or shot using the grid 78. For instance, the one or more processors 112 can determine that the one or more pixels of the grid 78 cannot be aligned to the features of the layer 68 and the pixels subsequently flashed so that the layer 68 is formed within a predetermined tolerance of a design specification of the layer 68 and/or so that a predetermined percentage of an area of the layer 68 is formed. In such an instance, the method 200 proceeds to 214, as noted above.

Accordingly, at 214, the one or more processors 112 of the computing system 110 can generate the layer build plan 160 that indicates a manner in which the grid 78 is to be shifted during printing of the layer 68. The layer build plan 160 can also indicate which pixels of the grid 78 are to be flashed when the grid 78 is shifted to a particular grid position as well as the flash intensity at which the pixels are to be flashed. Thus, the layer build plan 160 generated at 214 can include the same or similar information as the layer build plan 160 depicted in FIG. 4.

The layer build plan 160 generated at 214 can also be generated based at least in part on the one or more optimization rules 156. For instance, for this example, the optimization rules 156 considered by the one or more processors 112 can include a first rule of first priority that instructs that the grid 78 is to be shifted or positioned so that the starting grid position or first grid position is a position in which a greatest number of the plurality of the pixels of the grid 78 can be flashed "full on" at once or in a single flash to form a first part of the layer 68. As used herein, a given pixel is "full on" or substantially within a perimeter of a layer to be printed when a total area of the given pixel is within the perimeter of the layer 68 by a predetermined area percentage. In some implementations, the predetermined area percentage is seventy-five percent (75%). In other implementations, the predetermined area percentage is eighty-five percent (85%). In further implementations, the predetermined area percentage is ninety percent (90%). In yet other implementations, the predetermined area percentage is ninety-five percent (95%). In some other implementations, the predetermined area percentage is one hundred percent (100%). The predetermined area percentage may change from layer to layer or may even be different within a same layer, e.g., more focus or intensity in high definition areas of a given layer. The predetermined area percentage may also remain the same from layer to layer or within a same layer.

The first rule further instructs that each subsequent grid position is a position in which the number of pixels of the grid 78 to be flashed at once to form part of the layer 68 is equal to or less than the greatest number of the plurality of pixels of the grid 78 that can be flashed during the flashing of the previous layer 68. The one or more processors 112 can consider other optimization rules 156 as well, such as minimizing the shifting distance between flashes, minimizing the overall number of shifts, minimizing flash overlap, minimizing the overlap of flashed areas, or some combination of the foregoing.

Figure 10:
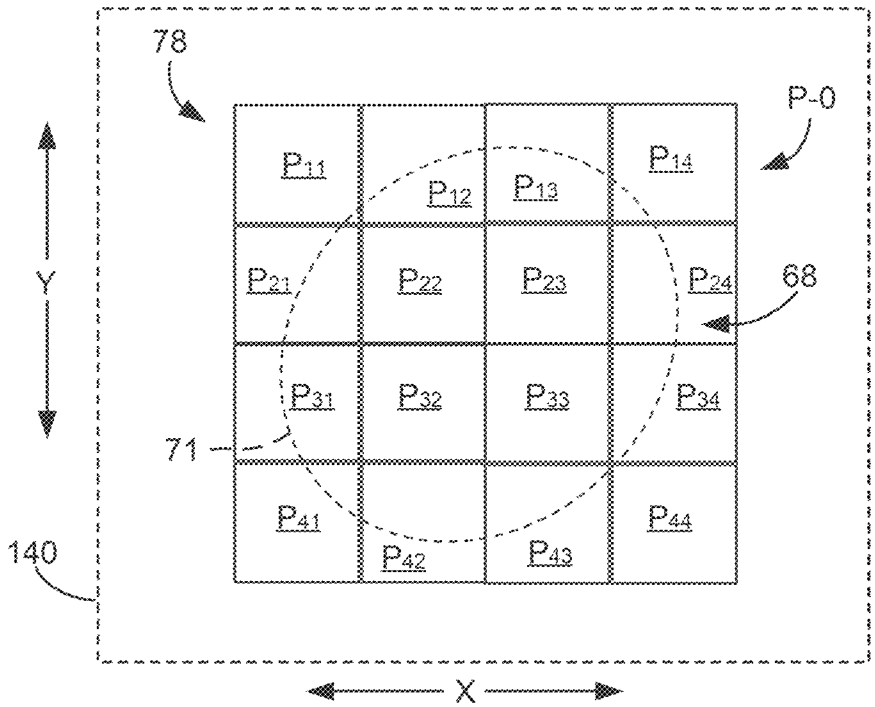
FIGS. 10 through 16 depict a sequence of a layer being formed by flashing certain pixels of a grid projected by an additive manufacturing apparatus in accordance with various aspects of the present disclosure.
Figure 11:
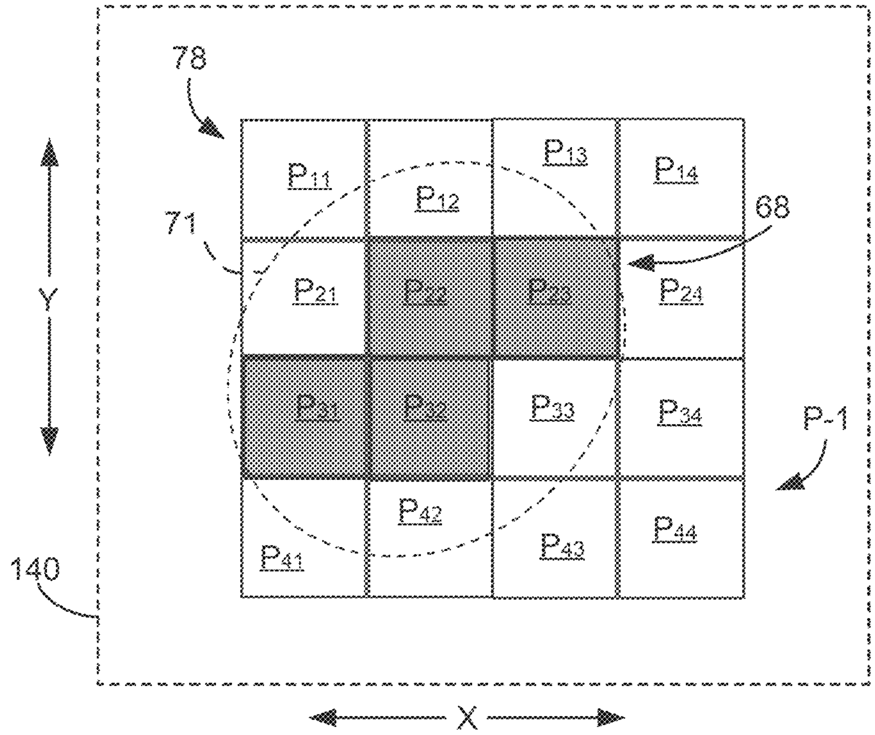
Figure 12:
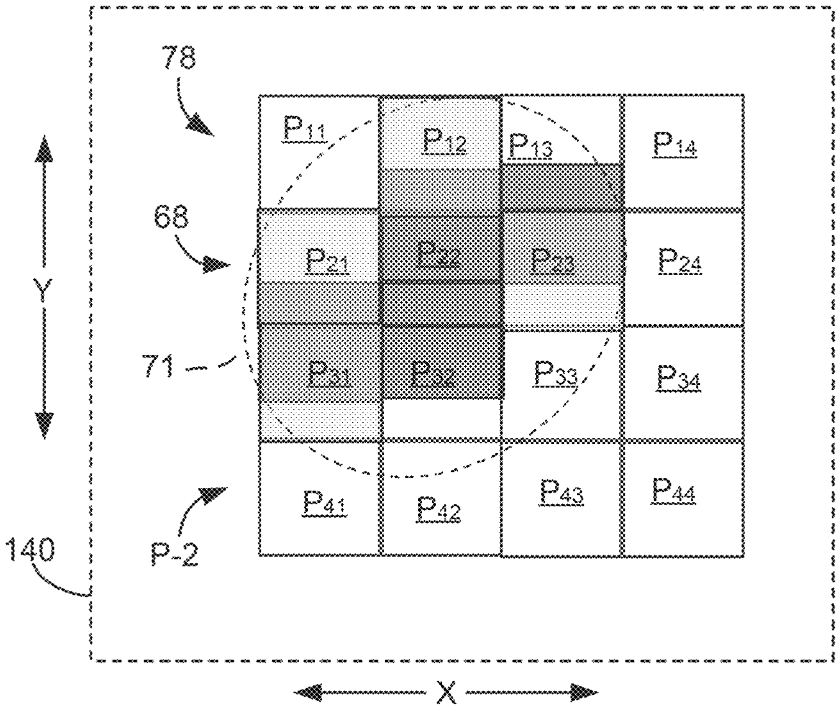
Figure 13:
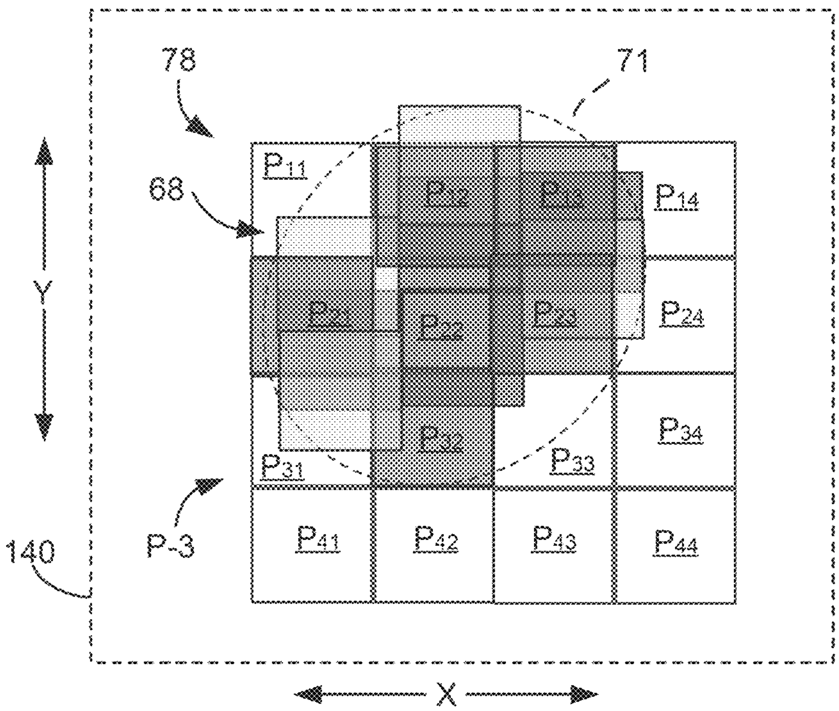
Figure 14:
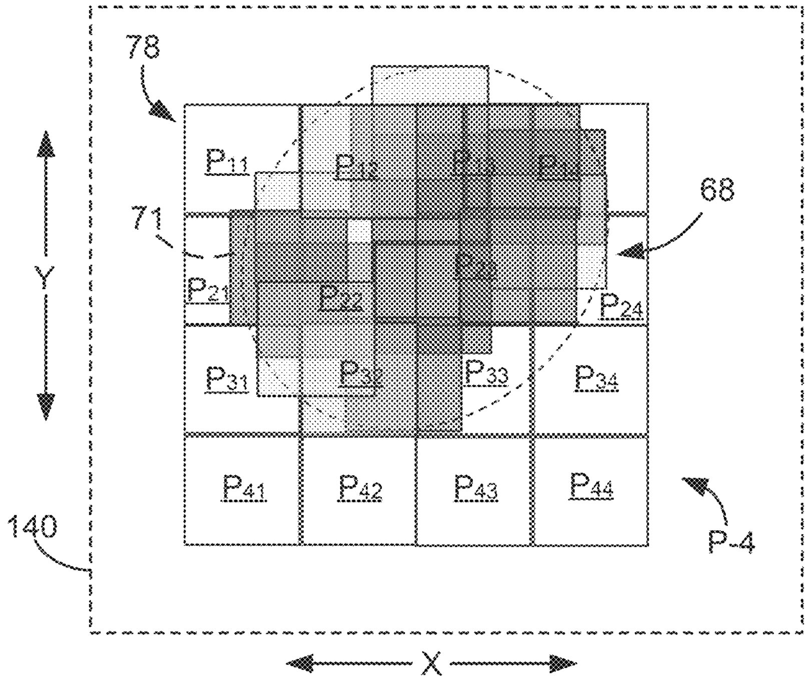
Figure 15:
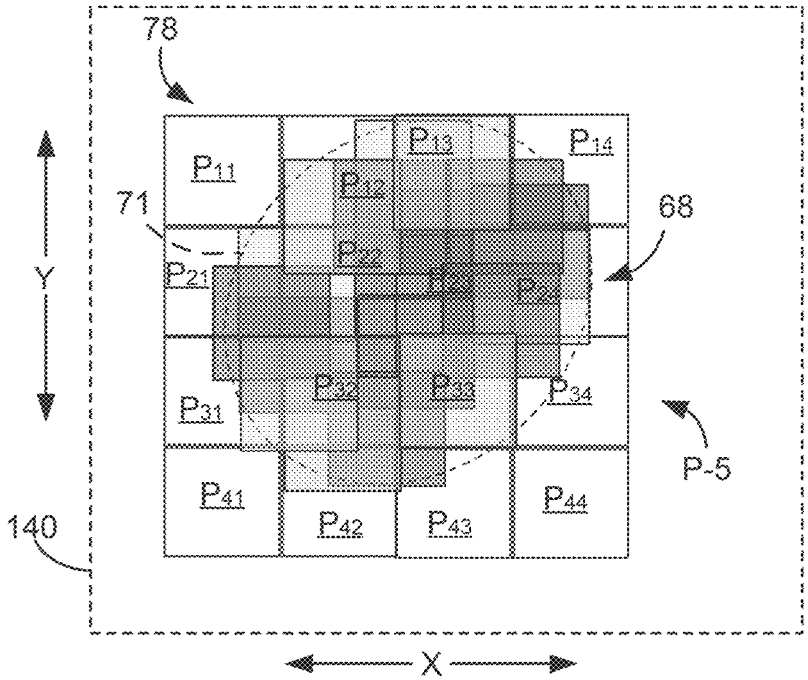

Thus, for this example, the layer build plan 160 is generated at 214 so that instructions are provided to shift the grid 78 from its current grid position P-0 shown in FIG. 10 to a first grid position P-1 depicted in FIG. 11. For instance, the layer build plan 160 is generated so that, when the layer build plan 160 is executed, the grid 78 is shifted half a pixel to the right along the X-axis direction. As shown in FIG. 11, in accordance with the optimization rules, the first grid position P-1 is a position in which the greatest number of the plurality of the pixels of the grid 78 (which is four pixels in this instance) can be flashed at once to form a first part of the layer 68. For this example, pixels $P_{22}$, $P_{23}$, $P_{31}$, and $P_{32}$ of the grid 78 equate to the greatest number of the plurality of the pixels of the grid 78 that can be flashed full on at once to form a first part of the layer 68. While the grid 78 could have remained in the current grid position P-0 or been shifted so that some other combination of four pixels could align with the features of the layer 68 to be flashed at once to form a first part of the layer 68, the one or more processors 112 have generated the layer build plan 160 considering optimization rules 156 instructing that a minimum number of shifts be made to form the layer 68 and that the shifting distance be minimized all while forming the layer 68 within a predetermined tolerance of a design specification of the layer 68 and/or so that a predetermined percentage of an area of the layer 68 is formed. Accordingly, in this example, the layer build plan 160 generated at 214 instructs that the grid is to be shifted to the first grid position P-1 at 216 and that pixels $P_{22}$, $P_{23}$, $P_{31}$, and $P_{32}$ of the grid 78 are to be flashed at 218.

After pixels $P_{22}$, $P_{23}$, $P_{31}$, and $P_{32}$ of the grid 78 are flashed at 218 while the grid 78 is in the first grid position P-1 to form a first part or portion of the layer 68 as shown in FIG. 11, at 220, the one or more processors 112 determine that the layer 68 is not complete. Thus, in accordance with the layer build plan 160 generated at 214, the grid 78 is shifted at 216 from the first grid position P-1 depicted in FIG. 11 to a second grid position P-2 depicted in FIG. 12. For instance, the layer build plan 160 is generated so that, when the layer build plan 160 is executed, the grid 78 is shifted down a third of a pixel along the Y-axis direction. When in the second grid position P-2, pixels $P_{12}$, $P_{21}$, $P_{23}$, and $P_{31}$ of the grid 78 are to be flashed at 218 to form at least a part of the layer 68, e.g., a second part of the layer 68.

Once pixels $P_{12}$, $P_{21}$, $P_{23}$, and $P_{31}$ of the grid 78 are flashed at 218 while the grid 78 is in the second grid position P-2 to form a second part or portion of the layer 68, at 220, the one or more processors 112 determine that the layer 68 is not complete. Thus, in accordance with the layer build plan 160 generated at 214, the grid 78 is shifted at 216 from the second grid position P-2 depicted in FIG. 12 to a third grid position P-3 depicted in FIG. 13. For instance, the layer build plan 160 is generated so that, when the layer build plan 160 is executed, the grid 78 is shifted down a third of a pixel along the Y-axis direction and to the left a quarter of a pixel along the X-axis direction. When in the third grid position P-3, pixels $P_{12}$, $P_{13}$, $P_{21}$, $P_{23}$, and $P_{32}$ of the grid 78 are flashed at 218 to create a third part or portion of the layer 68.

After pixels $P_{12}$, $P_{13}$, $P_{21}$, $P_{23}$, and $P_{32}$ of the grid 78 are flashed at 218 while the grid 78 is in the third grid position P-3 to form a third part or portion of the layer 68, at 220, the one or more processors 112 determine at 220 that the layer 68 is not complete. Thus, in accordance with the layer build plan 160 generated at 214, the grid 78 is shifted at 216 from the third grid position P-3 depicted in FIG. 13 to a fourth grid position P-4 depicted in FIG. 14. For instance, the layer build plan 160 is generated so that, when the layer build plan 160 is executed, the grid 78 is shifted to the left a third of a pixel along the X-axis direction. When in the fourth grid position P-4, pixels $P_{12}$ and $P_{32}$ of the grid 78 are flashed at 218 to create a fourth part or portion of the layer 68.

Further, once pixels $P_{12}$ and $P_{32}$ of the grid 78 are flashed at 218 while the grid 78 is in the fourth grid position P-4 to form the fourth part or portion of the layer 68, at 220, at 220, the one or more processors 112 determine that the layer 68 is not complete. Thus, in accordance with the layer build plan 160 generated at 214, the grid 78 is shifted at 216 from the fourth grid position P-4 depicted in FIG. 14 to a fifth grid position P-5 depicted in FIG. 15. For instance, the layer build plan 160 is generated so that, when the layer build plan 160 is executed, the grid 78 is shifted upward a third of a pixel along the Y-axis direction. When in the fifth grid position P-5, pixels $P_{13}$ and $P_{33}$ of the grid 78 are flashed at 218 to create a fifth part or portion of the layer 68.

Figure 16:
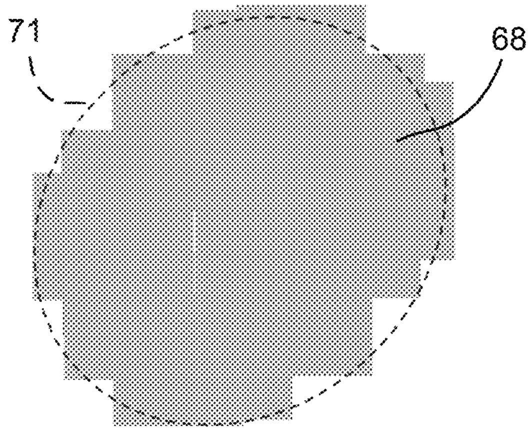
Figure 17:
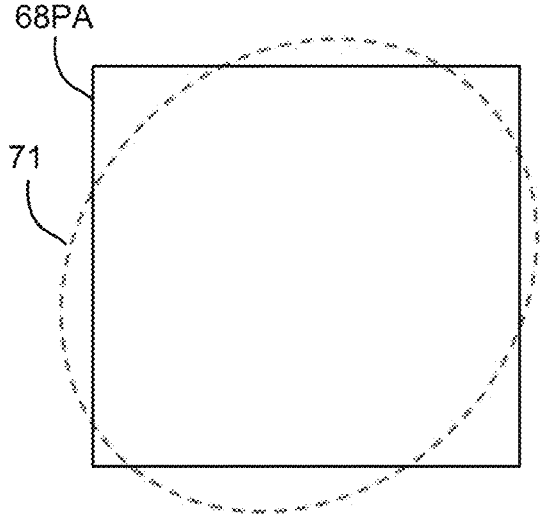
FIG. 17 (Prior Art)
FIG. 17 depicts a layer printed by means of a prior art technique.

After iterating 216 and 218 of the method 200 until the layer 68 is formed within a predetermined tolerance of a design specification of the layer 68 and/or so that a predetermined percentage of an area of the layer 68 is formed and/or until some other criteria is met as determined at 220, the one or more processors 112 can repeat method 200 for the next layer and/or until the component 12 is fully formed. As depicted in FIG. 16, due to the intelligent shifting of the grid 78 and flashing of select pixels in accordance with the layer build plan 160 generated at 214, the built-up layer 68 is formed to specification. Advantageously, method 200 may provide better control over edges and edge placement compared to conventional printing techniques. Particularly, building up a layer using the method 200 may provide better "resolution" at the edges or perimeter of the layer compared to a layer formed using conventional techniques. For instance, FIG. 17 depicts a layer 68PA built up to the same specification as the layer 68 of FIG. 16 (as represented by the perimeter 71 in FIG. 17). Notably, the layer 68 of FIG. 16 has much better resolution at the perimeter 71 than does the layer 68PA built up using a conventional technique.

In accordance with another example implementation of method 200, a layer of a component can be printed by the apparatus 10 using a bulk flash and trace technique. With reference now to FIGS. 1, 2, and 18 through 23, FIG. 18 is a flow diagram for a method 200A in which a bulk flash and trace technique is used instead of the approach set forth in 214 through 220 depicted FIG. 5. FIGS. 19 through 23 depict an example sequence of printing a layer in accordance with the method 200A set forth in FIG. 18.

After receiving data at 202 and determining that the layer to be printed cannot be printed in a single flash or shot using the grid of fixed spacing projected by the additive manufacturing apparatus at 204, e.g., as provided above with reference to method 200 of FIG. 5, at 222, the method 200A includes generating a layer build plan. For instance, the one or more processors 112 of the computing system 110 can generate the layer build plan 160 based at least in part on a geometry of the layer to be printed as derived from received layer data 152, the geometry of the grid as derived from the received grid data 154, and/or one or more optimization rules 156. The layer build plan 160 can indicate instructions for printing the layer 68 in a bulk flash and trace technique. Particularly, the layer build plan 160 can indicate instructions for positioning the grid 78 so that a greatest number of a plurality of pixels of the grid are aligned "full on" within a perimeter 71 of the layer 68 to be printed; flashing the greatest number of the plurality of pixels of the grid 78 with radiant energy with the greatest number of the plurality of pixels aligned full on within the perimeter 71 of the layer 68 to form at least part of the layer 68; tracing a pixel or a collection of pixels of the grid 78 around the perimeter 71 of the layer 68; and flashing the pixel or collection of pixels with radiant energy as the pixel or collection of pixels is traced around the perimeter 71 of the layer 68 to form at least part of the layer 68. The layer build plan 160 can also indicate the flash intensity at which the various pixels of the grid 78 are to be flashed.

The one or more optimization rules 156 considered by the one or more processors 112 in generating the layer build plan 160 at 222 can include, without limitation, rules for determining the tracing path of the pixel or collection of pixels to be traced around the perimeter 71 of the layer 68, a number of times the pixel or collection of pixels are to be traced around the perimeter 71 of the layer 68, a number of pixels to be traced around the perimeter 71 of the layer 68 (which may be based on the area between the perimeter 71 and the flashed "bulk area", among other possible criteria), as well as other optimization rules.

Figure 18:
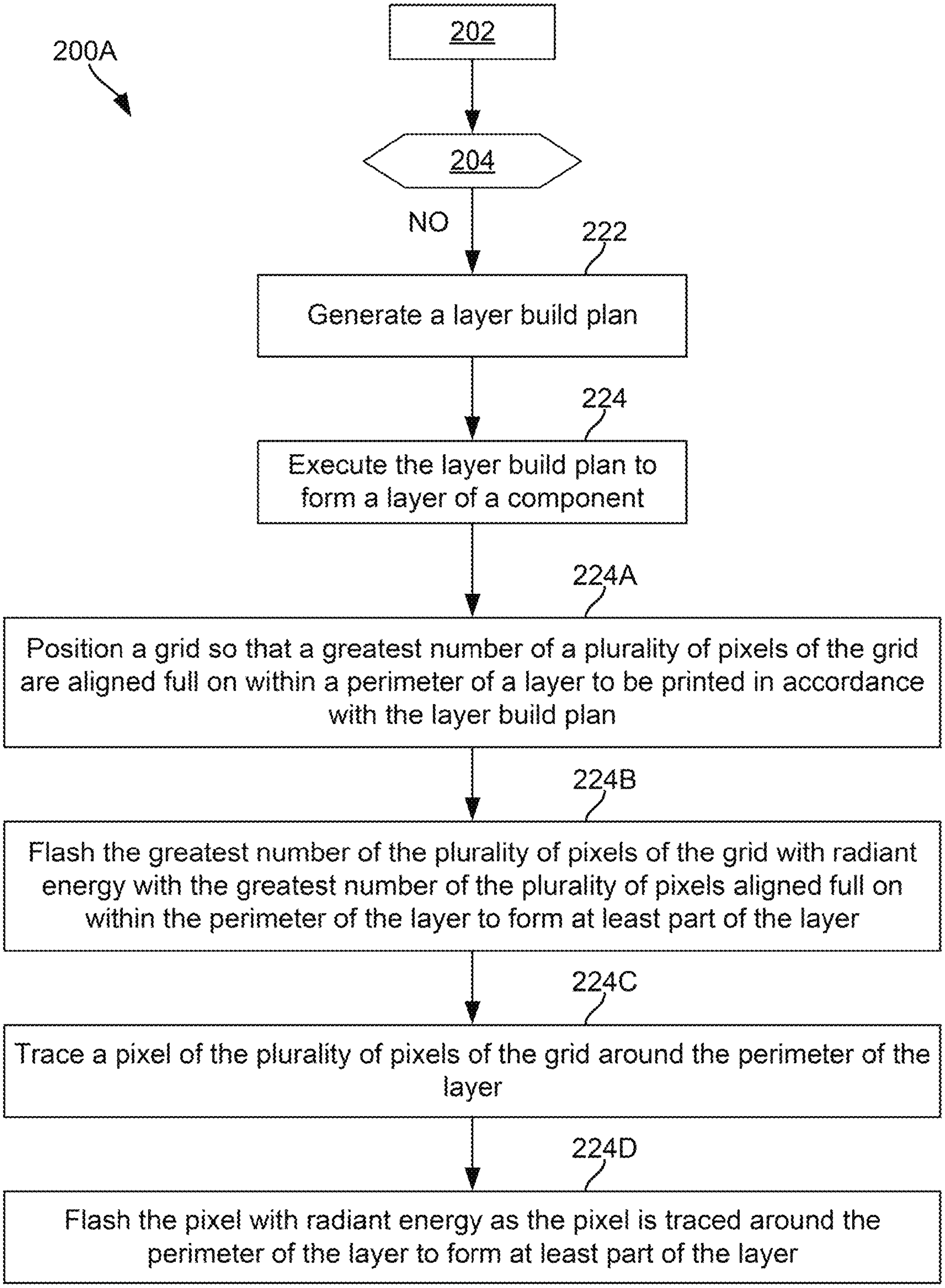
FIG. 18 is a flow diagram for a method of operating an additive manufacturing apparatus in accordance with various aspects of the present disclosure.

At 224, the method 200A includes executing the layer build plan to build up or print the layer. As depicted in FIG. 18, executing the layer build plan at 224 can include performing actions 224A through 224D. In executing the layer build plan 160 at 224, the one or more processors 112 can generate one or more control commands 170 based at least in part on the generated layer build plan 160. The generated one or more control commands 170 can be routed to one or more controllable devices 120 that may actuate, shift, or otherwise move the grid 78 and/or pixels thereof projected by the radiant energy device 20 in accordance with the layer build plan 160.

At 224A, in executing the layer build plan 160 generated at 222, the method 200A includes positioning the grid projected by the additive manufacturing apparatus so that a greatest number of a plurality of pixels of the grid are aligned full on within a perimeter of a layer to be printed by the additive manufacturing apparatus. For instance, the one or more processors 112 can cause the grid 78 projected by the radiant energy device 20 of the additive manufacturing apparatus 10 to shift or remain in place so that a greatest number of a plurality of pixels of the grid 78 are aligned full on within a perimeter 71 of the layer 68 to be printed.

Figure 19:
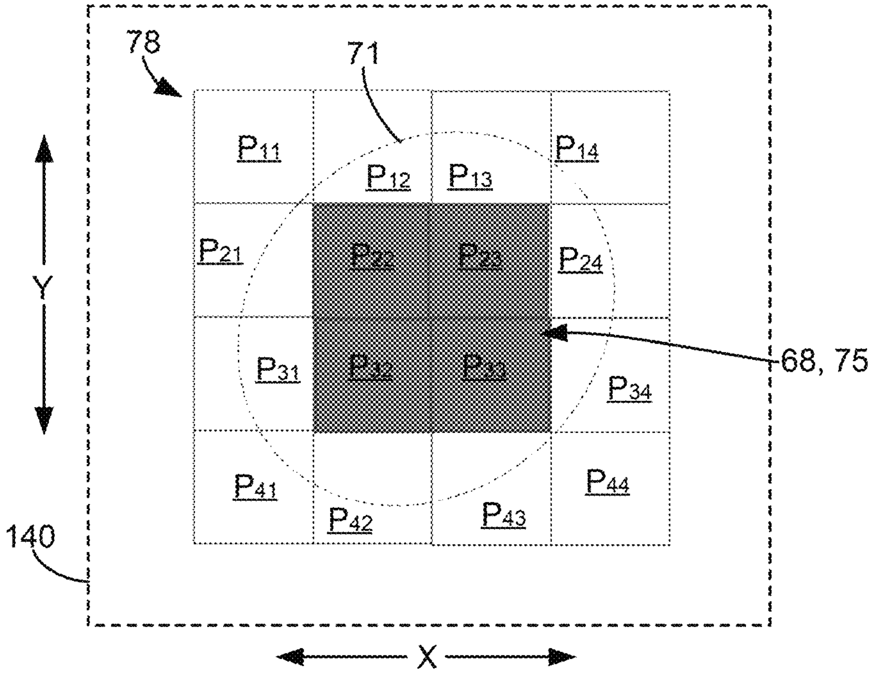
FIGS. 19 through 23 depict an example sequence of printing a layer in accordance with the method of FIG. 18.

By way of example, as depicted in FIG. 19, the one or more processors 112 have positioned the grid 78, either by keeping the grid 78 in place or by shifting the grid 78, so that a greatest number of pixels of the grid 78 are aligned full on within a perimeter 71 of the layer 68. Specifically, for this example implementation, the grid 78 is positioned so that pixels $P_{22}$, $P_{23}$, $P_{32}$, and $P_{33}$ of the grid 78 are aligned full on within the perimeter 71 of the layer 68 to be printed. Pixels $P_{22}$, $P_{23}$, $P_{32}$, and $P_{33}$ collectively form a "bulk flash area" or bulk area to be flashed in a single flash or shot. For this example implementation, in generating the layer build plan 160 at 222, the one or more processors 112 determined that four pixels is the greatest number of pixels that may be aligned full on within the perimeter 71, e.g., based at least in part on the geometry of the layer and the geometry of the pixels of the grid 78. Accordingly, in accordance with the layer build plan 160, the grid 78 is positioned as depicted in FIG. 19. In addition, for this example implementation, the grid 78 is positioned not only so that the most full on pixels are aligned within the perimeter 71 of the layer 68, but also so that the grid 78 is aligned as close as possible to being centered with respect to the layer 68 to be printed. Such instructions can be included as part of the optimization rules 156 used to generate the layer build plan at 222.

At 224B, the method 200A includes flashing the greatest number of the plurality of pixels of the grid with radiant energy with the greatest number of the plurality of pixels aligned full on within the perimeter of the layer to form at least part of the layer. For instance, the one or more processors 112 can cause the radiant energy device 20 to flash the greatest number of the plurality of pixels of the grid 78 with the greatest number of the plurality of pixels aligned full on within the perimeter 71 of the layer 68 to form at least part of the layer 68. As depicted in FIG. 19, pixels $P_{22}$, $P_{23}$, $P_{32}$, and $P_{33}$ are aligned full on within the perimeter 71 of the layer 68 and are flashed with radiant energy by the radiant energy device 20. The flashing of pixels $P_{22}$, $P_{23}$, $P_{32}$, and $P_{33}$ creates a flashed bulk area 75. In creating the flashed bulk area 75, a part of the layer 68 is formed. To complete printing of the layer 68, as will be explained further below, one or more pixels are traced around the perimeter 71 of the layer 68 and flashed. Stated another way, one or more pixels are traced around the flashed bulk area 75 and flashed to complete printing of the layer 68.

At 224C, the method 200A includes tracing a pixel of the plurality of pixels of the grid around the perimeter of the layer. For instance, the one or more processors 112 can cause a pixel of the plurality of pixels to trace around the perimeter 71 of the layer 68. In some implementations, the entire grid 78 can be moved around so as to trace the pixel around the perimeter 71. In other implementations, only one pixel (or a collection of pixels) is moved around so as to trace around the perimeter 71. Further, in some implementations, the pixel is traced around a segment of the perimeter 71. In yet other implementations, the pixel is traced around an entirety of the perimeter 71.

Figure 20:
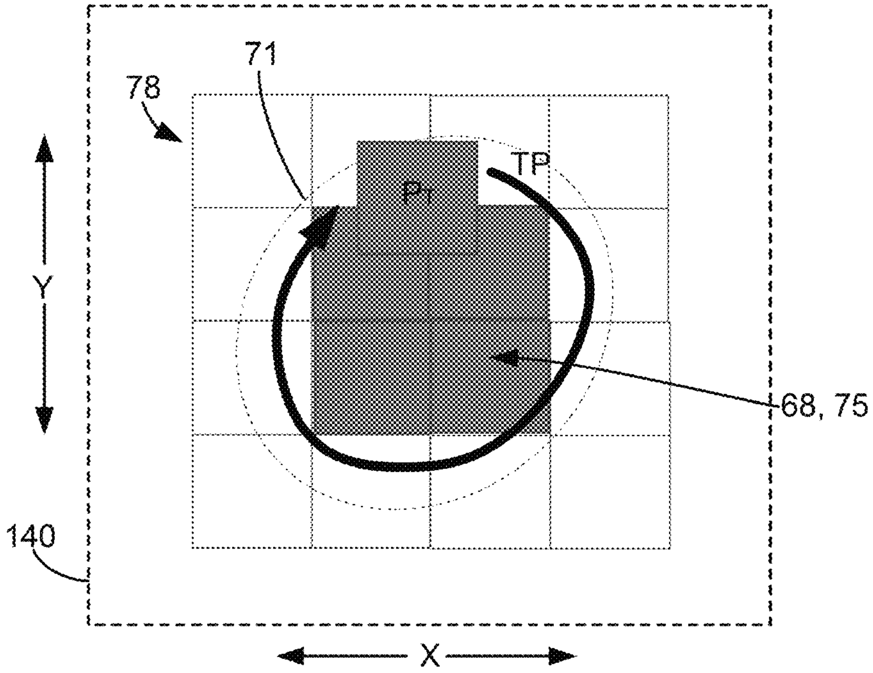

Continuing with the example above, as shown in FIG. 20, a tracing path TP for pixel $P_T$ is depicted. In this example implementation, the pixel $P_T$ is to be traced around the entire perimeter 71 of the layer 68 in accordance with the tracing path TP. Particularly, the pixel $P_T$ is to be traced from its starting position shown in FIG. 20 and is to be traced clockwise around the perimeter 71 along the tracing path TP as shown sequentially in FIGS. 21, 22, and 23. The pixel $P_T$ traces the perimeter 71 and returns to its position shown in FIG. 20. For this implementation, the pixel $P_T$ is traced along the tracing path TP so that half an area of the pixel $P_T$ is positioned outward of the tracing path TP and half the area of the pixel $P_T$ is positioned inward of the tracing path TP. However, in other implementations, pixel $P_T$ can be traced along the tracing path TP in other suitable manners. For instance, the pixel $P_T$ can be traced along the tracing path TP so that a corner of the pixel $P_T$ is traced precisely over the tracing path TP.

Further, for this example implementation, in generating the layer build plan at 222, the tracing path TP is set or determined so that the pixel $P_T$ is positioned at or at least partially outside of the perimeter 71 and so that the pixel $P_T$ overlaps the flashed bulk area at least in part as the pixel $P_T$ traces along the entire the tracing path TP. In some implementations, the tracing path TP is set or determined so that the pixel $P_T$ is traced so that at least eighty percent of the pixel $P_T$ is positioned at or within the perimeter 71 of the layer 68 as the pixel $P_T$ is traced around. In this way, as the pixel $P_T$ is flashed at 224D as explained more fully below, the outer edges or perimeter 71 of the layer 68 can be accurately formed.

At 224D, the method 200A includes flashing the pixel with radiant energy as the pixel is traced around the perimeter of the layer to form at least part of the layer. For instance, the one or more processors 112 can cause the radiant energy device 20 to flash the pixel $P_T$ as the pixel $P_T$ is traced around the perimeter 71 of the layer 68 to form at least part of the layer, e.g., the outer periphery of the layer 68. Continuing with the example noted above, the one or more processors 112 can cause the radiant energy device 20 to flash the pixel $P_T$ as the pixel $P_T$ is traced along the tracing path TP shown in FIG. 20, which corresponds to or has the same general shape as the perimeter 71 of the layer 68.

In some implementations, the one or more processors 112 can cause the pixel $P_T$ to trace around the perimeter 71 of the layer in a continuous motion at 224C. For instance, the one or more processors can cause the pixel $P_T$ trace in a continuous motion along the tracing path TP, with the starting position of the pixel $P_T$ being shown in FIG. 20, and after tracing along the tracing path TP, the ending position of the pixel $P_T$ also being the position of the pixel $P_T$ shown in FIG. 20. In such implementations, at 224D, the one or more processors 112 can cause the radiant energy device 20 to continuously flash the pixel $P_T$ as the pixel $P_T$ is traced in the continuous motion around the perimeter 71 of the layer 68 to form at least part the layer 68.

In yet other implementations, when the one or more processors 112 cause the pixel $P_T$ to trace around the perimeter 71 of the layer in a continuous motion at 224C, at 224D, the one or more processors 112 can cause the radiant energy device 20 to periodically flash the pixel $P_T$ as the pixel $P_T$ is traced in the continuous motion around the perimeter 71 of the layer 68 to form at least part of the layer. For example, the one or more processors 112 can cause the radiant energy device 20 to periodically flash the pixel $P_T$ as the pixel $P_T$ is traced in the continuous motion around the perimeter 71 of the layer 68 every tenth of a second, every half second, every second, every two seconds, etc.

In some other implementations, when the one or more processors 112 cause the pixel $P_T$ to trace around the perimeter 71 of the layer in a continuous motion at 224C, at 224D, the one or more processors 112 can cause the radiant energy device 20 to only flash the pixel $P_T$ as the pixel $P_T$ is traced in the continuous motion around the perimeter 71 of the layer 68 when a target condition is met. For instance, the one or more processors 112 cause the radiant energy device 20 to flash the pixel $P_T$ as the pixel $P_T$ is traced around the perimeter 71 of the layer 68 only when a threshold area of the pixel $P_T$ is positioned within the perimeter 71 of the layer 68. In some implementations, the threshold area of the pixel $P_T$ is fifty percent (50%) of an area of the pixel $P_T$. In other implementations, the threshold area of the pixel $P_T$ is eighty percent (80%) of an area of the pixel $P_T$. In yet other implementations, the threshold area of the pixel $P_T$ is ninety-five percent (95%) of an area of the pixel $P_T$.

In other implementations, when the one or more processors 112 cause the pixel $P_T$ to trace around the perimeter 71 of the layer in a continuous motion at 224C, at 224D, the one or more processors 112 can cause the radiant energy device 20 to only flash the pixel $P_T$ as the pixel $P_T$ is traced in the continuous motion around the perimeter 71 of the layer 68 when the pixel $P_T$ is at a predetermined discrete position. There can be multiple predetermined discrete positions positioned along the tracing path TP. By way of example, as the pixel $P_T$ is being traced around the perimeter 71 of the layer 68 along the tracing path TP, when the pixel $P_T$ is positioned at a first predetermined discrete position, e.g., the position of the pixel $P_T$ in FIG. 20, the pixel $P_T$ is flashed. When the pixel $P_T$ is positioned at a second predetermined discrete position, e.g., the position of the pixel $P_T$ in FIG. 21, the pixel $P_T$ is flashed once again. When the pixel $P_T$ is positioned at a third predetermined discrete position, e.g., the position of the pixel $P_T$ in FIG. 22, the pixel $P_T$ is flashed yet again. Finally, when the pixel $P_T$ is positioned at a fourth predetermined discrete position, e.g., the position of the pixel $P_T$ in FIG. 23, the pixel $P_T$ is flashed again. It will be appreciated that any suitable number of predetermined discrete positions are possible. The one or more processors 112 can determine the predetermined discrete positions based at least in part on the unflashed area between the flashed bulk area 75 and the perimeter 71, among other possible criteria and/or constraints.

In some alternative implementations, at 224C, the one or more processors 112 can cause the pixel $P_T$ to trace around the perimeter 71 of the layer in a discontinuous motion. For instance, the one or more processors can cause the pixel $P_T$ to trace in a discontinuous motion so that the pixel $P_T$ is stopped at predetermined discrete positions along the tracing path TP. In such implementations, at 224D, the one or more processors 112 can cause the radiant energy device 20 to flash the pixel $P_T$ of the grid 78 only when the pixel $P_T$ is stopped at the predetermined discrete positions.

Figure 21:
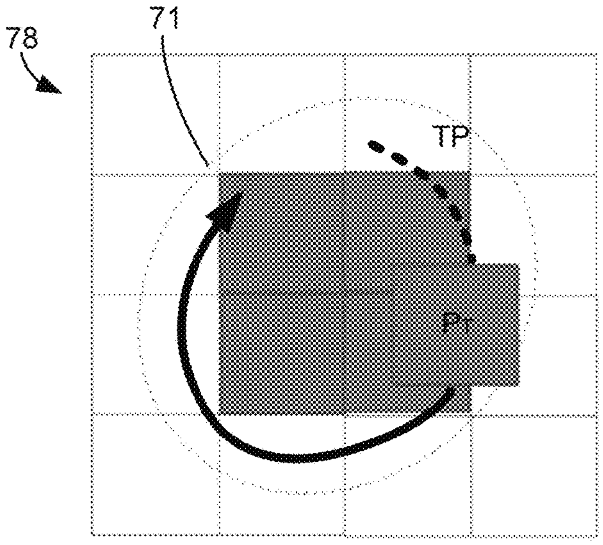
Figure 22:
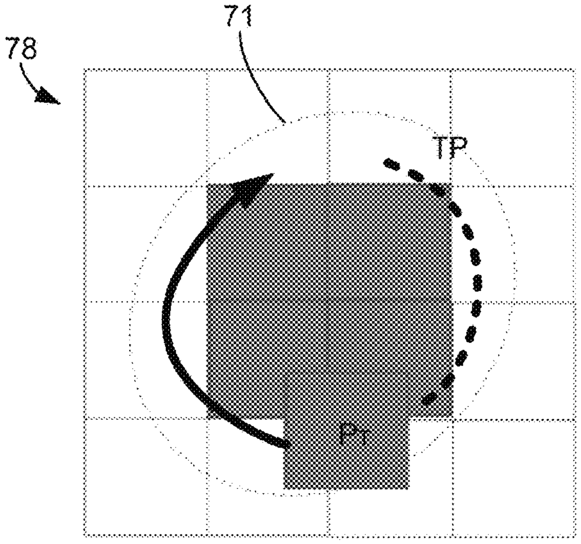
Figure 23:
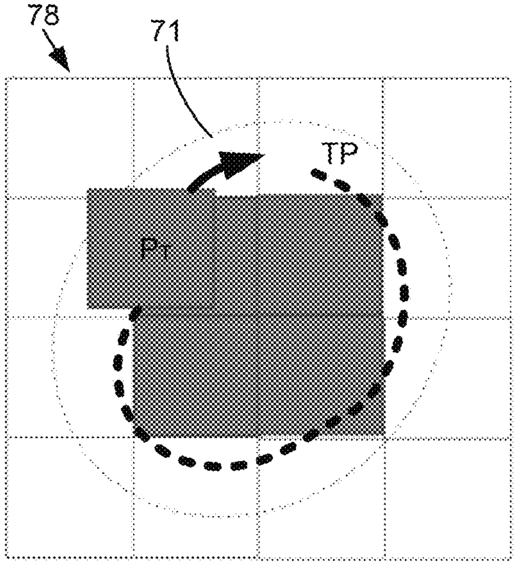

By way of example, the one or more processors 112 can cause the pixel $P_T$ to be moved or traced along the tracing path TP from its starting or first discrete position, e.g., a position of the pixel $P_T$ shown in FIG. 20, to a second discrete position, e.g., a position of the pixel $P_T$ shown in FIG. 21. When positioned at the second discrete position, the pixel $P_T$ can be flashed so as to form a part of the layer 68. Then, the one or more processors 112 can cause the pixel $P_T$ to trace along the tracing path TP from the second discrete position to a third discrete position, e.g., a position of the pixel $P_T$ shown in FIG. 22. When positioned at the third discrete position, the pixel $P_T$ can be flashed so as to form a part of the layer 68. Next, the one or more processors 112 can cause the pixel $P_T$ to trace along the tracing path TP from the third discrete position to a fourth discrete position, e.g., a position of the pixel $P_T$ shown in FIG. 23. When positioned at the fourth discrete position, the pixel $P_T$ can be flashed so as to form a part of the layer 68. Thereafter, the one or more processors 112 can cause the pixel $P_T$ to trace along the tracing path TP from the fourth discrete position to a final or fifth discrete position, e.g., a position of the pixel $P_T$ shown in FIG. 20. When positioned at the fifth discrete position, the pixel $P_T$ can be flashed so as to form a part of the layer 68. Alternatively, the pixel $P_T$ can be flashed initially prior to be being traced around the perimeter 71 of the layer 68 along the tracing path TP. Flashing the pixel $P_T$ only at predetermined discrete positions can allow for intelligent and strategic printing of the layer 68 and may allow for more accurate formation of the geometry of the layer 68.

In yet other implementations, when the one or more processors 112 cause the pixel $P_T$ to trace around the perimeter 71 of the layer in a discontinuous motion at 224C, the one or more processors 112 can cause the radiant energy device 20 to flash the pixel $P_T$ of the grid 78 when the pixel $P_T$ is stopped at the predetermined discrete positions and when the pixel $P_T$ is shifted from one predetermined discrete position to another. In this way, a greater amount of radiant energy can be applied to specific portions of the layer 68.

By way of example, the one or more processors 112 can cause the pixel $P_T$ to be moved or traced along the tracing path TP from its starting or first discrete position, e.g., a position of the pixel $P_T$ shown in FIG. 20, to a second discrete position, e.g., a position of the pixel $P_T$ shown in FIG. 21. As the pixel $P_T$ is traced from the first to the second discrete position the pixel $P_T$ can be flashed so as to form a part of the layer 68. Then, when the pixel $P_T$ is positioned at the second discrete position, the pixel $P_T$ can be flashed so as to form a part of the layer 68. Notably, when the pixel $P_T$ is stopped at the second discrete position, a greater amount of radiant energy can be applied at this location of the layer 68 than the locations between the first and second discrete positions, assuming the flash intensity remains constant. This may, for example, create different material properties at this location of the layer 68 in accordance with a design specification of the component 12. After flashing the pixel $P_T$ at the second discrete position, e.g., for a predetermined time, the one or more processors 112 can cause the pixel $P_T$ to continue onward along the tracing path TP while flashing the pixel $P_T$ between discrete positions and while stopped at the discrete positions in a same or similar manner described above.

While FIGS. 19 through 23 and the accompanying text provide an example sequence of printing a layer using a bulk flash and trace technique in which only a single pixel is traced along a tracing path around the perimeter of a layer, in other implementations, more than one or a set of pixels can be traced along a tracing path around a flashed bulk area or perimeter of the layer. For instance, FIGS. 24 through 28 show an example sequence of printing a layer using a bulk flash and trace technique in which multiple or set of pixels is traced along a tracing path around the flashed bulk area or perimeter of a layer in accordance with the method 200A set forth in FIG. 18.

Figure 24:
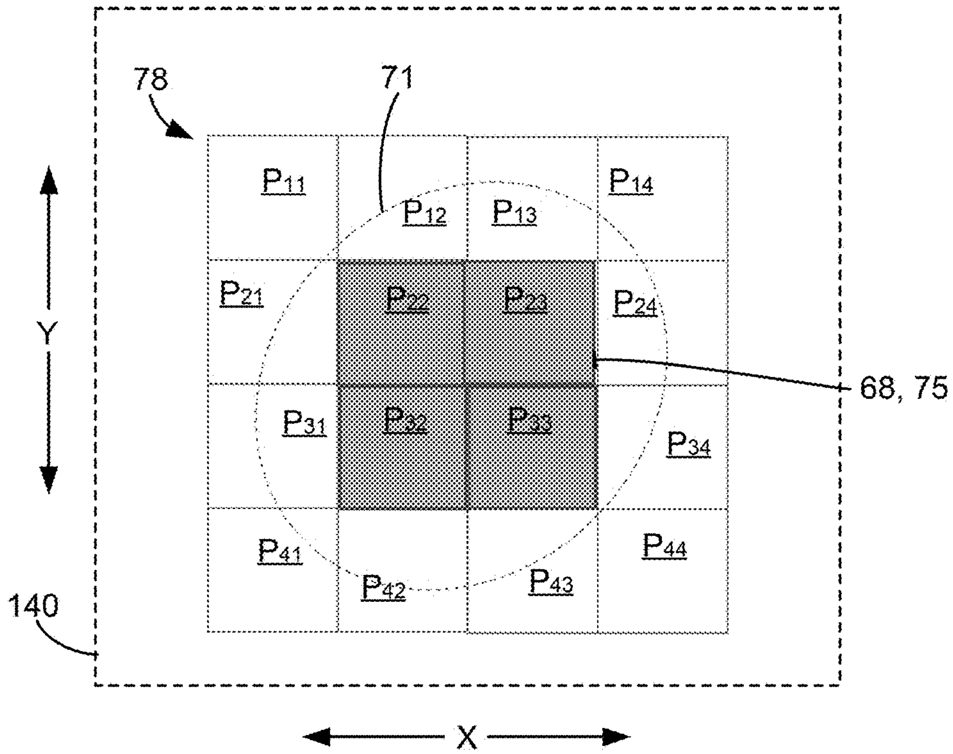
FIGS. 24 through 28 depict another example sequence of printing a layer in accordance with the method of FIG. 18.

By way of example, as depicted in FIG. 24, at 224A the one or more processors 112 have positioned the grid 78, either by keeping the grid 78 in place or by shifting the grid 78, so that a greatest number of pixels of the grid 78 are aligned full on within a perimeter 71 of the layer 68 in accordance with the layer build plan 160 generated at 222. Specifically, for this example implementation, the grid 78 is positioned so that pixels $P_{22}$, $P_{23}$, $P_{32}$, and $P_{33}$ of the grid 78 are aligned full on within the perimeter 71 of the layer 68 to be printed. Pixels $P_{22}$, $P_{23}$, $P_{32}$, and $P_{33}$ collectively form the bulk flash area 75 or bulk area to be flashed in a single flash or shot.

At 224B, the one or more processors 112 can cause the radiant energy device 20 to flash the greatest number of the plurality of pixels of the grid 78 with the greatest number of the plurality of pixels aligned full on within the perimeter 71 of the layer 68 to form at least part of the layer 68. As depicted in FIG. 24, pixels $P_{22}$, $P_{23}$, $P_{32}$, and $P_{33}$ are aligned full on within the perimeter 71 of the layer 68 and are flashed with radiant energy by the radiant energy device 20. The flashing of pixels $P_{22}$, $P_{23}$, $P_{32}$, and $P_{33}$ creates the flashed bulk area 75.

At 224C, the one or more processors 112 can cause a set of pixels to trace around the perimeter 71 along the tracing loop TP. For this example implementation, the set of pixels includes pixels $P_{T1}$, $P_{T2}$, $P_{T3}$, and $P_{T4}$. The set of pixels can be traced or moved along the tracing path TP around the perimeter 71 in any suitable manner, e.g., by moving one or more components of the radiant energy device 20. The tracing path TP can be generated as described above. While four pixels are shown in the set of pixels, it will be appreciated that the set of pixels can include any suitable number of pixels greater than one. Further, for this implementation, the number of pixels within the set of pixels, which is four pixels in this example, is the same number of pixels as the number of pixels flashed at 224B. In alternative implementations, the number of pixels within the set of pixels can be different than the number of pixels flashed at 224B to form the flashed bulk area 75. Moreover, while the pixels of the set of pixels collectively form a rectangular bulk area, it will be appreciated that the pixels of the set of pixels can collectively form other suitable shapes.

At 224D, the one or more processors 112 can cause the set of pixels to be flashed by the radiant energy device 20 as the set of pixels is traced around the perimeter 71 to form at least part of the layer 68. In some implementations, the one or more processors 112 can cause the radiant energy device 20 to flash the set of pixels as the set of pixels is traced around the perimeter 71 of the layer 68 only when a threshold area of a given pixel of the set of pixels is positioned within the perimeter 71 of the layer 68. For example, the threshold area of the given pixel can be set at fifty percent (50%) of an area of the pixel. As another example, the threshold area of the given pixel can be set at eighty percent (80%) of an area of the pixel. As yet another example, the threshold area of the given pixel can be set at ninety-five percent (95%) of an area of the pixel.

By way of example, the set of pixels can be traced along the tracing path TP and flashed is depicted in FIGS. 25 through 28. In some implementations, the set of pixels can be traced in a continuous motion along the tracing path TP. In such implementations, the set of pixels, or a subset thereof, can be flashed continuously as the set of pixels moves along the tracing path TP. The set of pixels can be traced along the tracing path TP at a continuous speed or at multiple speeds (i.e., at least two different speeds). For instance, the set of pixels may be moved at a first speed along a first portion of the tracing path (e.g., a straight portion) and at a second speed along a second portion of the tracing path (e.g., a curved portion), wherein the first speed is a greater speed than the second speed. In some other implementations, the set of pixels, or a subset thereof, can be flashed periodically as the set of pixels moves along the tracing path TP.

In yet other implementations, the set of pixels, or a subset thereof, can be flashed when one or more target conditions are met as the set of pixels moves along the tracing path TP. For instance, as one example, the one or more processors 112 can cause the radiant energy device 20 to flash a given pixel of the set of pixels when a threshold area of the given pixel is positioned within the perimeter 71 of the layer 68. In some implementations, the threshold area of the given pixel can be set at fifty percent (50%) of an area of the given pixel. In other implementations, the threshold area of the pixel can be set at eighty percent (80%) of an area of the given pixel. In yet other implementations, the threshold area of the given pixel can be set at ninety-five percent (95%) of an area of the given pixel.

In some further implementations, the set of pixels can be traced collectively along the tracing path TP in a discontinuous motion. For instance, the one or more processors 112 can cause the set of pixels to stop at one or more predetermined discrete positions. In such implementations, the one or more processors 112 can cause the radiant energy device 20 to flash the set of pixels, or a subset thereof, when the set of pixels are stopped at the predetermined discrete positions. In some instances, the set of pixels can be flashed at only the predetermined discrete positions. In other instances, the set of pixels can be flashed at the predetermined discrete positions and when the set of pixels is shifted from one predetermined discrete position to another.

Figure 25:
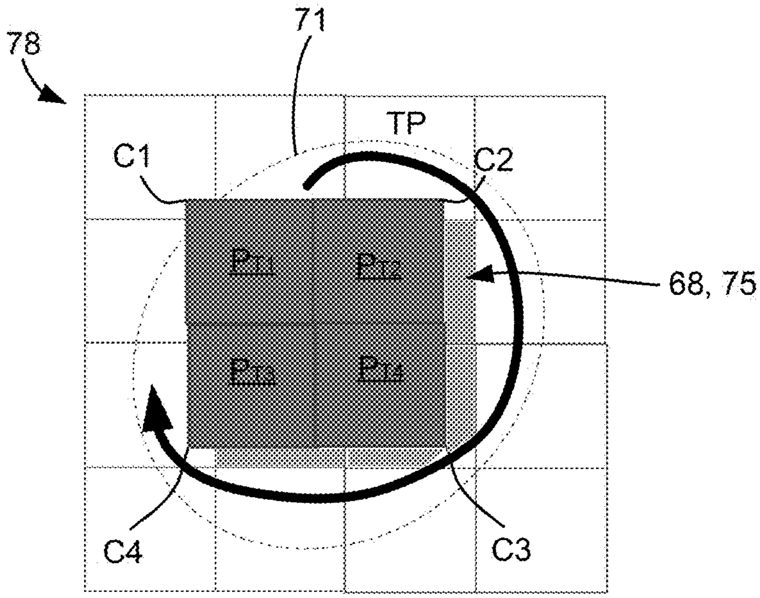
Figure 26:
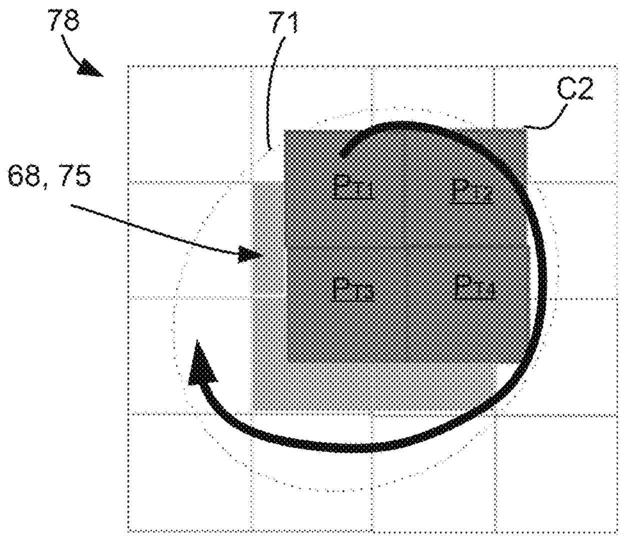
Figure 27:
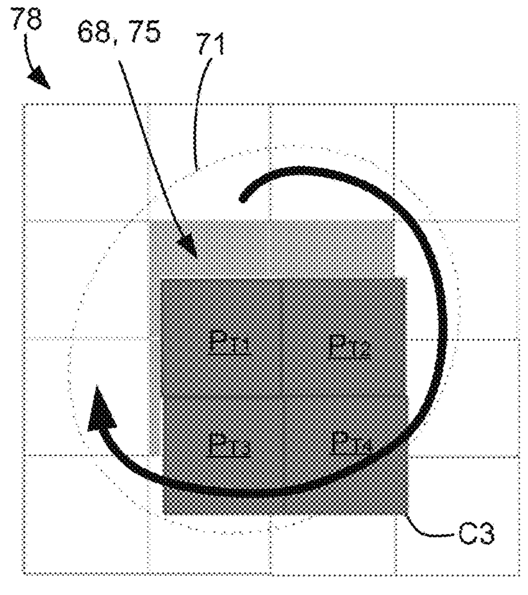
Figure 28:
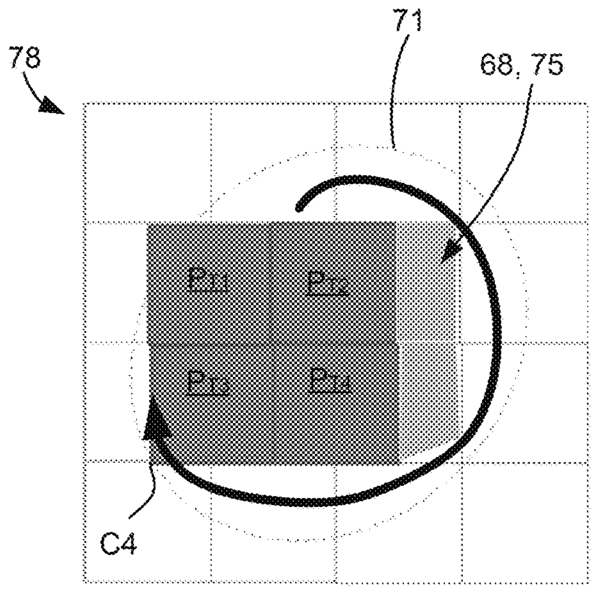

In some implementations, the set of pixels collectively have or define at least four outer corners. For instance, as shown in FIG. 25, the set of pixels defines a first outer corner C1, a second outer corner C2, a third outer corner C3, and a fourth outer corner C4. In such implementations, when the one or more processors 112 cause the set of pixels to trace around the perimeter 71 of the layer 68, the set of pixels are traced so that each one of the four outer corners is positioned at or outside of the perimeter 71 of the layer 68, not necessarily simultaneously, at least at one discrete position along the tracing path TP. For instance, in FIG. 25, the first outer corner C1 is shown positioned outside of the perimeter 71 of the layer 68. In FIG. 26, the second outer corner C2 is shown positioned outside of the perimeter 71 of the layer 68. In FIG. 27, the third outer corner C3 is shown positioned outside of the perimeter 71 of the layer 68. In FIG. 28, the fourth outer corner C4 is shown positioned outside of the perimeter 71 of the layer 68.

In some implementations, the set of pixels are traced so that each corner is the sole one of the four corners that is positioned at or outside of the perimeter 71 at least at one particular position along the tracing path TP. For instance, in FIG. 25, the set of pixels are positioned along the tracing path TP so that the first outer corner C1 is the sole corner positioned outside of the perimeter 71 of the layer 68. In FIG. 26, the set of pixels are positioned along the tracing path TP so that the second outer corner C2 is the sole corner positioned outside of the perimeter 71 of the layer 68. In FIG. 27, the set of pixels are positioned along the tracing path TP so that the third outer corner C3 is the sole corner positioned outside of the perimeter 71 of the layer 68. In FIG. 28, the set of pixels are positioned along the tracing path TP so that the fourth outer corner C4 is the sole corner positioned outside of the perimeter 71 of the layer 68.

Figure 29:
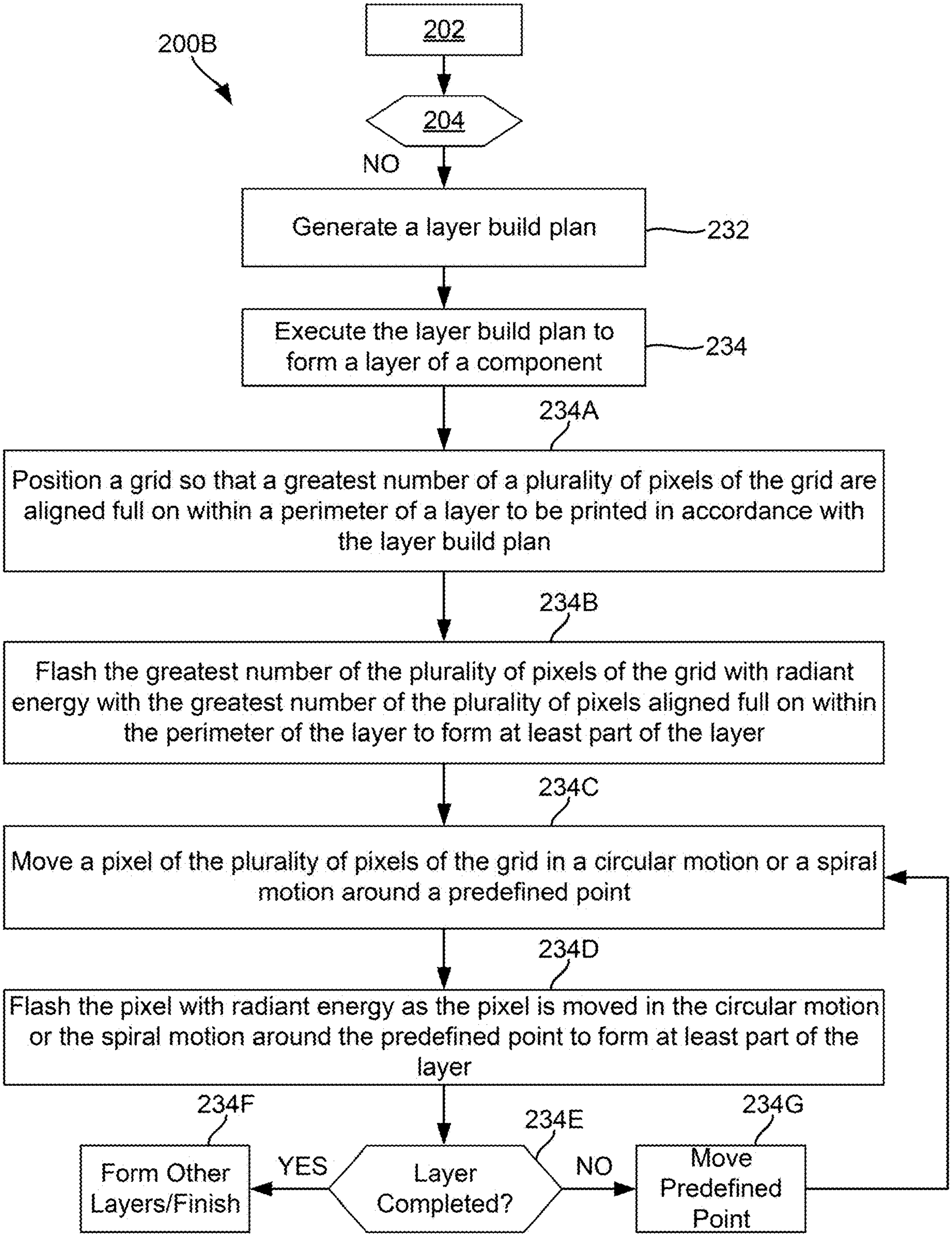
FIG. 29 is a flow diagram for a method of operating an additive manufacturing apparatus in accordance with various aspects of the present disclosure.
Figure 30:
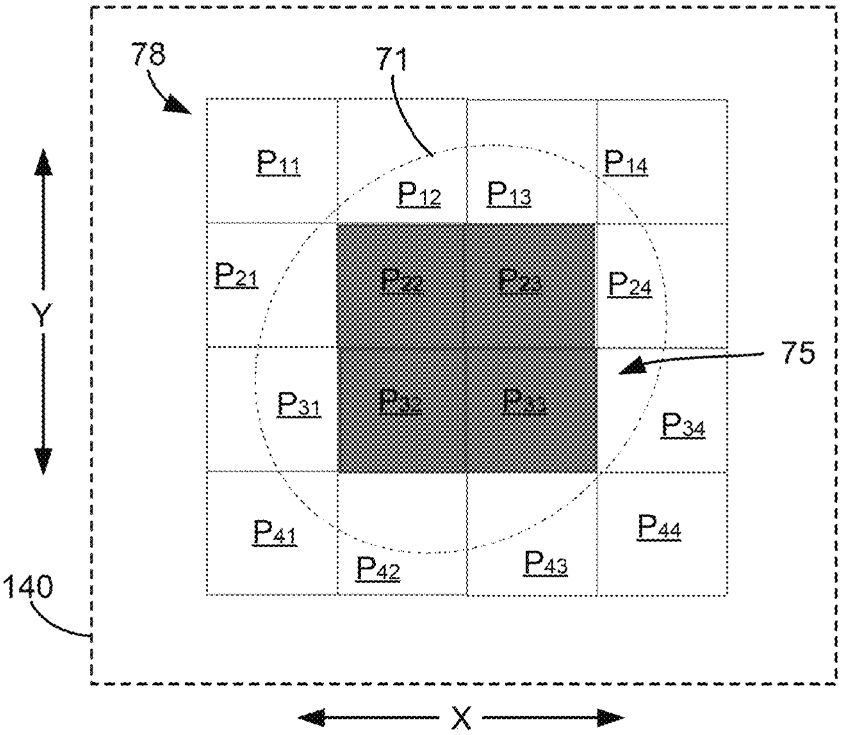
FIGS. 30 and 31 depict an example sequence of printing a layer in accordance with the method of FIG. 29.
Figure 32:
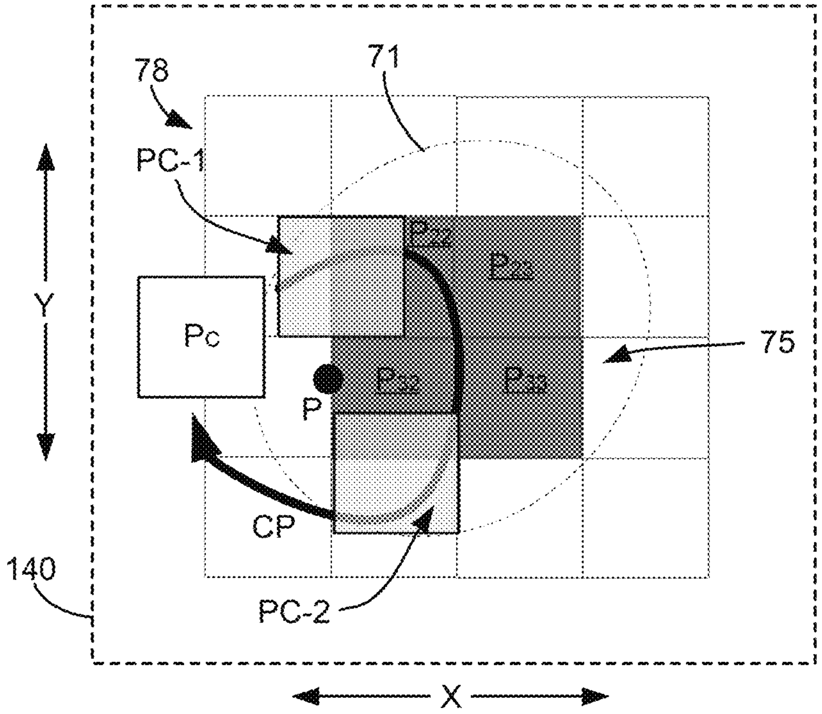
FIGS. 32 and 33 depict another example sequence of printing a layer in accordance with the method of FIG. 29.
Figure 33:
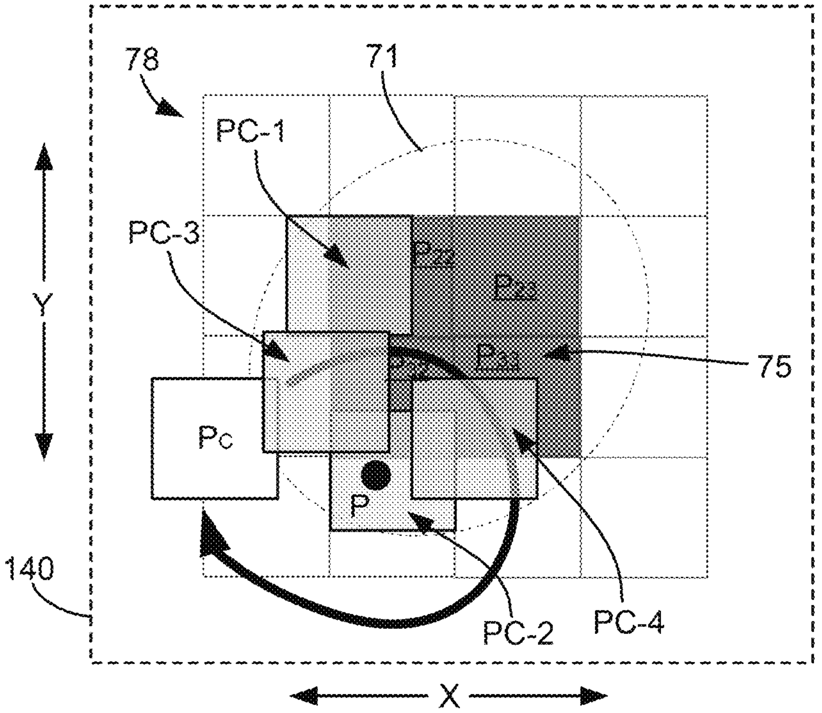

In accordance with another example implementation, a layer of a component can be printed by the apparatus 10 using a bulk flash and circle or spiral technique. With reference now to FIGS. 1, 2, and 29 through 33, FIG. 29 is a flow diagram for a method 200B in which a bulk flash and circle or spiral technique is used instead of the approach set forth in 214 through 220 of the method 200 depicted FIG. 5. FIG. 30 depicts an example manner in which one or more pixels can be spiraled and flashed in accordance with the method 200B set forth in FIG. 29. FIGS. 32 and 33 depict an example in which one or more pixels can be circled and flashed in accordance with the method 200B set forth in FIG. 29.

After receiving data at 202 and determining that the layer to be printed cannot be printed in a single flash or shot using the grid of fixed spacing projected by the additive manufacturing apparatus at 204 as provided above with reference to the method 200 of FIG. 5, at 232, the method 200B includes generating a layer build plan. For instance, the one or more processors 112 of the computing system 110 can generate the layer build plan 160 based at least in part on a geometry of the layer to be printed as derived from the received layer data 152, the geometry of the grid derived from the received grid data 154, and/or one or more optimization rules 156. The layer build plan 160 can indicate instructions for printing the layer in a bulk flash and spiral or circle technique. Particularly, the layer build plan 160 can indicate instructions for positioning the grid so that a greatest number of a plurality of pixels of the grid 78 are aligned "full on" within a perimeter 71 of the layer 68 to be printed; flashing the greatest number of the plurality of pixels of the grid 78 with radiant energy with the greatest number of the plurality of pixels aligned full on within the perimeter 71 of the layer 68 to form at least part of the layer 68; moving a pixel of the plurality of pixels of the grid 78 in a circular motion or a spiral motion around a predefined point; and flashing the pixel with radiant energy as the pixel is moved in the circular motion or the spiral motion around the predefined point P to form at least part of the layer 68. The layer build plan 160 can also indicate the flash intensity at which the various pixels of the grid 78 are to be flashed.

The one or more optimization rules 156 considered by the one or more processors 112 in generating the layer build plan 160 at 232 can include, without limitation, rules for determining the spiral path or circular path of the pixel or collection of pixels to be moved around the predefined point, a number of times the pixel or collection of pixels are to be moved around the predefined point, a number of pixels to be moved around the predefined point, the number and location of the predefined points, as well as other optimization rules.

At 234, the method 200B includes executing the layer build plan to build up or print the layer. As depicted in FIG. 29, executing the layer build plan at 234 can include performing actions 234A through 234D. In executing the layer build plan 160 at 234, the one or more processors 112 can generate one or more control commands 170 based at least in part on the generated layer build plan 160. The generated one or more control commands 170 can be routed to one or more controllable devices 120 that may actuate, shift, or otherwise move the grid and/or pixels thereof projected by the radiant energy device 20 in accordance with the layer build plan 160.

At 234A, in executing the layer build plan 160 generated at 232, the method 200B includes positioning the grid projected by an additive manufacturing apparatus so that a greatest number of a plurality of pixels of the grid are aligned full on within a perimeter of a layer to be printed by the additive manufacturing apparatus. For instance, the one or more processors 112 can cause the grid 78 projected by the radiant energy device 20 of the additive manufacturing apparatus 10 to shift or remain in place so that a greatest number of a plurality of pixels of the grid 78 are aligned full on within a perimeter 71 of the layer 68 to be printed.

By way of example, as depicted in FIG. 30, the one or more processors 112 have positioned the grid 78, either by keeping the grid 78 in place or by shifting the grid 78, so that a greatest number of pixels of the grid 78 are aligned full on within a perimeter 71 of the layer 68. Specifically, for this example implementation, the grid 78 is positioned so that pixels $P_{22}$, $P_{23}$, $P_{32}$, and $P_{33}$ of the grid 78 are aligned full on within the perimeter 71 of the layer 68 to be printed. Pixels $P_{22}$, $P_{23}$, $P_{32}$, and $P_{33}$ collectively form a "bulk area" to be flashed in a single flash or shot. For this example implementation, in generating the layer build plan 160 at 232, the one or more processors 112 determined that four pixels is the greatest number of pixels that may be aligned full on within the perimeter 71, e.g., based at least in part on the geometry of the layer and the geometry of the pixels of the grid. Accordingly, in accordance with the layer build plan 160, the grid 78 is positioned as depicted in FIG. 30. In addition, for this example implementation, the grid 78 is positioned not only so that the most full on pixels are aligned within the perimeter 71 of the layer 68, but also so that the grid 78 is aligned as close as possible to being centered with respect to the layer 68 to be printed. Such instructions can be included as part of the optimization rules 156 used to generate the layer build plan at 232.

At 234B, the method 200B includes flashing the greatest number of the plurality of pixels of the grid with radiant energy with the greatest number of the plurality of pixels aligned full on within the perimeter of the layer to form at least part of the layer. For instance, the one or more processors 112 can cause the radiant energy device 20 to flash the greatest number of the plurality of pixels of the grid 78 with the greatest number of the plurality of pixels aligned full on within the perimeter 71 of the layer 68 to form at least part of the layer 68. As depicted in FIG. 30, pixels $P_{22}$, $P_{23}$, $P_{32}$, and $P_{33}$ are aligned full on within the perimeter 71 of the layer 68 to be built and are flashed with radiant energy by the radiant energy device 20. The flashing of pixels $P_{22}$, $P_{23}$, $P_{32}$, and $P_{33}$ creates a flashed bulk area 75. To complete printing of the layer 68, as will be explained further below, one or more pixels are moved around one or more predefined points in a circular or spiral motion and flashed.

At 234C, the method 200B includes moving a pixel of the plurality of pixels of the grid in a circular motion or a spiral motion around a predefined point. For instance, the one or more processors 112 can cause a pixel of the plurality of pixels of the grid 78 to be moved in a circular motion or a spiral motion around a predefined point. In some implementations, the entire grid 78 can be moved around so as to move the pixel around the predefined point. In other implementations, only the pixel is moved around the predefined point without moving the entire grid 78. Further, in some implementations, the pixel can be one pixel of a set of pixels. In this regard, a set of pixels can be moved in a circular motion or a spiral motion around a predefined point. In some implementations, the pixel can be moved in a circular motion or a spiral motion around a predefined point in a continuous motion. In other implementations, the pixel can be moved in a circular motion or a spiral motion around a predefined point in a discontinuous motion, e.g., stopping at predetermined discrete positions.

Figure 31:
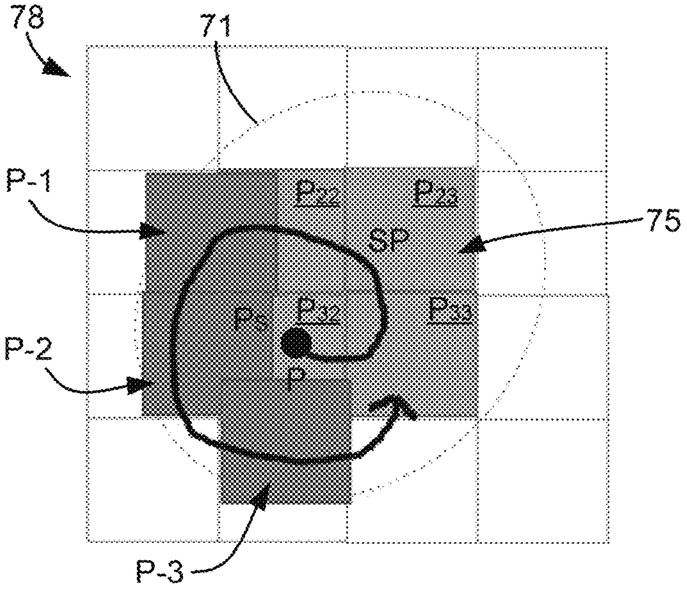

By way of example, as shown in FIG. 31, a spiral path SP for pixel $P_S$ is depicted. In this example implementation, the pixel $P_S$ is to be moved around a predefined point P in accordance with the spiral path SP. Particularly, the pixel $P_S$ is to be moved from its starting position shown in FIG. 31 counterclockwise around the predefined point P along the spiral path SP. In this regard, the pixel $P_S$ can be moved in a spiral motion. In other implementations, the pixel $P_S$ may be moved in a clockwise direction around the predefined point P. For this implementation, the predefined point P is depicted positioned within the perimeter 71 of the layer 68 in FIG. 31. In other implementations, the predefined point P can be positioned along or outside of the perimeter 71 of the layer 68.

At 234D, the method 200B includes flashing the pixel with radiant energy as the pixel is moved in the circular motion or the spiral motion around the predefined point to form at least part of the layer. For instance, the one or more processors 112 can cause the radiant energy device 20 to flash the pixel $P_S$ as the pixel $P_S$ is moved in the circular motion or the spiral motion around the predefined point P.

In some implementations, at 234D, the one or more processors 112 can cause the radiant energy device 20 to flash the pixel $P_S$ as the pixel $P_S$ is moved in the spiral motion around the predefined point P. In some example implementations, the one or more processors 112 can cause the radiant energy device 20 to flash the pixel $P_S$ continuously as the pixel $P_S$ is moved in the spiral motion around the predefined point P. In some example implementations, the one or more processors 112 can cause the radiant energy device 20 to flash the pixel $P_S$ as the pixel $P_S$ is moved in the spiral motion around the predefined point P only when the pixel $P_S$ is moved to predetermined discrete positions.

In yet other example implementations, the one or more processors 112 can cause the radiant energy device 20 to flash the pixel $P_S$ as the pixel $P_S$ is moved in the spiral motion around the predefined point P only when one or more target conditions are met. For instance, in one example implementation, the one or more processors 112 can cause the radiant energy device 20 to flash the pixel $P_S$ as the pixel $P_S$ is moved in the spiral motion around the predefined point P only when a threshold area of the pixel $P_S$ is positioned within the perimeter 71 of the layer 68. As one example, the threshold area of the pixel $P_S$ can be set at fifty percent (50%) of an area of the pixel $P_S$. As yet another example, the threshold area of the pixel $P_S$ can be set at eighty percent (80%) of an area of the pixel $P_S$. As a further example, the threshold area of the pixel $P_S$ can be set at ninety-five percent (95%) of an area of the pixel $P_S$. Flashing a pixel only when a threshold area of the pixel is within a perimeter of the layer to be printed can produce more accurate printing results, especially at the perimeter of the layer. Further, flash intensity or flash time may be modulated as a function of pixel area to enhance printing, e.g., to blend a layer or edge.

In another example implementation, at 234D, the one or more processors 112 can cause the radiant energy device 20 to flash the pixel $P_S$ as the pixel $P_S$ is moved in the spiral motion around the predefined point P only when a threshold area of the pixel $P_S$ is positioned within the perimeter 71 of the layer 68 and when less than an overlap threshold area of the pixel $P_S$ overlaps the flashed bulk area. As one example, the overlap threshold area of the pixel $P_S$ can be set at fifty percent (50%) of an area of the pixel $P_S$. As yet another example, the overlap threshold area of the pixel $P_S$ can be set at eighty percent (80%) of an area of the pixel $P_S$. As a further example, the threshold area of the pixel $P_S$ can be set at ninety-five percent (95%) of an area of the pixel $P_S$. Flashing a pixel only when a threshold area of the pixel is within a perimeter of the layer to be printed and when less than an overlap threshold area of the pixel $P_S$ overlaps the flashed bulk area can produce more accurate printing results and can prevent overlap flashing, which may prevent print through or uneven material properties.

By way of example, with specific reference to FIG. 31, the flashed bulk area 75 created by flashing pixels $P_{22}$, $P_{23}$, $P_{32}$, and $P_{33}$ at 224B is shown. In this example implementation, the threshold area is set at eighty percent (80%) and the overlap threshold area is set at fifty percent (50%). When the pixel $P_S$ is moved from its initial position (shown in dashed lines in FIG. 31; pixel $P_S$ is aligned with pixel $P_{32}$ in its initial position in FIG. 31) in the spiral motion along the spiral path SP around the predefined point P and generally overlaps pixel $P_{33}$, the pixel $P_S$ is not flashed as not less than the overlap threshold area of the pixel $P_S$ overlaps the flashed bulk area 75. Indeed, the entirety or nearly the entirety of pixel $P_S$ would overlap the flashed bulk area 75 in such a position. The same is true when pixel $P_S$ generally overlaps pixel $P_{23}$ and then pixel $P_{22}$ as pixel $P_S$ is moved along the spiral path SP. When the pixel $P_S$ is moved to position P-1, the one or more target conditions required for flashing pixel $P_S$ are met because: 1) a threshold area of the pixel $P_S$ is positioned within the perimeter 71 of the layer 68 as eighty percent (80%) of the pixel $P_S$ is within the perimeter 71; and 2) less than an overlap threshold area of the pixel $P_S$ overlaps the flashed bulk area as less than fifty percent (50%) of the pixel $P_S$ overlaps the flashed bulk area 75. Accordingly, pixel $P_S$ is flashed at position P-1. The target conditions are likewise met when pixel $P_S$ is positioned at position P-2, and then at position P-3.

In some other implementations, at 234D, the one or more processors 112 can cause the radiant energy device 20 to flash the pixel $P_S$ as the pixel $P_S$ is moved in a circular motion around the predefined point P. In some example implementations, for instance, the one or more processors 112 can cause the radiant energy device 20 to flash the pixel $P_S$ continuously as the pixel $P_S$ is moved in the circular motion around the predefined point P. In some example implementations, the one or more processors 112 can cause the radiant energy device 20 to flash the pixel $P_S$ as the pixel $P_S$ is moved in the circular motion around the predefined point P only when the pixel $P_S$ is moved to predetermined discrete positions.

As noted above, at 234C, the method 200B can include moving a pixel of the plurality of pixels of the grid in a circular motion around a predefined point. By way of example, as shown in FIG. 32, a circular path CP for pixel $P_C$ is depicted. In this example implementation, the pixel $P_C$ is to be moved around a predefined point P in accordance with the circular path CP. Particularly, the pixel $P_C$ is to be moved from its starting position shown in FIG. 32 clockwise around the predefined point P along the circular path CP. In this regard, the pixel $P_C$ can be moved in a circular motion. In other implementations, the pixel $P_C$ may be moved in a counterclockwise direction around the predefined point P. For this implementation, the predefined point P is depicted positioned within the perimeter 71 of the layer 68 in FIG. 32.

In other implementations, the predefined point P can be positioned along or outside of the perimeter 71 of the layer 68. In some implementations, the build plan can be generated so that, at any given point, the one or more processors 112 can cause the radiant energy device 20 to perform as many simultaneous pixel flashes as possible, e.g., to perform the flashed bulk area with one or more pixels of the grid positioned at positions P-1, P-2, P-3. This may further optimize build time.

The pixel $P_C$ can be flashed with radiant energy at 234D of the method 200B as the pixel $P_C$ is moved in the circular motion around the predefined point P to form at least part of the layer 68. For instance, the one or more processors 112 can cause the radiant energy device 20 to flash the pixel $P_C$ as the pixel $P_C$ is moved in the circular motion around the predefined point P. In some implementations, at 234D, the one or more processors 112 can cause the radiant energy device 20 to flash the pixel $P_C$ continuously as the pixel $P_C$ is moved in the circular motion around the predefined point P. In some example implementations, the one or more processors 112 can cause the radiant energy device 20 to flash the pixel $P_C$ as the pixel $P_C$ is moved in the circular motion around the predefined point P only when the pixel $P_C$ is moved to predetermined discrete positions.

In yet other example implementations, the one or more processors 112 can cause the radiant energy device 20 to flash the pixel $P_C$ as the pixel $P_C$ is moved in the circular motion around the predefined point P only when one or more target conditions are met. For instance, in one example implementation, the one or more processors 112 can cause the radiant energy device 20 to flash the pixel $P_C$ as the pixel $P_C$ is moved in the circular motion around the predefined point P only when a threshold area of the pixel $P_C$ is positioned within the perimeter 71 of the layer 68. As one example, the threshold area of the pixel $P_C$ can be set at fifty percent (50%) of an area of the pixel $P_S$. As yet another example, the threshold area of the pixel $P_C$ can be set at eighty percent (80%) of an area of the pixel $P_S$. As a further example, the threshold area of the pixel $P_C$ can be set at ninety-five percent (95%) of an area of the pixel $P_C$. Flashing a pixel only when a threshold area of the pixel is within a perimeter of the layer to be printed can produce more accurate printing results, especially at or along the perimeter of the layer.

In another example implementation, at 234D, the one or more processors 112 can cause the radiant energy device 20 to flash the pixel $P_C$ as the pixel $P_C$ is moved in the circular motion around the predefined point P only when a threshold area of the pixel $P_C$ is positioned within the perimeter 71 of the layer 68 and when less than an overlap threshold area of the pixel $P_C$ overlaps the flashed bulk area 75. As one example, the overlap threshold area of the pixel $P_C$ can be set at fifty percent (50%) of an area of the pixel $P_C$. As yet another example, the overlap threshold area of the pixel $P_C$ can be set at eighty percent (80%) of an area of the pixel $P_C$. As a further example, the threshold area of the pixel $P_C$ can be set at ninety-five percent (95%) of an area of the pixel $P_C$. Flashing a pixel only when a threshold area of the pixel is within a perimeter of the layer to be printed and when less than an overlap threshold area of the pixel $P_C$ overlaps the flashed bulk area 75 can produce more accurate printing results and can prevent overlap flashing, which may prevent print through or uneven material properties.

By way of example, with specific reference to FIG. 32, the flashed bulk area 75 created by flashing pixels $P_{22}$, $P_{23}$, $P_{32}$, and $P_{33}$ at 224B is shown. In this example implementation, the threshold area is set at eighty percent (80%) and the overlap threshold area is set at eighty percent (80%). When the pixel $P_C$ is moved from its initial position along the circular path CP around the predefined point P and reaches position PC-1, the one or more target conditions required for flashing pixel $P_C$ are met because: 1) a threshold area of the pixel $P_C$ is positioned within the perimeter 71 of the layer 68 as eighty percent (80%) of the pixel $P_C$ is within the perimeter 71; and 2) less than an overlap threshold area of the pixel $P_S$ overlaps the flashed bulk 75 area as less than eighty percent (80%) of the pixel $P_C$ overlaps the flashed bulk area 75. Accordingly, pixel $P_C$ is flashed at position PC-1. The target conditions are likewise met when pixel $P_C$ is positioned at position PC-2. In some embodiments, the build plan can be generated such that pixels $P_{22}$, $P_{23}$, $P_{32}$, and $P_{33}$ are flashed simultaneously with pixel $P_C$ at one or more positions PC-1, PC-2, PC-3, PC-4 rather than serially. In other embodiments, two or more pixels of the grid 78 can be flashed simultaneously at positions PC-1, PC-2, PC-3, PC-4 to flash these areas simultaneously.

After the pixel $P_C$ completes one or more circular motions along the circular path CP and is flashed in accordance with the one or more target conditions, when the layer 68 is complete as determined at 234E, at 234F, the next layer may be formed in accordance with the method 200B or printing may be completed if the present layer is the last layer to be formed. When the present layer is not completed as determined at 234E, the one or more processors 112 cause the predefined point P to be moved to another predetermined location and 234C and 234D of the method 200B are iterated. For instance, as shown in FIG. 33, the predefined point P is moved to a location that is different than its location depicted in FIG. 32. The predefined point P can be moved strategically based on the geometry of the layer 68 to be printed, for example.

As depicted in FIG. 33, when the pixel $P_C$ is moved from its initial position along the circular path CP around the predefined point P and reaches position PC-3, the one or more target conditions required for flashing pixel $P_C$ are met because: 1) a threshold area of the pixel $P_C$ is positioned within the perimeter 71 of the layer 68 as eighty percent (80%) of the pixel $P_C$ is within the perimeter 71; and 2) less than an overlap threshold area of the pixel $P_S$ overlaps the flashed bulk area 75 as less than eighty percent (80%) of the pixel $P_C$ overlaps the flashed bulk area 75. Accordingly, pixel $P_C$ is flashed at position PC-3. The target conditions are likewise met when pixel $P_C$ is positioned at position PC-4. Thus, with the second iteration of 234C and 234D of the method 200B, the flashed bulk area 75 and flashed areas corresponding to positions PC-1, PC-2, PC-3, and PC-4 begin to form the layer 68 to shape. It will be appreciated that this process may iterate for the present layer 68 so as to form the layer 68 to specification. It will further be appreciated that the predefined point associated with the spiral motion implementation may be moved and the process may iterate as set forth in FIG. 29 until the layer 68 is completed.

In accordance with another example implementation, a layer of a component can be printed by the apparatus 10 using a bulk flash and trace, spiral, and/or circle technique in conjunction with a tilt technique. Particularly, in execution of the trace and flash technique set forth in 224C, 224D of the method 200A of FIG. 18 and/or in execution of the circulation motion or spiral motion and flash technique set forth in 234C, 234D of the method 200B of FIG. 29, the pixel being moved and flashed can also be tilted with respect to a horizontal plane that is orthogonal to the Z-axis direction. The tilted pixel technique can provide enhanced edge construction of a layer 68 of a component, especially for components having one or more curved surfaces.

Figure 33A:
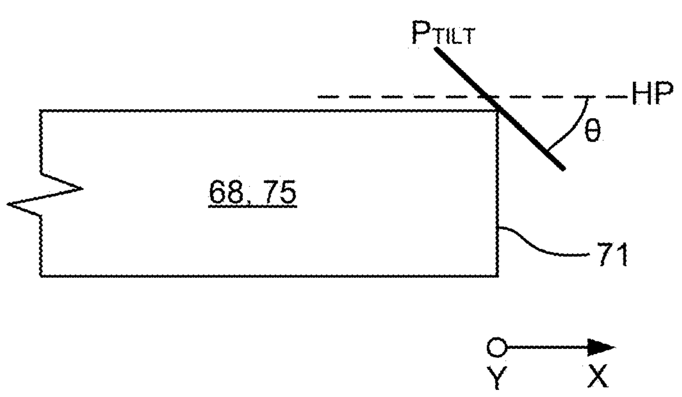
FIG. 33A is a schematic view of a pixel being tilted to flash a layer in accordance with various aspects of the present disclosure.

With reference now to FIG. 33A in addition to FIGS. 1A and 1B, 2, and 18 through 33, FIG. 33A provides a schematic view of a pixel being tilted while also being traced, circled, or spiraled to flash a layer 68. As depicted, a pixel $P_{TILT}$ of a grid is shown tilted with respect to a horizontal plane HP. The pixel $P_{TILT}$ can be tilted by adjusting the optics 70 (e.g., by adjusting a lens) and/or by moving the image forming apparatus 64 (e.g., with an actuator), for example. In some embodiments, the pixel $P_{TILT}$ is tilted so that the pixel $P_{TILT}$ is tangentially aligned with an edge of a layer 68 or the flashed bulk area 75, e.g., as shown in FIG. 33A. In other embodiments, the pixel $P_{TILT}$ is tilted by a tilt angle θ. In such embodiments, the tilt angle θ can be greater than 0° and equal to or less than 90°. In other embodiments, the tilt angle θ can be greater than 200 and equal to or less than 70°.

In some implementations, the pixel $P_{TILT}$ can be tilted as the pixel $P_{TILT}$ is traced around the perimeter 71, e.g., at 224C. The pixel $P_{TILT}$ can be flashed at 224D continuously along the perimeter 71, periodically at predetermined discrete positions along the perimeter 71, periodically according to a time interval, etc. In other implementations, the pixel $P_{TILT}$ can be tilted as the pixel $P_{TILT}$ is moved in a circular motion or spiral motion around a predefined point, e.g., at 234C. The pixel $P_{TILT}$ can be flashed at 234D continuously, periodically, and/or according to any of the criteria previously noted.

In accordance with another example implementation of the present disclosure, a method can include moving a pixel "like a pen" to completely form a layer or form the layer after a flashed bulk layer is formed. In some implementations, the method can include flashing one or more pixels of a plurality of pixels of a grid with radiant energy to form a flashed bulk area of the layer; moving at least one pixel of the plurality of pixels around the flashed bulk area; and flashing the at least one pixel with radiant energy as the at least one pixel is moved around the flashed bulk area to form at least part of the layer.

In some further implementations, moving the at least one pixel of the plurality of pixels around the flashed bulk area includes moving the at least one pixel in a tracing motion around a perimeter of the layer. In yet other implementations, moving the at least one pixel of the plurality of pixels around the flashed bulk area includes moving the at least one pixel in a spiral motion around a predefined point. In some other implementations, moving the at least one pixel of the plurality of pixels around the flashed bulk area includes moving the at least one pixel in a circular motion around a predefined point.

In other implementations, moving the at least one pixel of the plurality of pixels around the flashed bulk area includes moving the at least one pixel in a zig-zag motion along a perimeter of the layer. That is, the at least one pixel can be traced along the perimeter with a zig-zag motion. The zig-zag motion can include moving the at least one pixel back and forth along the perimeter so that at least a portion of the at least one pixel is always aligned with the perimeter. The zig-zag motion can include moving the at least one pixel back and forth inward toward a center of the layer and outward away from the center as the at least one pixel is moved along the perimeter. The zig-zag motion can include moving the at least one pixel back and forth along a substantially same direction as the portion of the perimeter along which the at least one pixel is being moved.

In some other embodiments, moving the at least one pixel of the plurality of pixels around the flashed bulk area includes moving the at least one pixel in at least two of: a tracing motion around a perimeter of the layer, a spiral motion around a predefined point, a circular motion around a predefined point, and a zig-zag motion along a perimeter of the layer.

In some implementations, a method includes moving at least one pixel of a plurality of pixels and flashing the at least one pixel with radiant energy as the at least one pixel is moved to form at least part of the layer. In such implementations, the at least one pixel can be moved about one or more flashed pixels or none. In this regard, the at least one pixel can be moved and flashed to start formation of a layer or can be used to add on to a layer in progress.

In some other implementations, as the at least one pixel is moved, e.g., traced, spiraled, circled, zig-zagged, etc., the at least one pixel can be blurred or defocused by adjusting the focal point of the optic device of the radiant energy device. For instance, for a traced or zig-zagged pixel, the pixel may be blurred along a portion or the entire perimeter of the layer. For a spiraled or circled pixel, the pixel may be blurred as the pixel approaches the perimeter, e.g., to soften or round the edge of the layer.

In yet another implementation, a radiant energy device includes a first set of components, such as those depicted in FIG. 1A, to form a flashed bulk area, and a second set of components, similar to the first set of components, that is dedicated to moving the pixel in a trace, spiral, circular, and/or tilting motion.

Figure 34:
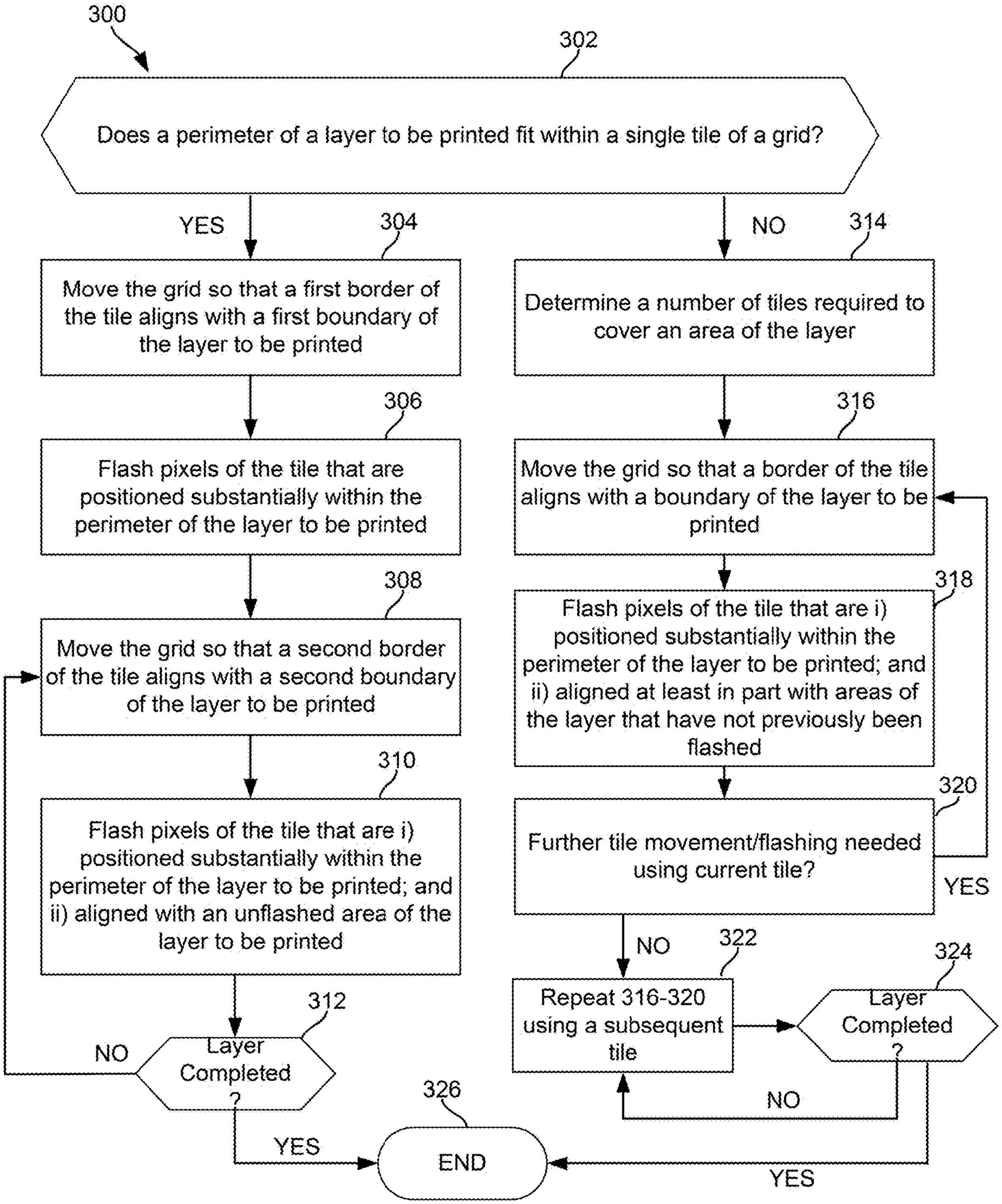
FIG. 34 is a flow diagram for a method of operating an additive manufacturing apparatus in accordance with various aspects of the present disclosure.

FIG. 34 provides a method 300 of controlling an additive manufacturing apparatus, such as a tiled DLP machine, for producing components. Although not depicted in FIG. 34, the method 300 can include receiving data, such as the data 150 depicted in FIG. 2. The data can include layer data, grid data, optimization rules, and/or feedback data, for example. Further, the method 300 can include generating a layer build plan based at least in part on the received data. The generated layer build plan can indicate instructions for printing the layer to be printed in one or more of the tile shifting techniques provided below. To build up or print a layer, one or more processors of a computing system, such as the one or more processors 112 of the computing system 110 of FIG. 2, can receive the data, generate the layer build plan, and then can execute the layer build plan, causing the additive manufacturing apparatus 10 (FIG. 1A) to build up or print the layer. The layer build plan can be executing in accordance with method 300 as provided below.

At 302, the method 300 includes determining whether a perimeter of a layer to be printed fits within a single tile of the grid. When the perimeter of the layer to be printed fits within a single tile of the grid, the method 300 proceeds to 304. In contrast, when the layer to be printed does not fit within a single tile of the grid, more than one tile is needed to print the layer, and consequently, the method 300 proceeds to 314.

Figure 35:
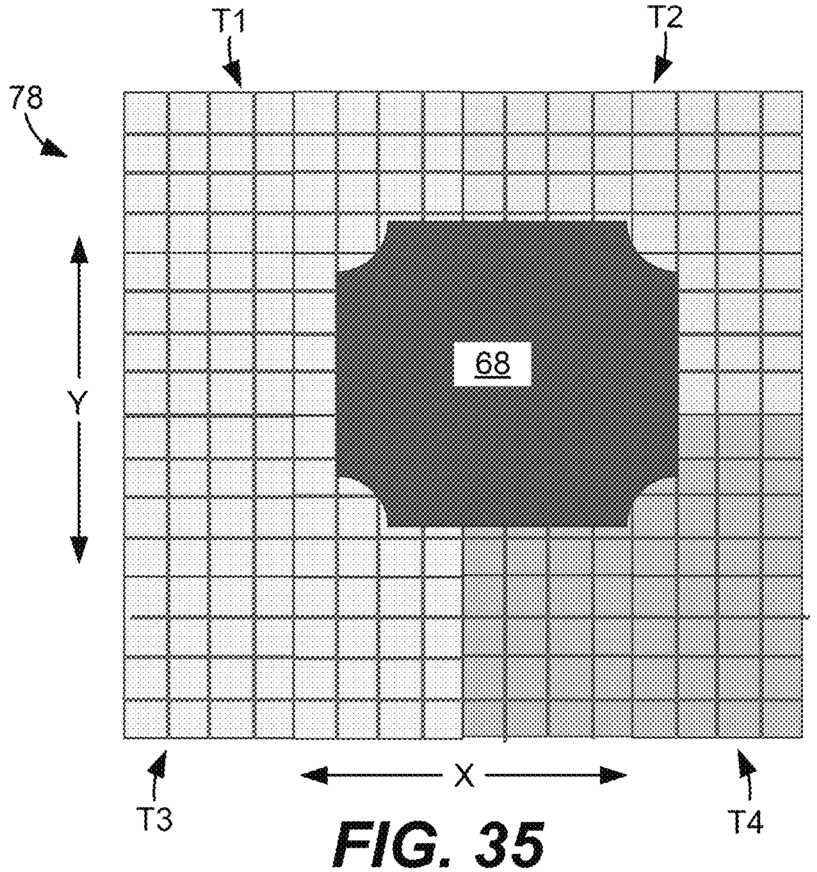
FIGS. 35 through 42 depict one example printing sequence of a layer according to the method of FIG. 34.
Figure 36:
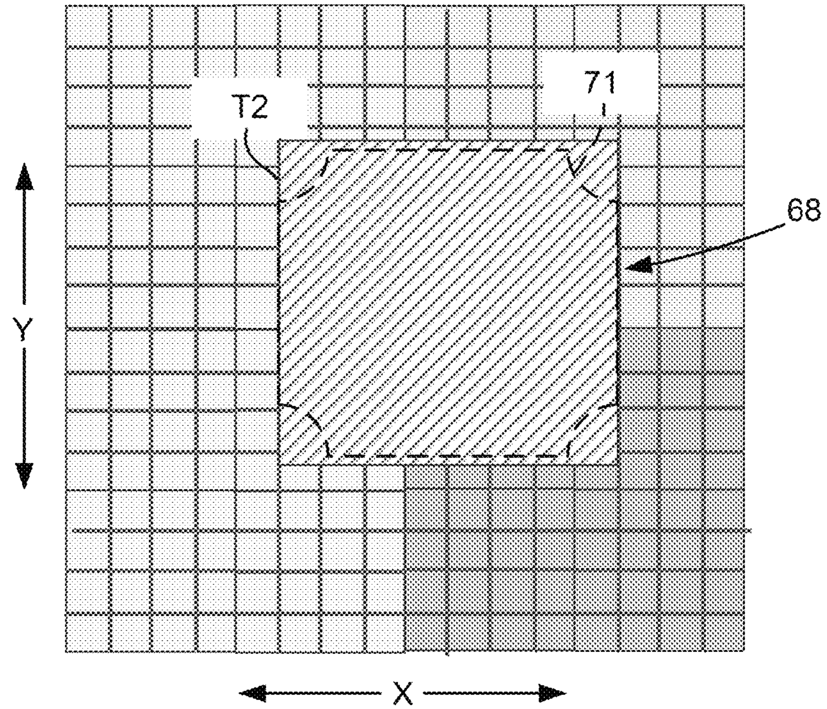

By way of example, determining whether a layer to be printed fits within a single tile of a grid projected by the tiled DLP machine. When the layer to be printed fits within the tile of the grid, the method 300 proceeds to 304 with reference to FIG. 35, a grid 78 having four tiles is depicted, including a first tile T1, a second tile T2, a third tile T3, and a fourth tile T4. Each tile T1, T2, T3, T4 has an 8×8 pixel configuration. That is, each tile T1, T2, T3, T4 has eight rows and eight columns of pixels. The layer 68 to be printed is depicted as well. With reference now also to FIG. 36, for this example, it is determined that the layer 68 to be printed fits within a single tile of the grid 78. For instance, if the second tile T2 (or any of the other tiles) is centered with the layer 68 to be printed, a perimeter 71 of the layer 68 to be printed fits entirely within the second tile T2. Accordingly, as noted, the method 300 proceeds to 304.

Figure 37:
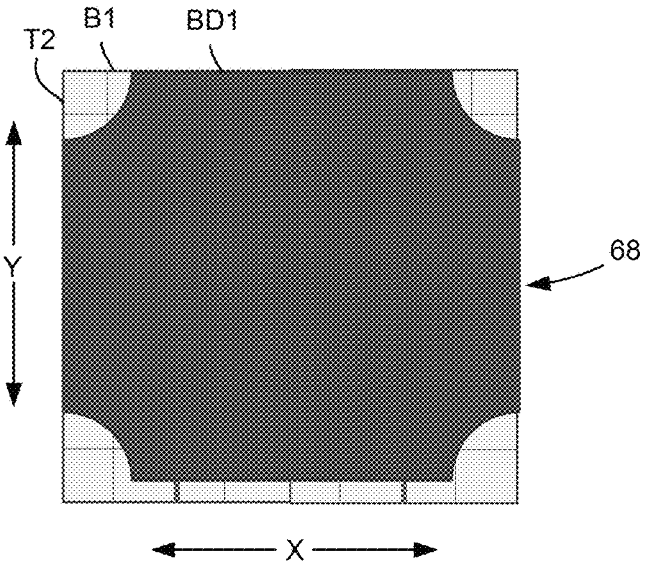

At 304, the method 300 includes moving the grid so that a first border of the tile aligns with a first boundary of the layer to be printed. For instance, as depicted in FIG. 37 and continuing with the example above, the grid is moved so that a first border B1 of the second tile T2 aligns with a first boundary BD1 of the layer 68 to be printed. Particularly, in this example, the top or first border B1 of the second tile T2 is aligned with the top or first boundary BD1 of the layer 68 to be printed, e.g., along the Y-axis direction. In some implementations, in addition to aligning the first border B1 with the first boundary BD1 of the layer 68, at least one side border of the second tile T2 can be aligned with a side boundary of the layer 68, e.g., along the X-axis direction. In this example, the side borders of the second tile T2 are aligned with respective side boundaries of the layer 68.

Figure 38:
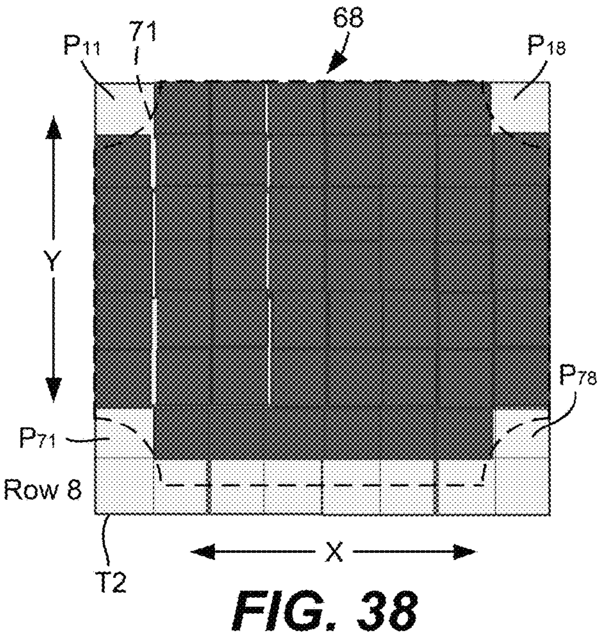

At 306, the method 300 includes flashing, with the grid positioned so that the first border of the tile aligns with the first boundary of the layer to be printed, pixels of the tile that are positioned substantially within a perimeter of the layer to be printed. A given pixel of the tile is substantially within a perimeter of the layer to be printed when at least a predetermined percentage of an area of the given pixel (or predetermined area percentage) is within the boundaries of the layer 68 to be printed. In some implementations, the predetermined area percentage is seventy-five percent (75%). In other implementations, the predetermined area percentage is eighty-five percent (85%). In yet other implementations, the predetermined area percentage is ninety-five percent (95%). For instance, as shown in FIG. 38 and continuing with the example above, all pixels except for pixels $P_{11}$, $P_{18}$, $P_{71}$, $P_{78}$, and the pixels of Row 8 of the second tile T2 are determined to be substantially within a boundary of the layer 68 to be printed. Accordingly, such pixels are flashed while the pixels $P_{11}$, $P_{18}$, $P_{71}$, $P_{78}$, and the pixels of Row 8 of the second tile T2 are not.

Figure 39:
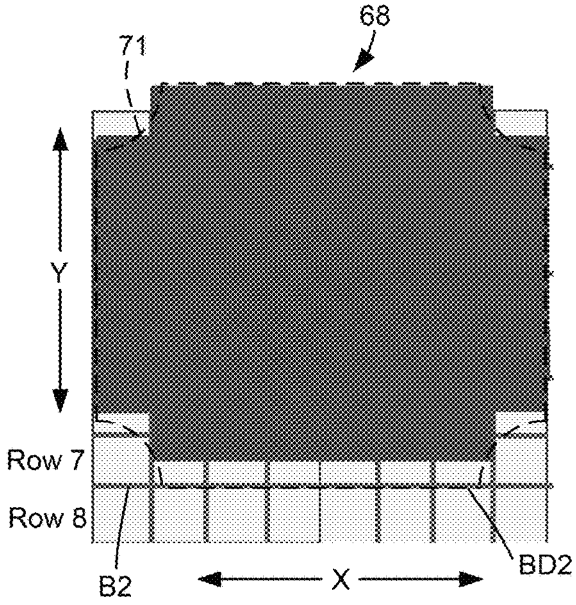

At 308, the method 300 includes moving the grid so that a second border of the tile aligns with a second boundary of the layer to be printed. For instance, as depicted in FIG. 39 and continuing with the example above, the grid 78 is moved so that a second border B2 of the second tile T2 (which in this example is a border delineating the Row 7 pixels with the Row 8 pixels) aligns with a second boundary BD2 of the layer 68 to be printed. Particularly, in this example, the bottom or second border B2 of the second tile T2 is aligned with the bottom or second boundary BD2 of the layer 68 to be printed.

At 310, the method 300 includes flashing, with the grid positioned so that the second border of the tile aligns with the second boundary of the layer to be printed, pixels of the tile that are i) positioned substantially within the boundary of the layer to be printed; and ii) aligned at least in part with unflashed areas of the layer. In some implementations, only pixels of the tile that are i) positioned substantially within the boundary of the layer to be printed; and ii) aligned at least in part with unflashed areas of the layer, wherein the unflashed area has an area that is equal to or greater than a predetermined percentage of an area of a given pixel of the tile. The predetermined percentage can be any suitable percentage, such as ten percent (10%), twenty percent (20%), or thirty percent (30%).

Figure 40:
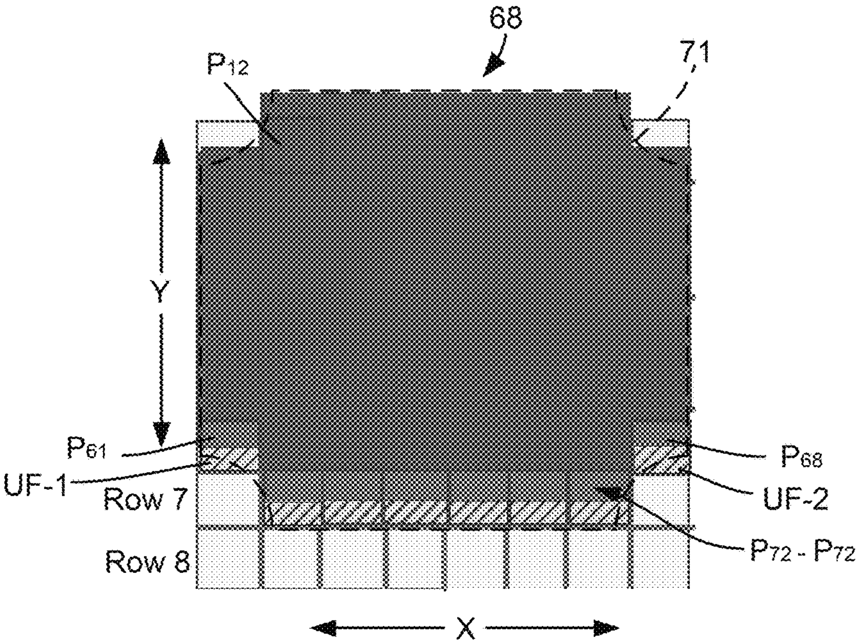

For instance, as depicted in FIG. 40, pixels $P_{61}$, $P_{68}$ of Row 6 and pixels $P_{72}$ through $P_{77}$ of Row 7 of the second tile T2 are determined to be substantially within a boundary of the layer 68 to be printed, e.g., by a predetermined area percentage, and are aligned at least in part with areas of the layer that have not previously been flashed, or unflashed areas, wherein the unflashed areas aligned with such pixels each have an area that is equal to or greater than a predetermined percentage of an area of their respective pixels. As shown, pixel $P_{61}$ is positioned substantially within the boundary or perimeter 71 of the layer 68 to be printed and is aligned in part with an unflashed area UF-1. Indeed, the bottom half of pixel $P_{61}$ aligns with the unflashed area UF-1. The same is true for pixel $P_{68}$. Pixel $P_{68}$ is positioned substantially within the boundary or perimeter 71 of the layer 68 to be printed and is aligned in part with an unflashed area UF-2. Further, as shown in FIG. 40, pixels $P_{72}$ through $P_{77}$ of Row 7 are each positioned substantially within the boundary or perimeter 71 of the layer 68 to be printed and are each aligned in part with unflashed areas.

Accordingly, at 310, these noted pixels are flashed. The pixels of the second tile T2 that are either not positioned substantially within the boundary of the layer 68 to be printed or are not aligned at least in part with unflashed areas of the layer 68 are not flashed. For instance, the pixels of Row 8 are not positioned substantially within the boundary of the layer 68 to be printed, and thus, such pixels are not flashed. In addition, while other pixels are positioned substantially within the boundary of the layer 68 to be printed, such as pixel $P_{12}$, such pixels are not aligned at least in part with an unflashed area of the layer 68. As shown, for example, pixel $P_{12}$ is entirely aligned with an area of the layer 68 that has already been flashed. Accordingly, at 310, pixel $P_{12}$ and similarly situated pixels are not flashed.

Figure 41:
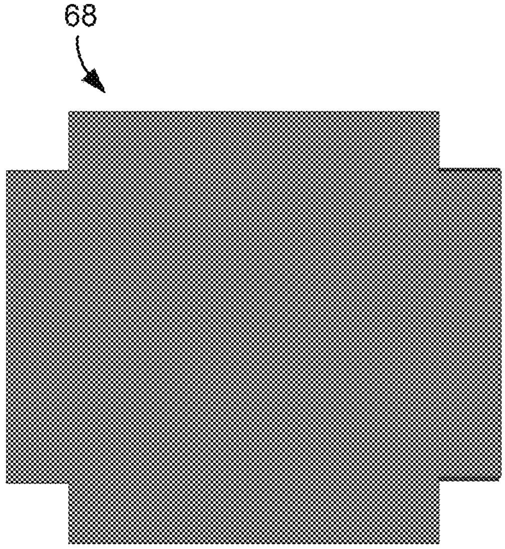
Figure 42:
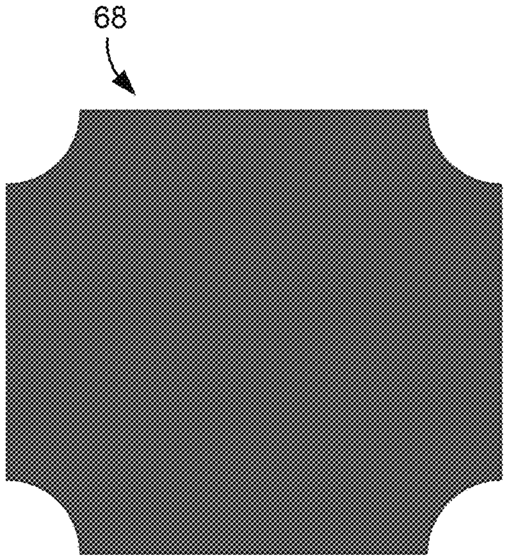

At 312, the method 300 includes determining whether the layer to be printed is complete. When it is determined that the layer to be printed is completed, the method can proceed to 326 where printing can cease or the next layer can be built up, e.g., using method 300. When it is determined that the layer to be printed is not completed, the method 300 can iterate 308, 310, 312 until the layer is complete. When this occurs, the grid is moved so that a subsequent border of the tile (i.e., a border that has not been previously aligned with a boundary of the layer to be printed) aligns with a subsequent boundary of the layer to be printed (i.e., a boundary that has not been previously aligned with a border of the tile). By aligning and flashing pixels with a boundary (e.g., a perimeter) of a layer and subsequently shifting the tile to align with one or more subsequent boundaries and intelligently flashing one or more pixels at each of the tile positions, the layer can be efficiently and intelligently printed. In this regard, optimal buildup of the desired geometry of the layer can be achieved. For instance, FIG. 40 depicts the layer built up to a satisfactory approximation of the desired shape depicted in FIG. 41.

Referring now specifically to FIG. 34, as noted previously, at 302, when it is determined that the layer to be printed does not fit within a single tile of the grid, more than one tile is needed to print the layer, and consequently, the method 300 proceeds to 314.

Figure 43:
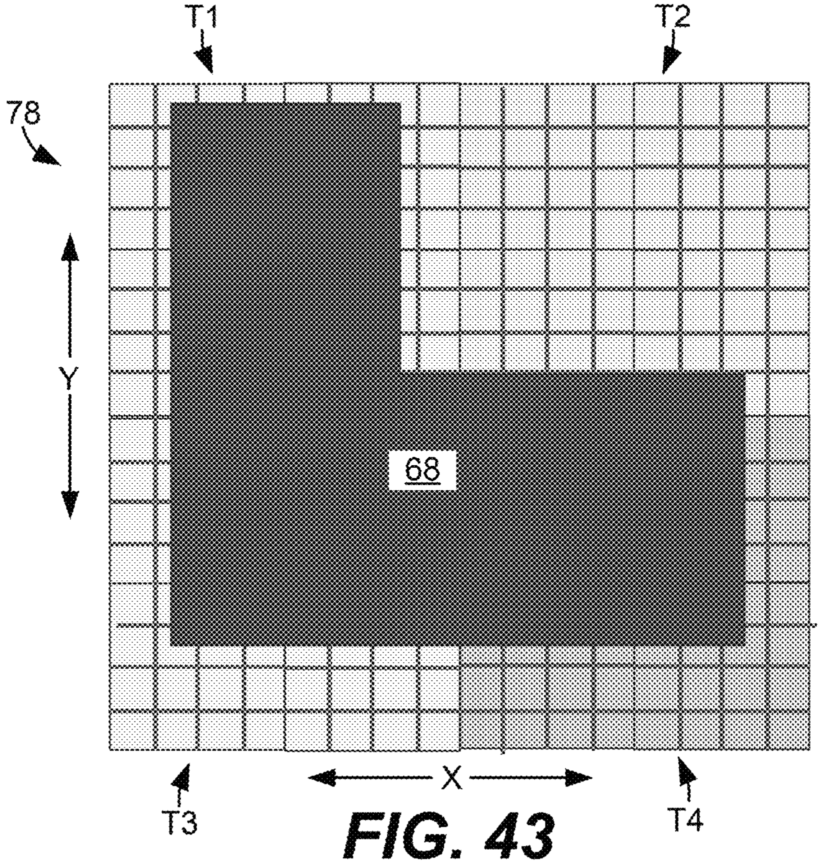
FIGS. 43 through 50 depict another example printing sequence of a layer according to the method of FIG. 34.
Figure 44:
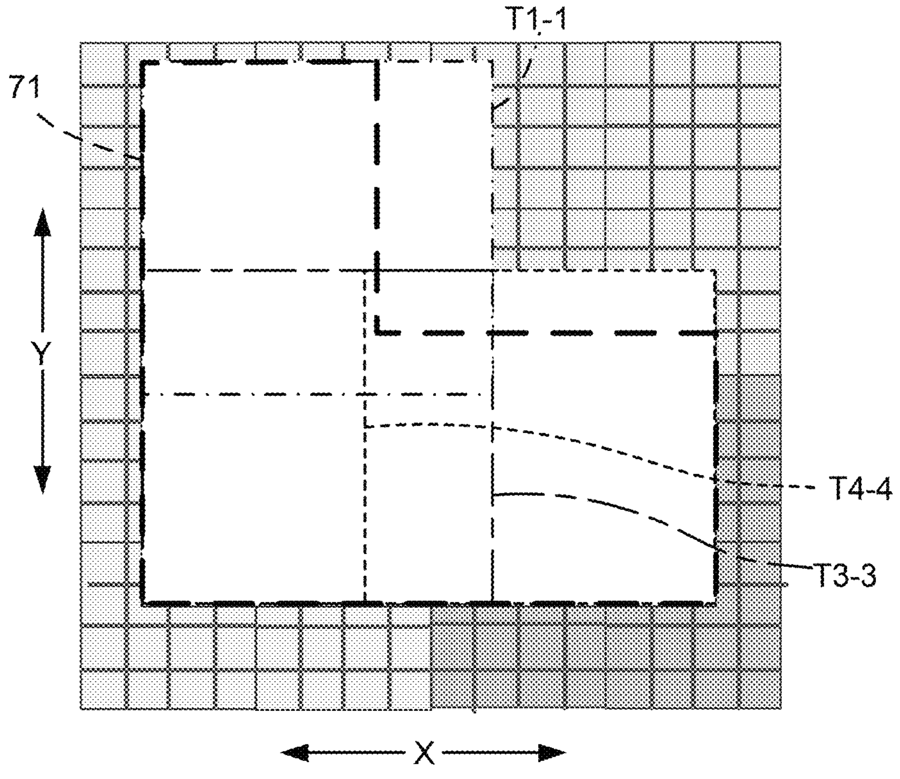

At 314, the method 300 includes determining a number of tiles required to cover an area of the layer to be printed. By way of example, with reference to FIG. 43, a grid 78 having four tiles is depicted, including a first tile T1, a second tile T2, a third tile T3, and a fourth tile T4. Each tile T1, T2, T3, T4 is configured in an 8×8 pixel configuration. The layer 68 to be printed is depicted as well. As shown, the layer 68 to be printed has an L-shape in this example. With reference now also to FIG. 44, for this example, it is determined that the layer 68 to be printed (as represented by its outline 71) does not fit within a single tile of the grid 78 and that three (3) tiles, denoted by T1-1, T3-3, and T4-4, are needed to cover the area of the layer 68 to be printed.

Figure 45:
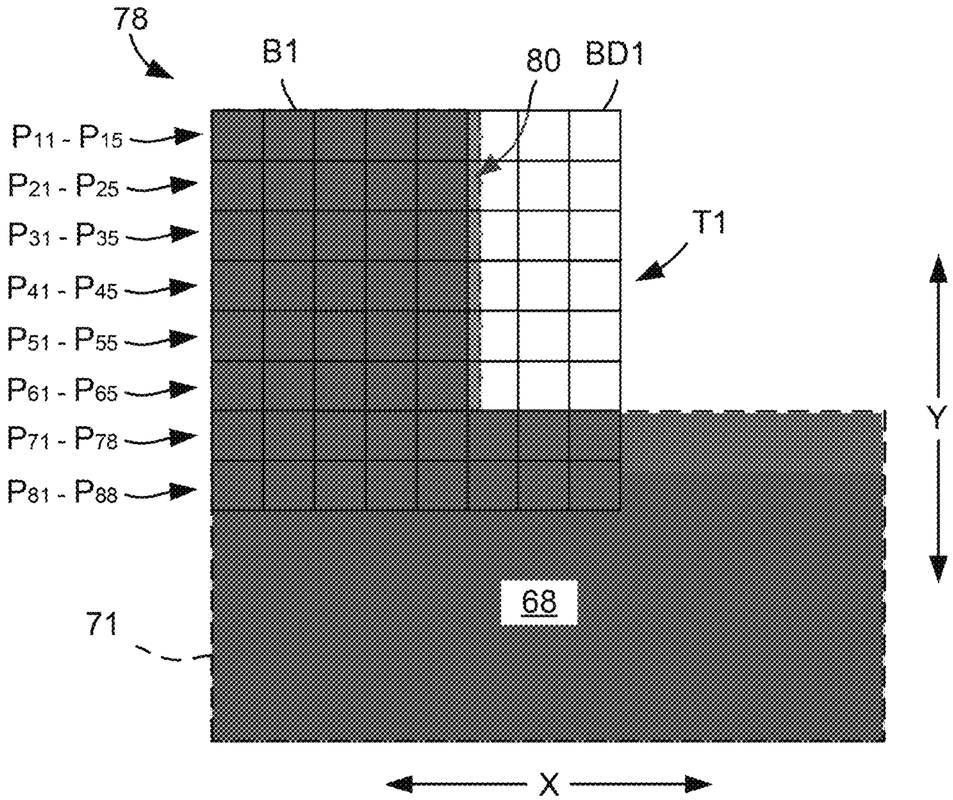

At 316, the method 300 includes moving the grid so that a first border of a tile aligns with a first boundary of the layer to be printed. For instance, as depicted in FIG. 45 and continuing with the example above, the grid 78 is moved so that a first border B1 of the first tile T1 aligns with a first boundary BD1 of the layer 68 to be printed. Particularly, in this example, the top or first border B1 of the first tile T1 is aligned with the top or first boundary BD1 of the layer 68 to be printed.

At 318, the method 300 includes flashing pixels of the tile that are i) positioned substantially within a boundary of the layer to be printed and ii) aligned at least in part with areas of the layer that have not previously been flashed. As noted above, a given pixel of the tile is substantially within a boundary of the layer to be printed when at least a predetermined percentage of an area of the given pixel (or predetermined area percentage) is within the boundaries or perimeter 71 of the layer 68 to be printed. In some implementations, the predetermined percentage of area is seventy-five percent (75%). In other implementations, the predetermined percentage of area is eighty-five percent (85%). In yet other implementations, the predetermined percentage of area is ninety-five percent (95%).

As shown in FIG. 45 and continuing with the example above, pixels $P_{11}$-$P_{15}$ of Row 1, $P_{21}$-$P_{25}$ of Row 2, $P_{31}$-$P_{35}$ of Row 3, $P_{41}$-$P_{45}$ of Row 4, $P_{51}$-$P_{55}$ of Row 5, $P_{61}$-$P_{65}$ of Row 6, $P_{71}$-$P_{78}$ of Row 7, and $P_{81}$-$P_{88}$ of Row 8 of the first tile T1 (the other tiles are not shown in FIG. 45) are determined to be substantially within a boundary of the layer 68 to be printed. Further, as no area of the layer has yet been flashed, these pixels are aligned at least in part with areas of the layer that have not previously been flashed. Accordingly, as depicted in FIG. 45, such pixels are flashed while the other pixels are not.

At 320, the method includes determining whether further tile movement and flashing is needed using the current tile. When further tile movement and flashing is needed using the current tile, the method 300 proceeds to 316 and 316, 318, and 320 are iterated. In contrast, when further tile movement and flashing is not needed using the current tile, the method 300 proceeds to 322.

Continuing with the example noted above and with reference to FIGS. 45 and 46, after flashing pixels $P_{11}$-$P_{15}$ of Row 1, $P_{21}$-$P_{25}$ of Row 2, $P_{31}$-$P_{35}$ of Row 3, $P_{41}$-$P_{45}$ of Row 4, $P_{51}$-$P_{55}$ of Row 5, $P_{61}$-$P_{65}$ of Row 6, $P_{71}$-$P_{78}$ of Row 7, and $P_{81}$-$P_{88}$ of Row 8 of the first tile T1, there is still an area 80 of the layer 68 to be printed that has not been flashed but is within an area of the first tile T1. Accordingly, in this example, it is determined that further tile movement and flashing is needed using the current tile, the first tile T1, and the method 300 iterates 316 and 316, 318, and 320.

Figure 46:
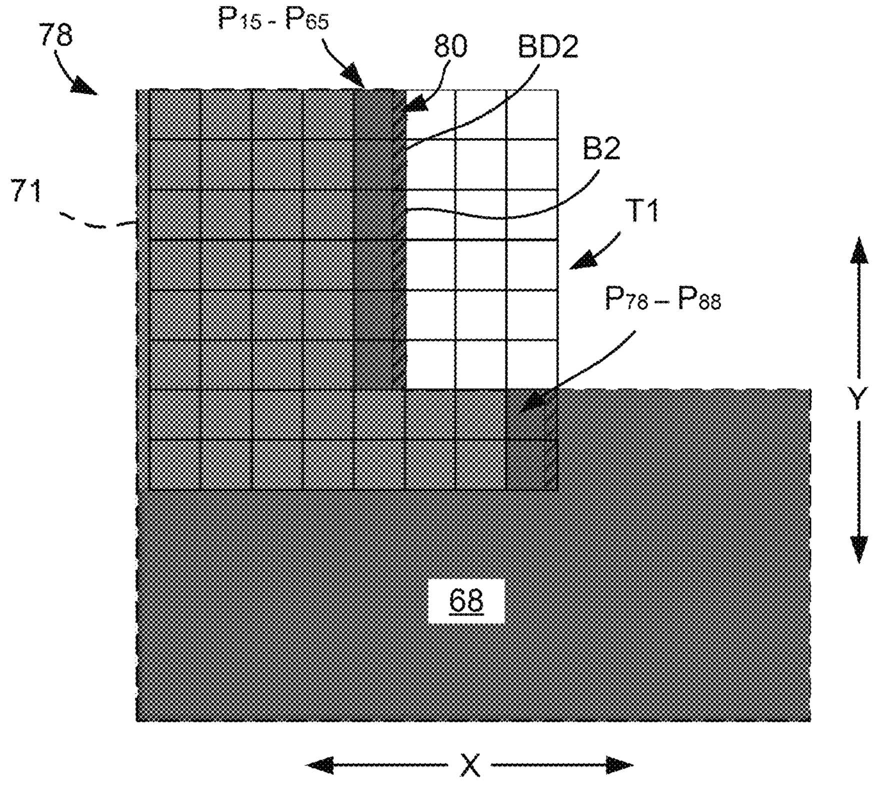

Accordingly, at the iteration of 316, the grid 78 is moved so that a subsequent border of the first tile T1 aligns with a subsequent boundary of the layer 68 to be printed. For instance, as depicted in FIG. 46, the grid 78 is moved so that a second border B2 of the first tile T1 aligns with a second boundary BD2 of the layer 68 to be printed. As a result, in this example, the first tile T1 is moved to the right by ¼ pixel along the X-axis direction. This effectively aligns pixels $P_{15}$-$P_{65}$ of Column 5 with the area 80 of the layer 68 that has not been flashed but is within an area of the first tile T1.

At the iteration of 318, pixels of the first tile T1 that are i) positioned substantially within the boundary of the layer 68 to be printed; and ii) aligned at least in part with areas of the layer that have not previously been flashed (i.e., unflashed areas) are flashed. For instance, as depicted, pixels $P_{15}$-$P_{65}$ of Column 5 and pixels $P_{78}$-$P_{88}$ of Column 8 of the first tile T1 are determined to be substantially within a boundary of the layer 68 to be printed, e.g., by a predetermined area percentage, and are aligned at least in part with areas of the layer that have not previously been flashed. Accordingly, as shown in FIG. 46, pixels $P_{15}$-$P_{65}$ of Column 5 and pixels $P_{78}$-$P_{88}$ of Column 8 of the first tile T1 are flashed to build up these unflashed areas of the layer 68.

At the iteration of 320, it is again determined whether further tile movement and flashing is needed using the current tile. In this example, further tile movement and flashing is not needed using the current tile as there is no area of the layer 68 to be printed that i) has not been flashed but is within the area of the first tile T1. Accordingly, as depicted in FIG. 34, the method 300 proceeds to 322.

Figure 47:
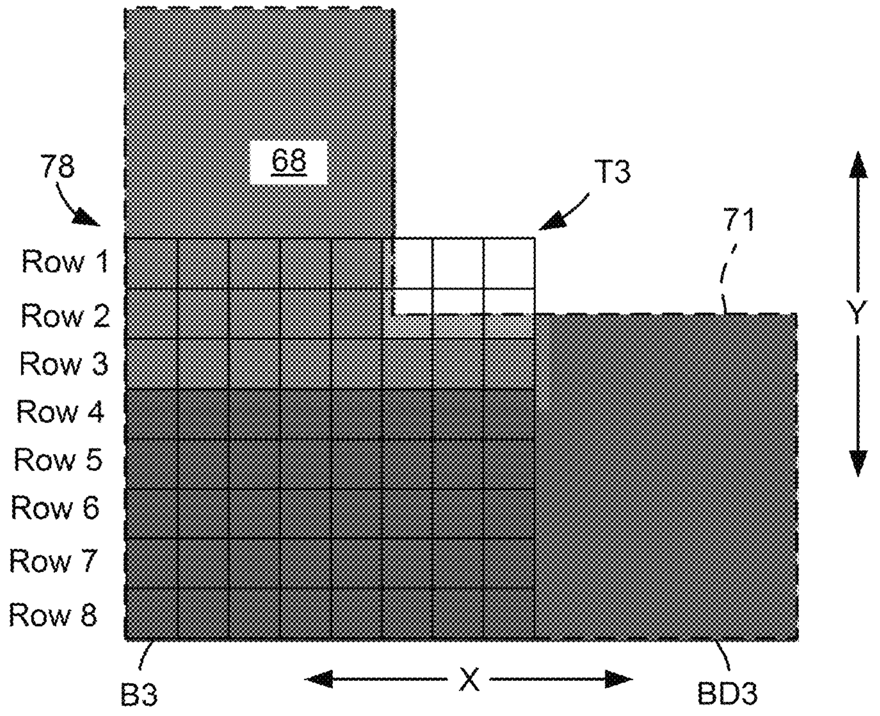

At 322, the method 300 includes iterating 316, 318, 320 using a subsequent tile. For instance, as shown in FIG. 47, the third tile T3 is moved at 316 so that a border of the third tile T3 aligns with a boundary of the layer 68 to be printed. Particularly, in this example, a bottom border B3 of the third tile T3 is aligned with the bottom boundary BD3 of the layer 68 to be printed. Then, at 318, the pixels of the second tile T1 that are i) positioned substantially within a boundary of the layer to be printed and ii) aligned at least in part with areas of the layer that have not previously been flashed are flashed. For instance, as shown in FIG. 47, all pixels of Rows 4 through 8 of the third tile T3 are determined to be substantially within a boundary of the layer 68 to be printed. Further, as these pixels are aligned at least in part with areas of the layer that have not previously been flashed (see the area below the first tile T1 in FIG. 46), such pixels are flashed while the other pixels of the third tile T3 are not. That is, all pixels of Rows 1 through 4 are not flashed while all pixels of Rows 4 through 8 of the third tile T3 are flashed. The pixels of Row 4 overlap in part with areas of the layer 68 that have already been formed, e.g., by the first tile T1 as noted above; thus, when the pixels of Row 4 are flashed, some previously flashed areas are flashed once again. Next, at 320, it is determined whether further tile movement and flashing is needed using the current tile. In this example, further tile movement and flashing is not needed using the current tile, as there is no area of the layer 68 to be printed that i) has not been flashed but is within the area of the third tile T3. Accordingly, as depicted in FIG. 34, the method 300 proceeds to 324.

At 324, the method 300 includes determining whether the layer to be printed is completed. For this example, as depicted in FIG. 47, an area of the layer 68 has not yet been flashed or formed. Indeed, the area to the right of the third tile T3 has not yet been flashed. Accordingly, the method 300 returns to 322 as depicted in FIG. 34.

Figure 48:
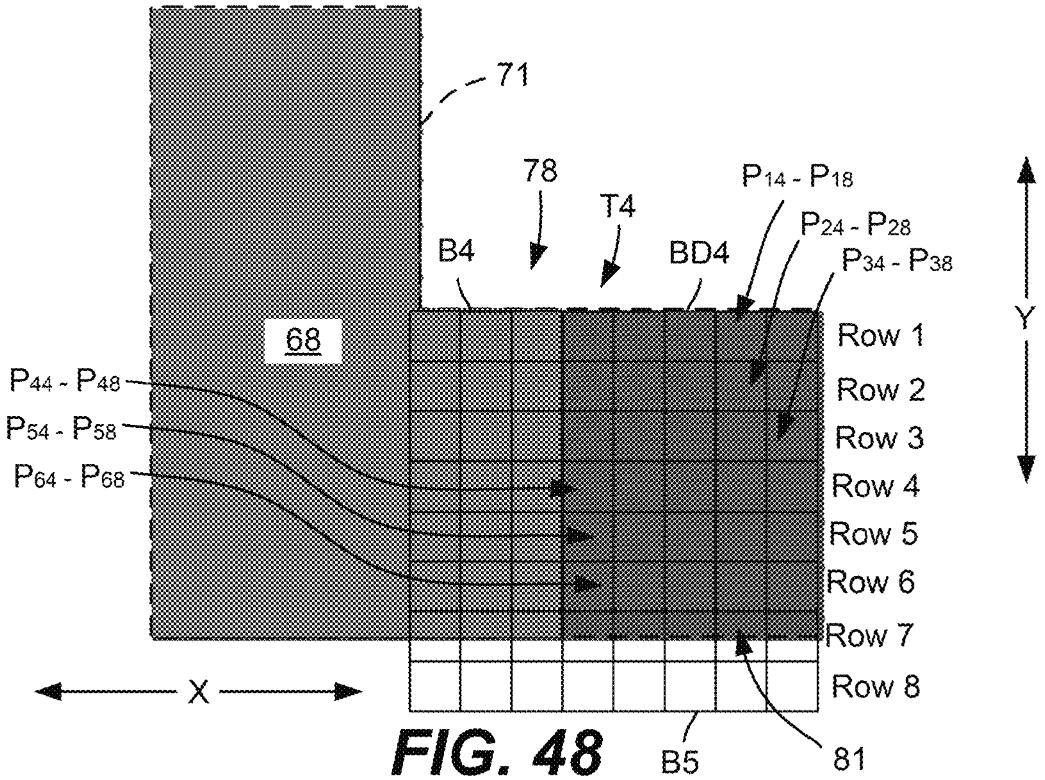

At this iteration of 322, the method 300 includes iterating 316, 318, 320 using a subsequent tile, or this example the fourth tile T4. For instance, as shown in FIG. 48, the fourth tile T4 is moved at 316 so that a border of the fourth tile T4 aligns with a boundary of the layer 68 to be printed. Particularly, in this example, the top border B4 of the fourth tile T4 is aligned with the top boundary BD4 of the layer 68 to be printed. Then, at 318, the pixels of the tile that are i) positioned substantially within a boundary of the layer to be printed and ii) aligned at least in part with areas of the layer that have not previously been flashed are flashed. For instance, as shown in FIG. 48, pixels $P_{14}$-$P_{18}$ of Row 1, pixels $P_{24}$-$P_{28}$ of Row 2, pixels $P_{34}$-$P_{38}$ of Row 3, pixels $P_{44}$-$P_{48}$ of Row 4, pixels $P_{54}$-$P_{55}$ of Row 5, and pixels $P_{64}$-$P_{68}$ of Row 6 all meet this criteria. While the pixels of Row 7 each align at least in part with an area or areas of the layer 68 that has/have not previously been flashed, such pixels are not positioned substantially within a boundary or perimeter 71 of the layer 68 to be printed. Accordingly, they are not flashed. It is determined at 320 that a further tile movement/flashing is needed as there is still an area 81 of the layer 68 to be printed that has not been flashed but is within an area of the fourth tile T4. Accordingly, in this example, it is determined that further tile movement and flashing is needed using the current tile, the fourth tile T4, and the method 300 iterates 316 and 316, 318, and 320.

Figure 49:
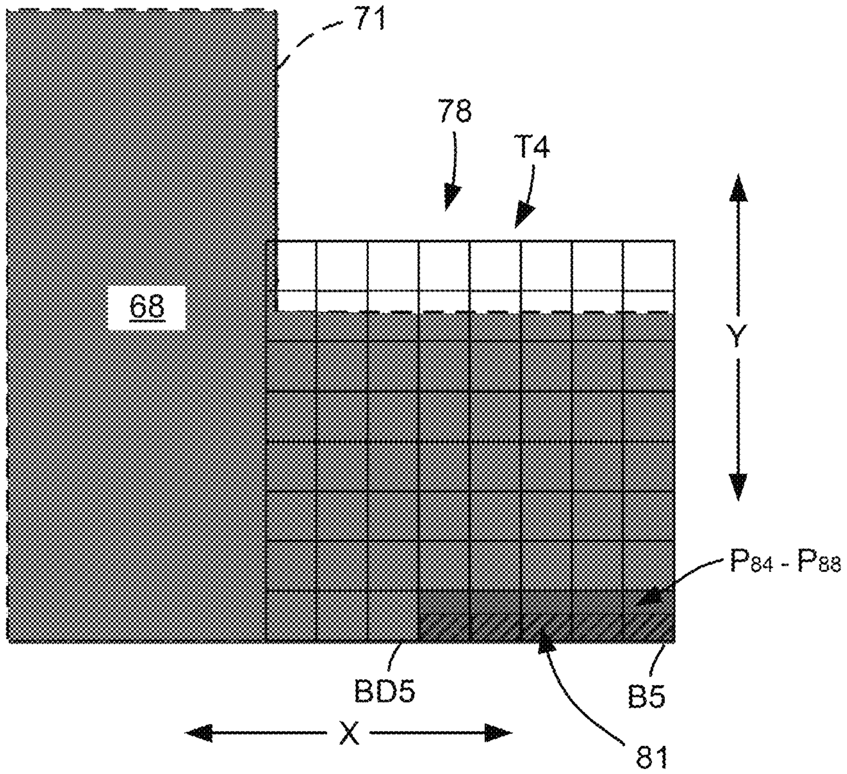
Figure 50:
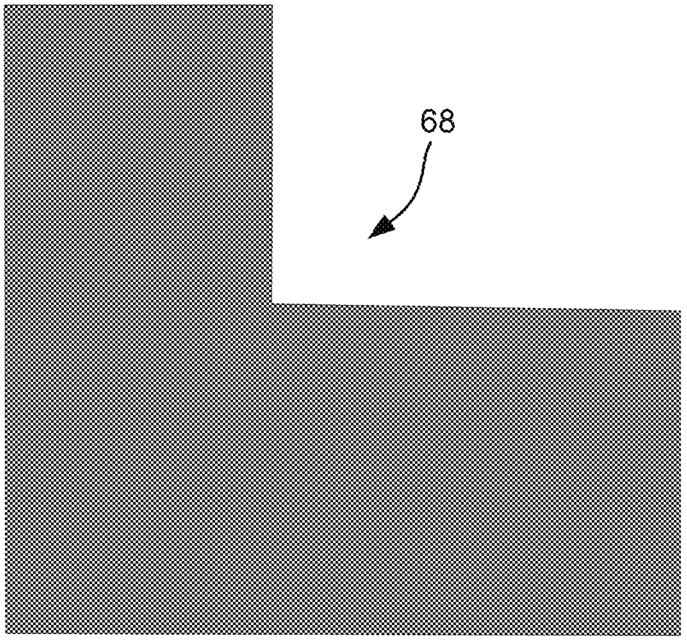

Accordingly, the fourth tile T4 is moved at 316 by 1 and ½ pixels upward along the Y-axis direction. In this regard, a bottom border B5 of the fourth tile T4 is aligned with the bottom boundary BD5 of the layer 68 to be printed as shown in FIG. 49. In alternative embodiments, the fourth tile T4 can be moved at 316 by ½ a pixel upward along the Y-axis direction. Then, at 318, the pixels of the tile that are i) positioned substantially within a boundary of the layer to be printed and ii) aligned at least in part with areas of the layer that have not previously been flashed are flashed. For instance, as shown in FIG. 49, pixels $P_{84}$-$P_{88}$ of Row 8 are flashed. Thus, the previously unflashed area 81 is built up. It is then determined at 320 that no further tile movement/flashing is needed as there is no area of the layer 68 to be printed that has not been flashed within an area of the fourth tile T4. Accordingly, in this example, the method 300 proceeds to 324. At 324, it is determined that the layer 68 is in fact completed. FIG. 50 depicts the completed layer 68. Thus, the method 300 proceeds to 326. At 326, the method 300 can be iterated for subsequent layers, or if the component is complete, printing may cease.

In another example aspect of the present disclosure, it may be desirable to print a layer or component that has circular or fidelity-critical features. Two exemplary approaches are provided below.

Figure 51:
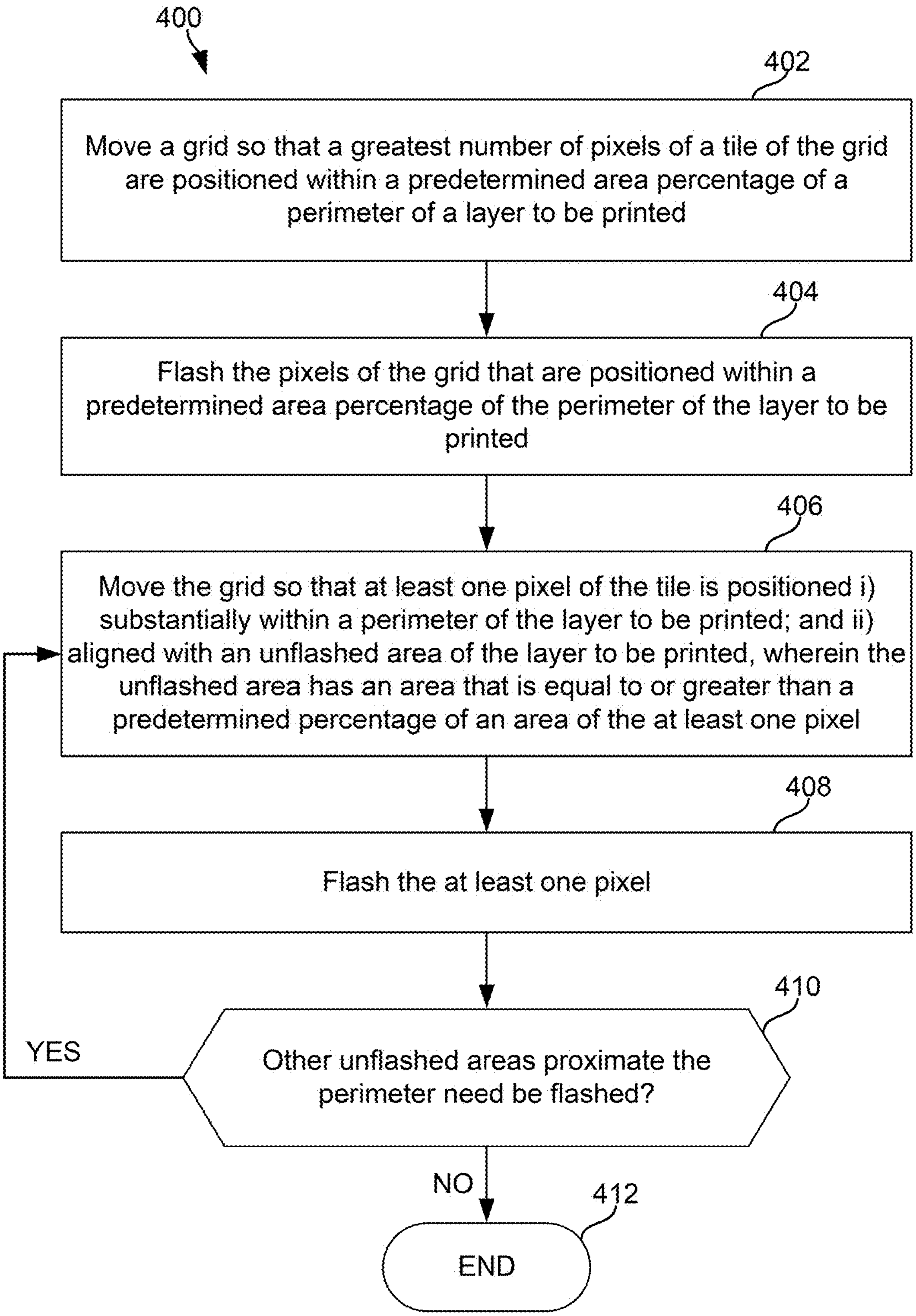
FIG. 51 is a flow diagram for a method of operating an additive manufacturing apparatus in accordance with various aspects of the present disclosure.

FIG. 51 provides a first approach of implementing method 400 to build up components that have circular or fidelity-critical features using an additive manufacturing apparatus, such as a tiled DLP machine. Although not depicted in FIG. 51, the method 400 can include receiving data, such as the data 150 depicted in FIG. 2. The data can include layer data, grid data, optimization rules, and/or feedback data, for example. The one or more optimization rules can dictate or instruct how the layer build plan is constructed, or rather, how the grid is to be shifted around and flashed to build the layer. Particularly, the one or more optimization rules can set forth and define the rules set forth in the method 400 of FIG. 51, such as how the grid is to be moved and flashed at 402 and 404 to flash a greatest number of pixels of a tile of the grid are positioned within a predetermined area percentage of a perimeter of a layer to be printed, and then, how the grid is to be moved and flashed at 406 and 408 to flash one or more pixels along the perimeter of the layer to be printed to ultimately enhance the printing of the circular or fidelity-critical features. Further, the one or more optimization rules can set forth and define the parameters of the method 400, such as the predetermined area percentage, the predetermined percentage of an area of at least one pixel, the flash intensity, etc. The method 400 can include generating a layer build plan based at least in part on the received data. The generated layer build plan can indicate instructions for printing the layer to be printed in one or more of the tile shifting techniques used to print components that have circular or fidelity-critical features as provided below. To build up or print a layer, the one or more processors 112 of the computing system 110 can receive the data, generate the layer build plan, and then can execute the layer build plan, causing the additive manufacturing apparatus 10 to build up or print the layer. The layer build plan can be executing in accordance with method 400 as provided below.

Figure 52:
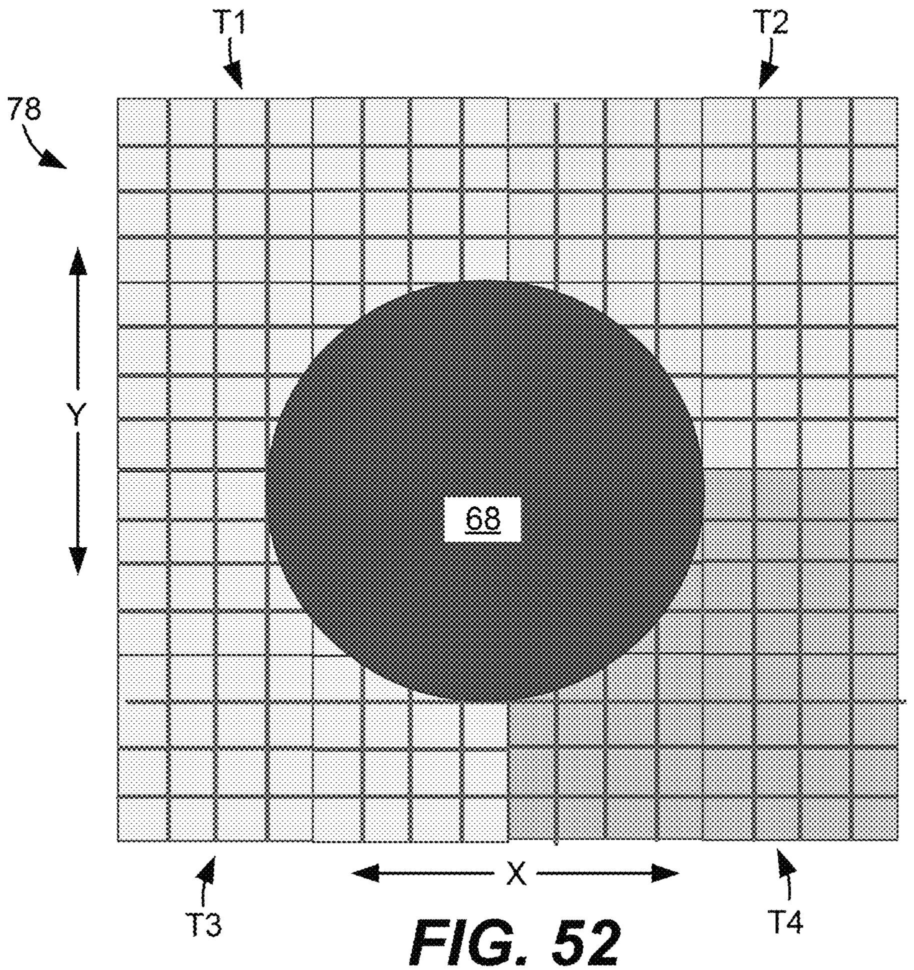
FIGS. 52 through 56 depict one example printing sequence of a layer according to the method of FIG. 51.
Figure 53:
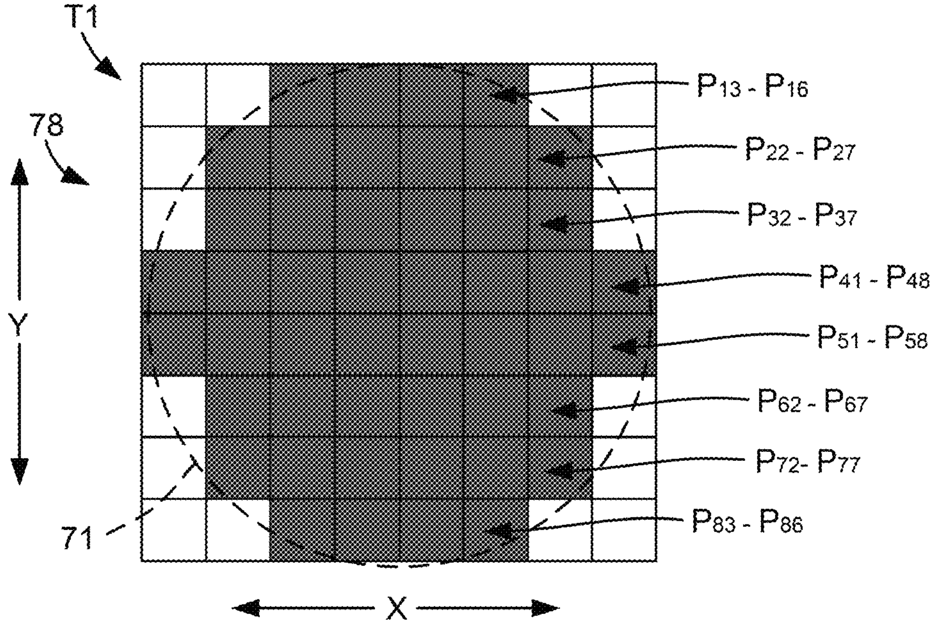

At 402, the method 400 includes moving a grid so that a greatest number of pixels of a tile of the grid are positioned within a predetermined area percentage of a perimeter of a layer to be printed. By way of example, with reference to FIG. 52, a grid 78 having four tiles is depicted, including a first tile T1, a second tile T2, a third tile T3, and a fourth tile T4. Each tile T1, T2, T3, T4 is configured in an 8×8 pixel configuration. The layer 68 to be printed is depicted as well. The layer 68 has circular features in this example. As depicted in FIG. 53, one of the tiles can be moved so that a greatest number of pixels of one of the tiles of the grid 78 are positioned within a predetermined area percentage of a perimeter 71 of the layer 68 to be printed.

At 404, the method 400 includes flashing the pixels of the grid that are positioned within the predetermined area percentage of the perimeter of the layer to be printed. For instance, as shown in FIG. 53, pixels $P_{13}$-$P_{16}$ of Row 1, $P_{22}$-$P_{27}$ of Row 2, $P_{32}$-$P_{37}$ of Row 3, $P_{41}$-$P_{48}$ of Row 4, $P_{51}$-$P_{55}$ of Row 5, $P_{62}$-$P_{67}$ of Row 6, $P_{72}$-$P_{77}$ of Row 7, and $P_{83}$-$P_{86}$ of Row 8 are flashed as they are positioned within a predetermined area percentage of the perimeter 71 of the layer 68 to be printed. The other pixels of the first tile T1 are not flashed as they are not within the predetermined area percentage of the perimeter 71 of the layer 68 to be printed.

At 406, the method 400 includes moving the grid so that at least one pixel of the tile is positioned i) substantially within a perimeter of the layer to be printed; and ii) aligned with an unflashed area of the layer to be printed, wherein the unflashed area has an area that is equal to or greater than a predetermined percentage of an area of the at least one pixel. In some implementations, this can involve moving the grid in a first direction and in a second direction that is perpendicular to the first direction. That is, the grid can be moved diagonally to accomplish this task. In some implementations, the grid is moved diagonally less than a length or width of a pixel, such as by a quarter of a length of a pixel. In some implementations, the grid is moved in the first direction and in the second direction so that at least one pixel of the pixels of the tile is positioned i) substantially within a perimeter of the layer to be printed; and ii) aligned with an unflashed area of the layer to be printed, wherein the unflashed area has an area that is equal to or greater than a predetermined percentage of an area of the at least one pixel. In other implementations, the grid need not be moved in a diagonal direction, rather, the grid can be moved solely along the X-axis direction or solely along the Y-axis direction to accomplish this task.

In some example implementations, the at least one pixel of the tile is positioned substantially within the perimeter of the layer to be printed when the at least one pixel is ninety-five percent (95%) within the perimeter of the layer. In other implementations, the at least one pixel of the tile is positioned substantially within the perimeter of the layer to be printed when the at least one pixel is ninety percent (90%) within the perimeter of the layer. In yet other implementations, the at least one pixel of the tile is positioned substantially within the perimeter of the layer to be printed when the at least one pixel is entirely within the perimeter of the layer.

Figure 54:
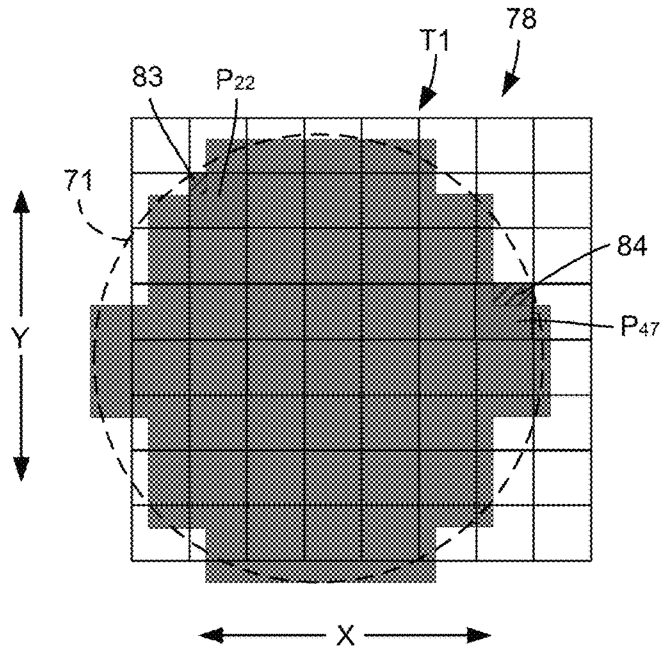

Continuing with the example above and with reference to FIG. 54, the grid 78 is moved so that at least one pixel of the first tile T1 is positioned i) substantially within the perimeter 71 of the layer 68 to be printed; and ii) aligned with an unflashed area of the layer 68 to be printed, wherein the unflashed area has an area that is equal to or greater than a predetermined percentage of an area of the at least one pixel. Particularly, the grid is moved so that pixel $P_{22}$ is positioned substantially within the perimeter 71 of the layer 68 to be printed and is aligned with an unflashed area 83 of the layer 68 to be printed, wherein the unflashed area 83 has an area that is equal to or greater than a predetermined percentage (e.g., ten percent (10%)) of an area of pixel $P_{22}$. Moreover, pixel $P_{47}$ is positioned substantially within the perimeter 71 of the layer 68 to be printed and is aligned with an unflashed area 84 of the layer 68 to be printed, wherein the unflashed area 84 has an area that is equal to or greater than a predetermined percentage (e.g., ten percent (10%)) of an area of pixel $P_{47}$. No other pixels of the first tile T1 meet this criteria.

At 408, the method includes flashing the at least one pixel that is/are positioned i) substantially within a perimeter of the layer to be printed; and ii) aligned with an unflashed area of the layer to be printed, wherein the unflashed area has an area that is equal to or greater than a predetermined percentage of an area of the at least one pixel. As shown in FIG. 54, pixel $P_{22}$ is flashed to build up or print the unflashed area 83 and pixel $P_{47}$ is flashed to build up or print the unflashed area 84.

Figure 55:
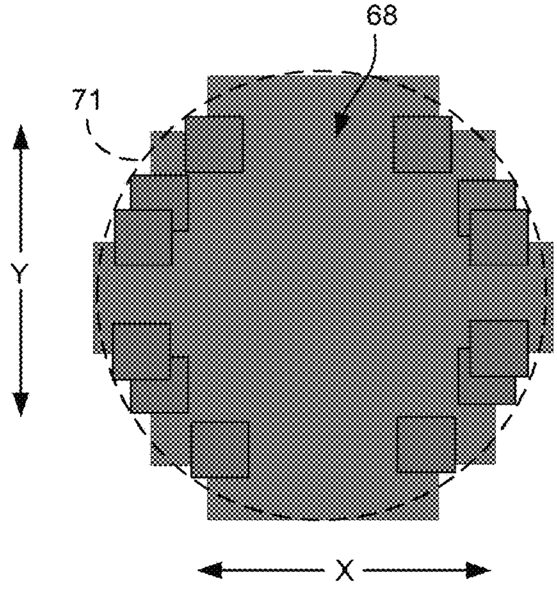

At 410, the method 400 includes determining whether there are other unflashed areas proximate the perimeter 71 (or a segment of the perimeter 71) that have an area that is equal to or greater than a predetermined percentage of an area of a given pixel of the tile. When there are other unflashed areas meeting this criteria, the method 400 iterates 406, 408, and 410, e.g., until there are no longer any unflashed areas proximate the perimeter 71 (or a segment of the perimeter 71) that have an area that is equal to or greater than a predetermined percentage of an area of a given pixel of the tile. The predetermined percentage of an area of the at least one pixel can be, for example, 5%, 10%, 25%, etc. depending on the desired fidelity of the perimeter 71 of the layer 68. An unflashed area is considered to be "proximate" the perimeter 71 if it touches the perimeter 71 or segment thereof. For instance, as depicted in FIG. 55, the method 400 can iterate and certain pixels can be flashed so that all unflashed areas unflashed areas proximate the perimeter 71 (or a segment of the perimeter 71) that have an area equal to or greater than a predetermined percentage of an area of a given pixel of the tile can be printed or built up.

Figure 56:
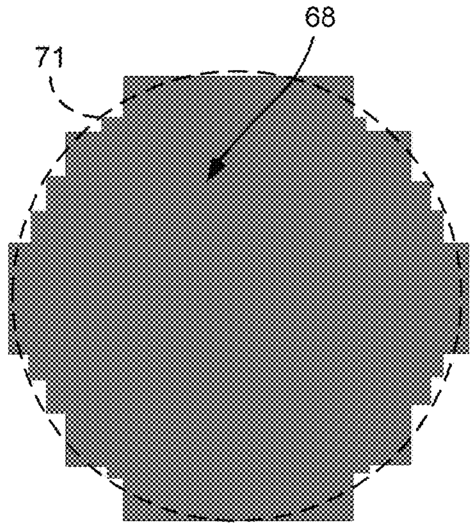

When, as determined at 410, there are no other unflashed areas proximate the perimeter 71 (or a segment of the perimeter 71) that have an area that is equal to or greater than a predetermined percentage of an area of a given pixel of the tile, then the method proceeds to 412 to end printing of the layer 68. FIG. 56 depicts the finished layer 68 built up with a high fidelity circular perimeter. Method 400 can then iterate for subsequent layers until the component is completed.

Figure 57:
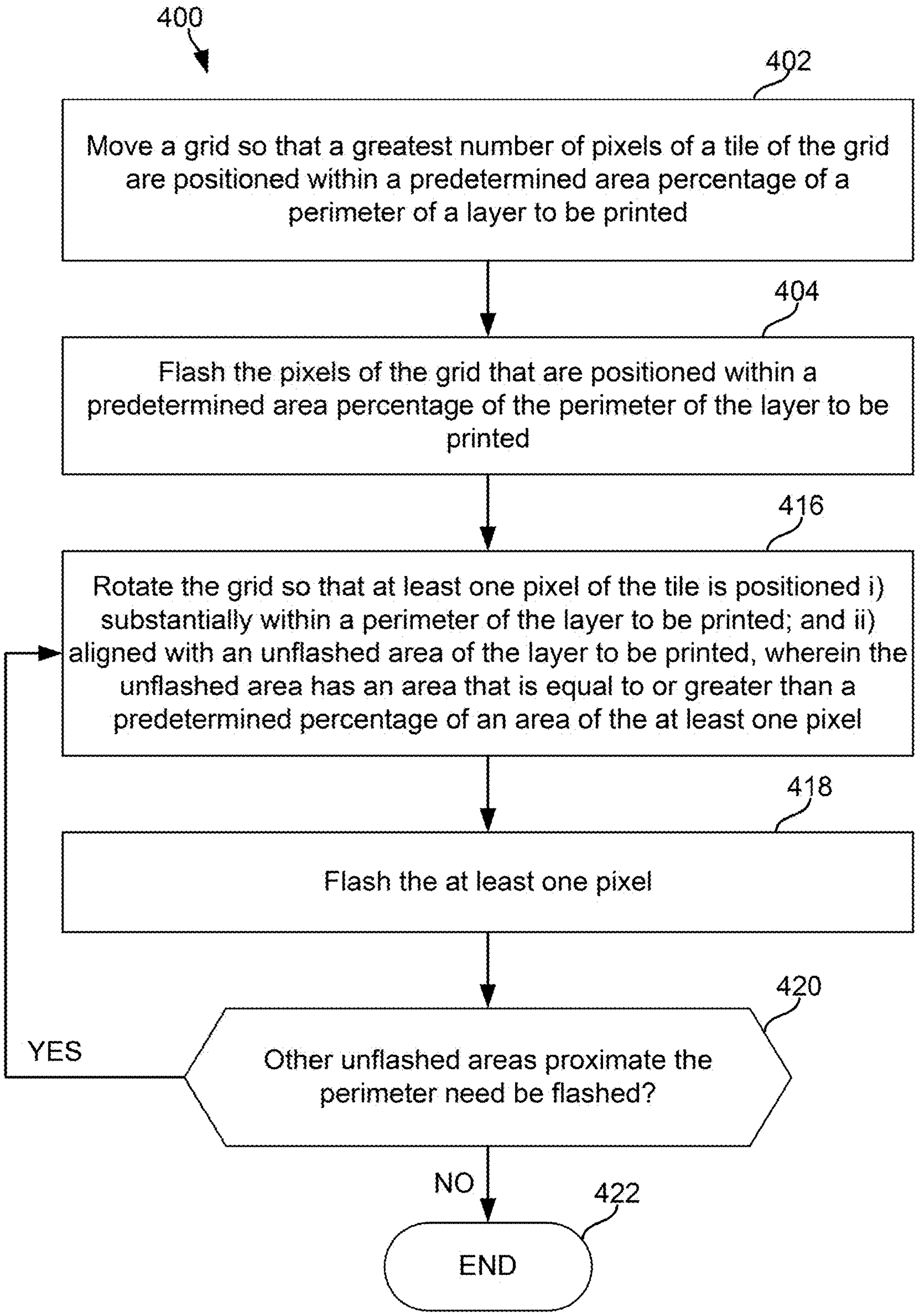
FIG. 57 is a flow diagram for a method of operating an additive manufacturing apparatus in accordance with various aspects of the present disclosure.

FIG. 57 provides a second approach of implementing method 400 to build up components that have circular or fidelity-critical features using an additive manufacturing apparatus, such as a tiled DLP machine. Although not depicted in FIG. 57, the method 400 can include receiving data, such as the data 150 depicted in FIG. 2. The data can include layer data, grid data, optimization rules, and/or feedback data, for example. The one or more optimization rules can dictate or instruct how the layer build plan is constructed, or rather, how the grid is to be shifted and/or rotated around and flashed to build the layer. Particularly, the one or more optimization rules can set forth and define the rules set forth in the method 400 of FIG. 57, such as how the grid is to be moved and flashed at 402 and 404 to flash a greatest number of pixels of a tile of the grid are positioned within a predetermined area percentage of a perimeter of a layer to be printed, and then, how the grid is to be rotated and flashed at 406 and 408 to flash one or more pixels along the perimeter of the layer to be printed to ultimately enhance the printing of the circular or fidelity-critical features. Further, the one or more optimization rules can set forth and define the parameters of the method 400 of FIG. 57, such as the predetermined area percentage, the predetermined percentage of an area of at least one pixel, the flash intensity, etc. The method 400 can include generating a layer build plan based at least in part on the received data. The generated layer build plan can indicate instructions for printing the layer to be printed in one or more of the tile shifting techniques used to print components that have circular or fidelity-critical features as provided below. To build up or print a layer, the one or more processors 112 of the computing system 110 can receive the data, generate the layer build plan, and then can execute the layer build plan, causing the additive manufacturing apparatus 10 to build up or print the layer. The layer build plan can be executing in accordance with method 400 of FIG. 57 as provided below.

Actions 402 and 404 of the second approach to method 400 of FIG. 57 are implemented in the same manner as provided in FIG. 51 and described above. Thus, for the sake of brevity, the details of 402 and 404 will not be repeated here.

At 416, the method 400 includes rotating the grid so that at least one pixel of the tile is positioned i) substantially within a perimeter of the layer to be printed; and ii) aligned with an unflashed area of the layer to be printed, wherein the unflashed area has an area that is equal to or greater than a predetermined percentage of an area of the at least one pixel. In some implementations, for example, the grid can be rotated by forty-five degrees (45°). However, the grid can be rotated by any suitable degree, such as between one degree (10) and eighty-nine degrees (89°). The grid can be rotated clockwise or counterclockwise. In yet other implementations, the grid can be rotated negative one hundred eighty degrees (−180°) to positive one hundred eighty degrees (+180°).

In some example implementations, the at least one pixel of the tile is positioned substantially within the perimeter of the layer to be printed when the at least one pixel is ninety-five percent (95%) within the perimeter of the layer. In other implementations, the at least one pixel of the tile is positioned substantially within the perimeter of the layer to be printed when the at least one pixel is ninety percent (90%) within the perimeter of the layer. In yet other implementations, the at least one pixel of the tile is positioned substantially within the perimeter of the layer to be printed when the at least one pixel is entirely within the perimeter of the layer.

Figure 58:
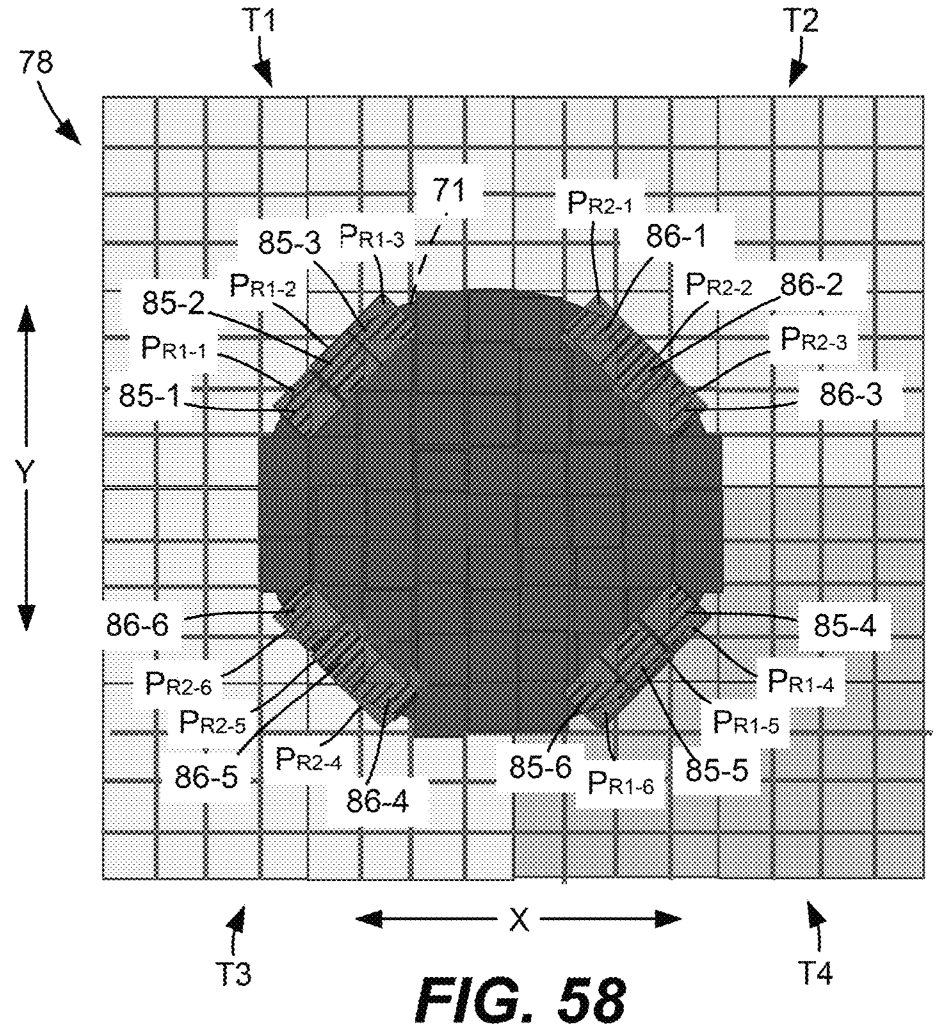
FIGS. 58 through 59 depict one example printing sequence of a layer according to the method of FIG. 57.

By way of example, with reference to FIG. 58, the grid 78 is rotated forty-five degrees (45°) counterclockwise (or forty-five degrees (45°) clockwise) so that pixels $P_{R1-1}$, $P_{R1-2}$, $P_{R1-3}$, $P_{R1-4}$, $P_{R1-5}$, $P_{R1-6}$ are each positioned i) substantially within the perimeter 71 of the layer 68 to be printed; and ii) are each aligned with an unflashed area of the layer 68 to be printed, wherein each unflashed area has an area that is equal to or greater than a predetermined percentage (e.g., fifteen percent (15%)) of an area of a given pixel of the tile. Particularly, pixels $P_{R1-1}$, $P_{R1-2}$, $P_{R1-3}$, $P_{R1-4}$, $P_{R1-5}$, $P_{R1-6}$ are each positioned substantially within the perimeter 71 of the layer 68 and are aligned respectively with unflashed areas 85-1, 85-2, 85-3, 85-4, 85-6 that each have an area that is equal to or greater than a predetermined percentage of an area of a given pixel of the tile.

At 418, the method includes flashing the at least one pixel that is/are positioned i) substantially within a perimeter of the layer to be printed; and ii) aligned with an unflashed area of the layer to be printed, wherein the unflashed area has an area that is equal to or greater than a predetermined percentage of an area of the at least one pixel. As shown in FIG. 58, pixels $P_{R1-1}$, $P_{R1-2}$, $P_{R1-3}$, $P_{R1-4}$, $P_{R1-5}$, $P_{R1-6}$ are flashed. When such pixels are flashed, unflashed areas 85-1, 85-2, 85-3, 85-4, 85-6 are built up or printed.

At 420, the method 400 includes determining whether there are other unflashed areas proximate the perimeter 71 (or a segment of the perimeter 71) that have an area that is equal to or greater than a predetermined percentage of an area of a given pixel of the tile. When there are other unflashed areas meeting this criteria, the method 400 iterates 416, 418, and 420, e.g., until there are no longer any unflashed areas proximate the perimeter 71 (or a segment of the perimeter 71) that have an area that is equal to or greater than a predetermined percentage of an area of a given pixel of the tile. The predetermined percentage of an area of the at least one pixel can be, for example, 5%, 10%, 25%, etc. depending on the desired fidelity of the perimeter 71 of the layer 68.

Figure 59:
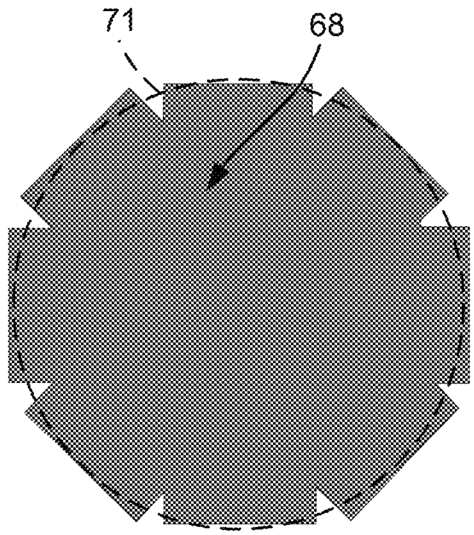

For instance, as depicted in FIG. 58, the method 400 can iterate in such a way that the grid is rotated ninety degrees (90°) counterclockwise (or ninety degrees (90°) clockwise) so that pixels $P_{R2-1}$, $P_{R2-2}$, $P_{R2-3}$, $P_{R2-4}$, $P_{0-5}$, $P_{R2-6}$ are each positioned i) substantially within the perimeter 71 of the layer 68 to be printed; and ii) are each aligned with an unflashed area of the layer 68 to be printed, wherein the unflashed area has an area that is equal to or greater than a predetermined percentage of an area of a given pixel of the tile. Particularly, pixels $P_{R2-1}$, $P_{R2-2}$, $P_{R2-3}$, $P_{R2-4}$, $P_{R2-5}$, $P_{R2-6}$ are each positioned substantially within the perimeter 71 of the layer 68 and are aligned respectively with unflashed areas 86-1, 86-2, 86-3, 86-4, 86-5, 86-6 that each have an area that is equal to or greater than a predetermined percentage of an area of a given pixel of the tile. Once the pixels $P_{R2-1}$, $P_{R2-2}$, $P_{R2-3}$, $P_{R2-4}$, $P_{R2-5}$, $P_{R2-6}$ are positioned in place, at the iteration of 418, pixels $P_{R2-1}$, $P_{R2-2}$, $P_{R2-3}$, $P_{R2-4}$, $P_{R2-5}$, $P_{R2-6}$ are flashed. When such pixels are flashed, unflashed areas 86-1, 86-2, 86-3, 86-4, 86-5, 86-6 are built up or printed. At the iteration of 420, it is again determined whether there are other unflashed areas proximate the perimeter 71 (or a segment of the perimeter 71) that have an area that is equal to or greater than a predetermined percentage of an area of a given pixel of the tile. In this example, there are no further unflashed areas that meet this criteria, and accordingly, the method 400 of FIG. 57 proceeds to 422 to end printing of the layer 68. FIG. 59 depicts the finished layer 68 built up with a high fidelity circular perimeter in accordance with the second approach of method 400. The method 400 of FIG. 57 can then iterate for subsequent layers until the component is completed.

In accordance with example aspects of the present disclosure, the layers of a component can be built up using one, some, or any suitable combination of the printing techniques described herein, e.g., any suitable combination of the techniques provided herein, such as the techniques outlined in FIG. 5, FIG. 18, FIG. 29, FIG. 33A, FIG. 34, FIG. 51, and/or FIG. 57. In some implementations, for example, a pixel shifting technique can be used in conjunction with a tile shifting technique to form a single layer, multiple layers, or generally, a component. For instance, the teachings of FIG. 29 and the accompanying text can be used in conjunction with the teachings of FIG. 34 and FIG. 51 and the accompanying text.

Further, in accordance with other inventive aspects of the present disclosure, the layers of a component can be built up using one, some, or any suitable combination of the printing techniques described herein using multiple projectors, such as projector 60 and the second projector 74 depicted in FIG. 1A. As one example, using the projector 60, a grid can be shifted in place and pixels of the grid can be flashed to form a bulk flashed area. Then, using the second projector 74, one or more pixels can be traced around the flashed bulk area and flashed to form a high resolution perimeter around the flashed bulk area.

Figure 60:
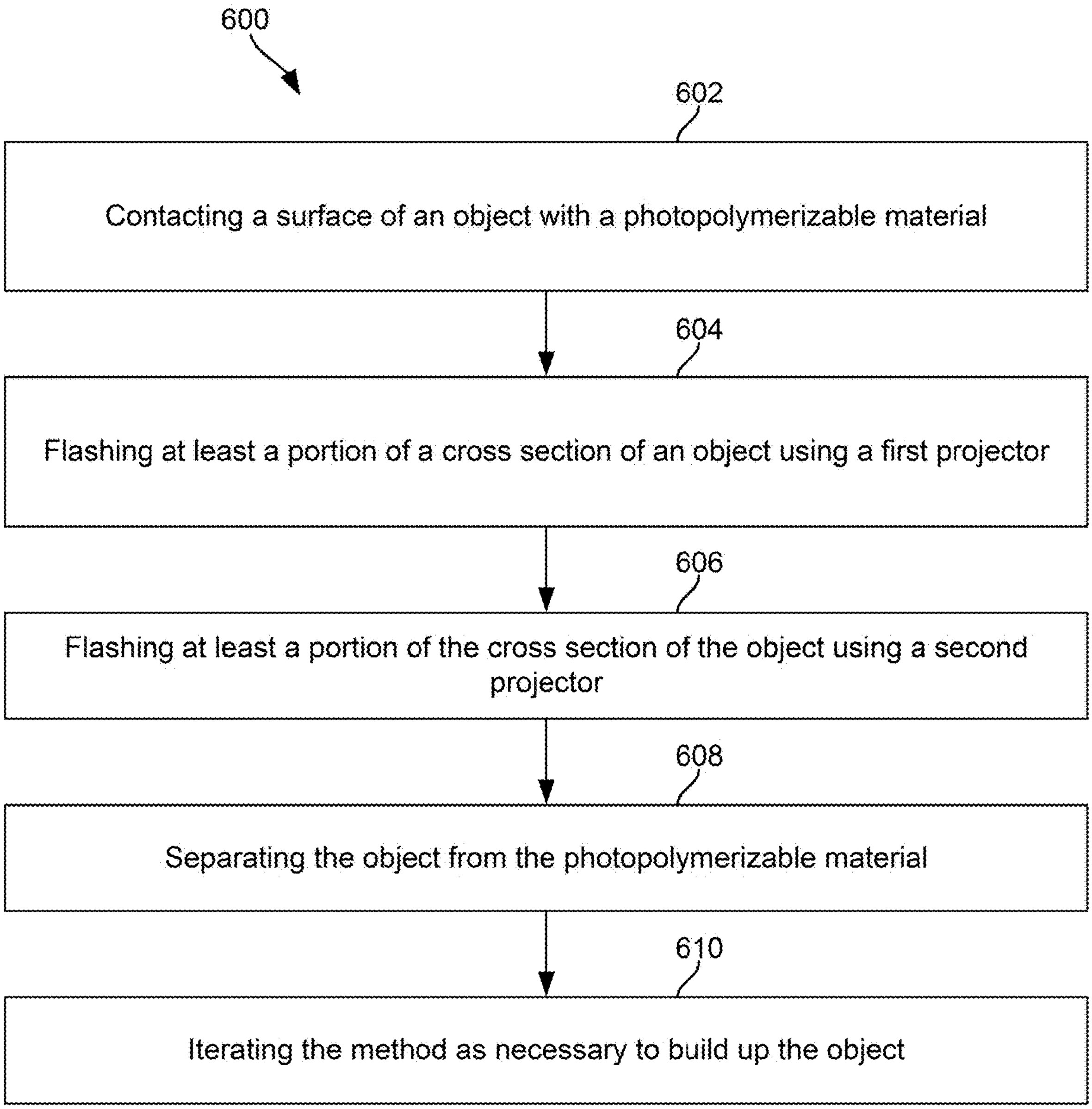
FIG. 60 provides a flow diagram for a method of additively manufacturing an object.

FIG. 60 provides a flow diagram for a method 600 of additively manufacturing an object. At 602, the method 600 can include contacting a surface of an object with a photopolymerizable material. At 604, the method 600 can include irradiating or flashing at least a portion of a cross section of the object using a first projector, such as projector 60. At 606, the method 600 can include irradiating or flashing at least a portion of the cross section of the object using a second projector, such as second projector 74. At 608, the method 600 can include separating the object from the photopolymerizable material. At 610, the method 600 can include iterating the method as necessary to build up the object. In such implementations, the projector 60 can flash at least a portion of the cross section of the object with a first resolution while the second projector 74 can flash at least a portion of the cross section of the object with a second resolution, the first resolution being a more coarse resolution relative to the second resolution.

In some further implementations, the projector 60 can be fixed and the second projector 74 can be movable. In yet other implementations, the grid projected by the second projector 74 is smaller than the grid projected by the projector 60. In some further implementations, the grid projected by the second projector 74 is moved at least once during build up or printing of the object. In yet other implementations, the radiant energy device 20 can include multiple projectors, including at least one coarse projector and at least two fine projectors. In such implementations, one, some, all or none of the fine resolution projectors can be movable. For instance, if there is one or a small number of fine resolution projectors, they can each be movable. In other implementations, particularly where there are enough fine projectors to project their respective grids across the entire print area, they can each be fixed.

In accordance with yet other inventive aspects of the present disclosure, the layers of a component can be built up using one, some, or any suitable combination of the printing techniques described herein using a projector equipped with variable resolution. As one example, using the projector 60, a grid can be shifted in place and pixels of the grid can be flashed with a coarse resolution to form a bulk flashed area. Then, the resolution of the projector 60 can be switched from the coarse resolution to a fine resolution. The coarse resolution is coarse relative to the fine resolution. The one or more pixels can be traced around the flashed bulk area and flashed to form a high resolution perimeter around the flashed bulk area.

Figure 61:
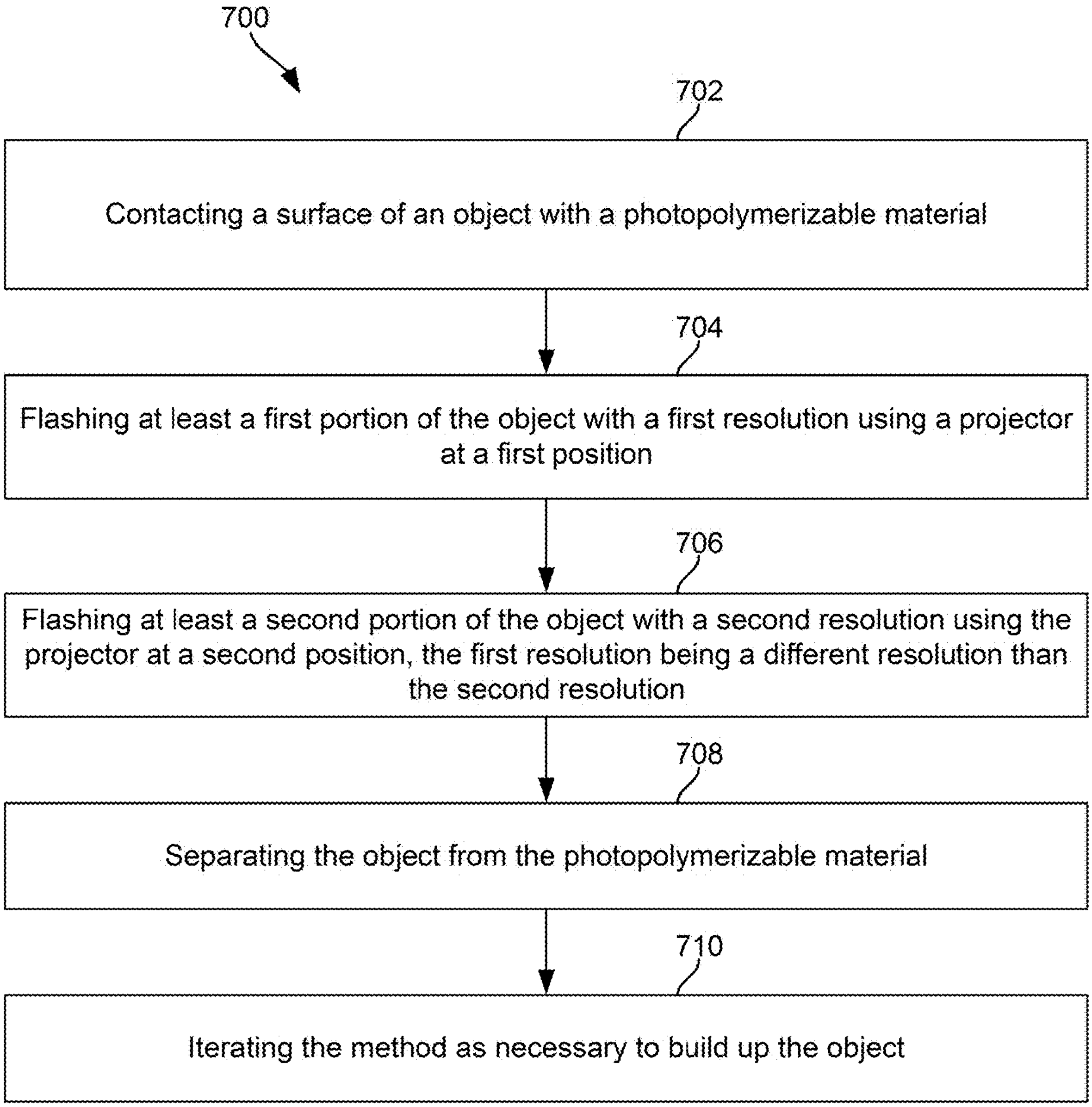
FIG. 61 provides a flow diagram for a method of additively manufacturing an object.

FIG. 61 provides a flow diagram for a method 700 of additively manufacturing an object. At 702, the method 700 can include contacting a surface of an object with a photopolymerizable material. At 704, the method 700 can include irradiating or flashing at least a first portion of the object with a first resolution using a projector at a first position. At 706, the method 700 can include irradiating or flashing at least a second portion of the object with a second resolution using the projector at a second position, the first resolution being a different resolution than the second resolution. As one example, the first resolution can be more coarse than the second resolution. As another example, the first resolution can be finer than the second resolution. At 708, the method 700 can include separating the object from the photopolymerizable material. At 710, the method 600 can include iterating the method as necessary to build up the object. In some implementations, the projector having variable resolution is operable to raster or move about the printable field. In some implementations, the first portion and the second portion of the object are within the same layer. In other implementations, the first portion and the second portion of the object are within different layers of the object. In some implementations, the method includes changing a resolution of the projector, e.g., from the first resolution to the second resolution. In such implementations, changing the resolution of the projector can include changing a size of the pixels of the grid.

Figure 62:
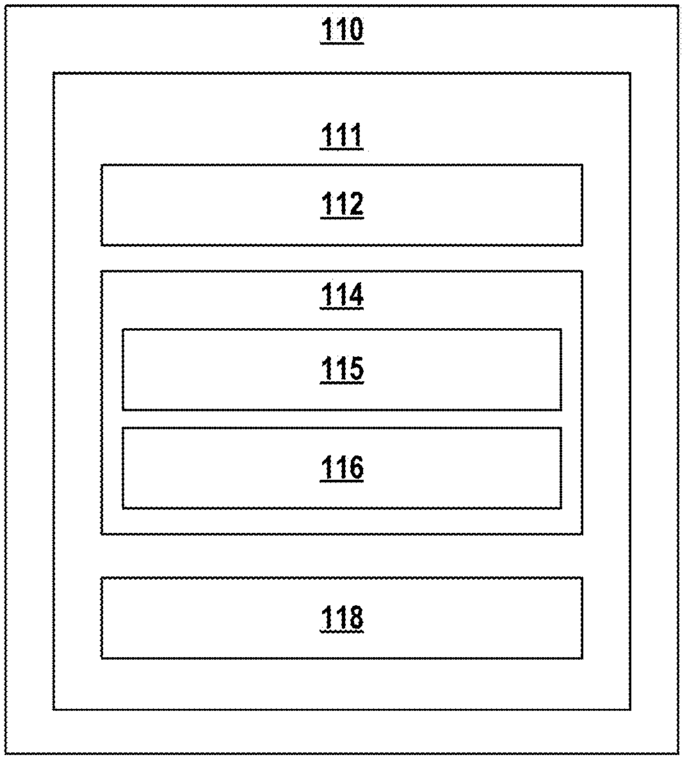
FIG. 62 depicts an exemplary computing system for an additive manufacturing apparatus in accordance with various aspects of the present disclosure.

FIG. 62 depicts certain components of the computing system 110 according to example embodiments of the present disclosure. As noted, the computing system 110 can include one or more processor(s) 112 and one or more memory device(s) 114. The one or more processor(s) 112 and one or more memory device(s) 114 can be implemented in one or more computing device(s) 111. The one or more processor(s) 112 can include any suitable processing device, such as a microprocessor, microcontroller, integrated circuit, an application specific integrated circuit (ASIC, a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 114 can include one or more non-transitory computer-readable storage medium(s), such as RAM, ROM, EEPROM, EPROM, flash memory devices, magnetic disks, etc., and/or combinations thereof.

The memory device(s) 114 can include one or more computer-readable media and can store information accessible by the one or more processor(s) 112, including instructions 115 that can be executed by the one or more processor (s) 112. The instructions 115 may include one or more steps or actions of the method 200, 200A, 200B described above. For instance, the memory device(s) 114 can store instructions 115 for running one or more software applications, displaying a user interface, receiving user input, processing user input, etc. In some implementations, the instructions 115 can be executed by the one or more processor(s) 112 to cause the one or more processor(s) 112 to perform operations, e.g., such as one or more portions of methods described herein. The instructions 115 can be software written in any suitable programming language or can be implemented in hardware. Additionally, and/or alternatively, the instructions 115 can be executed in logically and/or virtually separate threads on processor(s) 112.

The one or more memory device(s) 114 can also store data 116 that can be retrieved, manipulated, created, or stored by the one or more processor(s) 112. The data 116 can include, for instance, data 150 to facilitate performance of the method 200 described herein. The data 116 can be stored in one or more database(s). The one or more database(s) can be connected to computing system 110 by a high bandwidth LAN or WAN, or can also be connected to the computing system 110 through network(s) (not shown). The one or more database(s) can be split up so that they are located in multiple locales. In some implementations, the data 116 can be received from another device.

The computing device(s) 111 can also include a communication module or interface 118 used to communicate with one or more other component(s) of computing system 110 or the additive manufacturing apparatus 10 over the network (s). The communication interface 118 can include any suitable components for interfacing with one or more network (s), including for example, transmitters, receivers, ports, controllers, antennas, or other suitable components.

As provided herein, the computing system 110 may be operably coupled with one or more of the one or more controllable devices 120, actuator assembly 52, the drive system 28, the image forming apparatus 64, and/or the radiant energy device 20, among others. The drive system 28 may control the foil movement while the actuator assembly 52 controls the movement of the stage 18. As such, the computing system 110 may be configured to control actuation of each of the drive assembly and the actuator assembly 52. Likewise, the computing system 110 may be operably coupled with the image forming apparatus 64 to place the radiant energy device 20 in one or more positions. Various sensors 130 may be provided for detecting information related to movement of the stage 18, the resin support 26 and/or the radiant energy device 20. The information may be provided to the computing system 110, which, in turn, can alter a movement characteristic of the stage 18, the resin support 26 and/or the radiant energy device 20 in order to maintain the locus of the components relative to one another.

It should be appreciated that the additive manufacturing apparatus is described herein only for the purpose of explaining aspects of the present subject matter. In other example embodiments, the additive manufacturing apparatus may have any other suitable configuration and may use any other suitable additive manufacturing technology. Further, the additive manufacturing apparatus and processes or methods described herein may be used for forming components using any suitable material. For example, the material may be plastic, metal, concrete, ceramic, polymer, epoxy, photopolymer resin, or any other suitable material that may be embodied in a layer of slurry, resin, or any other suitable form of sheet material having any suitable consistency, viscosity, or material properties. For example, according to various embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, ceramic oxides, and nickel or cobalt based superalloys (e.g., those available under the name Inconel® available from Special Metals Corporation). These materials are examples of materials suitable for use in the additive manufacturing processes described herein, and may be generally referred to as "additive materials."

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Aspects of the invention(s) are provided by the subject matter of the following clauses, which are intended to cover all suitable combinations unless dictated otherwise based on logic or the context of the clauses and/or associated figures and description:

A method, comprising: determining a number of tiles of a grid projected by an additive manufacturing apparatus needed to cover an area of a layer to be printed, wherein the number of tiles needed to cover the area of the layer to be printed is at least two tiles; executing using a first tile of the grid: a) moving a grid projected by an additive manufacturing apparatus so that a border of the first tile aligns with a boundary of the layer to be printed; b) flashing, with the grid positioned so that the border of the first tile aligns with the boundary of the layer to be printed, pixels of the first tile that are positioned substantially within a perimeter of the layer to be printed; c) determining whether further tile movement and flashing is needed using the first tile based at least in part on whether any unflashed areas are within an area of the first tile are present, each of the unflashed areas having an area that is equal to or greater than a predetermined percentage of an area of a given pixel of the first tile; d) iterating, until there are no further unflashed areas present within the area of the first tile: moving the grid so that a subsequent border of the first tile aligns with a subsequent boundary of the layer to be printed; flashing, with the grid positioned so that the subsequent border of the first tile aligns with the subsequent boundary of the layer to be printed, the pixels of the first tile that are positioned substantially within the perimeter of the layer to be printed; and executing, using a subsequent tile of the plurality of tiles for each tile needed to cover the area of the layer to be printed: a) the moving, b) the flashing, c) the determining, and d) the iterating.

The method of any clause provided herein, wherein when moving the grid so that the border of the first tile of the grid aligns with the boundary of the layer to be printed, at least one side border of the first tile is aligned with a side boundary of the layer.

The method of any clause provided herein, wherein a given pixel of the pixels of the first tile is positioned substantially within the perimeter of the layer to be printed when at least a predetermined area percentage of the given pixel is within the perimeter of the layer to be printed.

The method of any clause provided herein, wherein the predetermined area percentage is seventy-five percent (75%).

The method of any clause provided herein, wherein the predetermined area percentage is eighty-five percent (85%).

The method of any clause provided herein, wherein the predetermined area percentage is ninety-five percent (95%).

The method of any clause provided herein, wherein the predetermined area percentage is one hundred percent (100%).

The method of any clause provided herein, wherein the unflashed areas considered at d) each have an area that is equal to or greater than a predetermined percentage of an area of a given pixel of the tile are flashed.

The method of any clause provided herein, wherein the predetermined percentage is ten percent (10%).

The method of any clause provided herein, wherein the predetermined percentage is twenty percent (20%).

The method of any clause provided herein, wherein the predetermined percentage is thirty percent (30%).

The method of any clause provided herein, wherein the predetermined percentage is less than about twenty-five percent (25%).

The method of any clause provided herein, further comprising: determining whether the layer to be printed is complete, and wherein when the layer to be printed is determined to be complete, the method iterates the method of any clause provided herein for subsequent layers to build up a component.

The method of any clause provided herein, wherein each tile of the grid has a same number of rows of pixels as columns.

The method of any clause provided herein, wherein the grid has four tiles.

An additive manufacturing apparatus, comprising: a radiant energy device; a computing system having one or more processors, the one or more processors being configured to: determine a number of tiles of a grid projected by an additive manufacturing apparatus needed to cover an area of a layer to be printed, wherein the number of tiles needed to cover the area of the layer to be printed is at least two tiles; executing using a first tile of the grid: a) cause the grid to move so that a border of the first tile aligns with a boundary of the layer to be printed; b) cause the radiant energy device to flash, with the grid positioned so that the border of the first tile aligns with the boundary of the layer to be printed, pixels of the tile that are positioned substantially within a perimeter of the layer to be printed; c) determine whether further tile movement and flashing is needed using the first tile based at least in part on whether any unflashed areas are present within an area of the first tile, each of the unflashed areas having an area that is equal to or greater than a predetermined percentage of an area of a given pixel of the first tile; d) iterate, until there are no further unflashed areas present within the area of the first tile: causing the grid to move so that a subsequent border of the first tile aligns with a subsequent boundary of the layer to be printed; flashing, with the grid positioned so that the subsequent border of the first tile aligns with the subsequent boundary of the layer to be printed, the pixels of the first tile that are positioned substantially within the perimeter of the layer to be printed; and execute, using a subsequent tile of the plurality of tiles for each tile needed to cover the area of the layer to be printed: a) causing the grid to move, b) causing the pixels to be flashed, c) the determining, and d) the iterating.

A non-transitory computer readable medium comprising computer-executable instructions, which, when executed by one or more processors of a computing system associated with an additive manufacturing apparatus, cause the one or more processors to: determine a number of tiles of a grid projected by the additive manufacturing apparatus needed to cover an area of a layer to be printed, wherein the number of tiles needed to cover the area of the layer to be printed is at least two tiles; executing using a first tile of the grid: a) cause the grid to move so that a border of the first tile aligns with a boundary of the layer to be printed; b) cause the radiant energy device to flash, with the grid positioned so that the border of the first tile aligns with the boundary of the layer to be printed, pixels of the tile that are positioned substantially within a perimeter of the layer to be printed; c) determine whether further tile movement and flashing is needed using the first tile based at least in part on whether any unflashed areas are present within an area of the first tile, each of the unflashed areas having an area that is equal to or greater than a predetermined percentage of an area of a given pixel of the first tile; d) iterate, until there are no further unflashed areas present within the area of the first tile: causing the grid to move so that a subsequent border of the first tile aligns with a subsequent boundary of the layer to be printed; flashing, with the grid positioned so that the subsequent border of the first tile aligns with the subsequent boundary of the layer to be printed, the pixels of the first tile that are positioned substantially within the perimeter of the layer to be printed; and execute, using a subsequent tile of the plurality of tiles for each tile needed to cover the area of the layer to be printed: a) causing the grid to move, b) causing the pixels to be flashed, c) the determining, and d) the iterating.

The non-transitory computer readable medium of any preceding claim, wherein when causing the grid to move so that the border of the first tile of the grid aligns with the boundary of the layer to be printed, at least one side border of the first tile is aligned with a side boundary of the layer.

The non-transitory computer readable medium of any preceding claim, wherein a given pixel of the pixels of the first tile is positioned substantially within the perimeter of the layer to be printed when at least a predetermined area percentage of the given pixel is within the perimeter of the layer to be printed.

The non-transitory computer readable medium of any preceding claim, wherein the predetermined area percentage is seventy-five percent (75%).

What is claimed is:

1. A method, comprising:

determining a number of tiles of a grid projected by an additive manufacturing apparatus needed to cover an area of a layer to be printed, wherein the number of tiles needed to cover the area of the layer to be printed is at least two tiles;

executing using a first tile of the grid:

a) moving a grid projected by an additive manufacturing apparatus so that a border of the first tile aligns with a boundary of the layer to be printed;

b) flashing firstly at a first resolution with radiant energy from a radiant energy device, with the grid positioned so that the border of the first tile aligns with the boundary of the layer to be printed, pixels of the first tile that are positioned within a perimeter of the layer to be printed;

c) determining whether further tile movement and flashing is needed using the first tile based at least in part on whether any unflashed areas are within an area of the first tile are present, each of the unflashed areas having an area that is equal to or greater than a predetermined percentage of an area of a given pixel of the first tile;

d) iterating, until there are no further unflashed areas present within the area of the first tile:

moving the grid so that a subsequent border of the first tile aligns with a subsequent boundary of the layer to be printed;

flashing secondly at the first resolution with radiant energy from the radiant energy device, with the grid positioned so that the subsequent border of the first tile aligns with the subsequent boundary of the layer to be printed, the pixels of the first tile that are positioned within the perimeter of the layer to be printed;

repeating, using a subsequent tile of the number of tiles for each tile needed to cover the area of the layer to be printed to form a newly flashed area: a) the moving, b) the flashing, c) the determining, and d) the iterating;

moving at least one pixel of a plurality of pixels of any tile of the grid around the newly flashed area; and flashing thirdly at a second resolution different from the first resolution the at least one pixel of the plurality of pixels with radiant energy from the radiant energy device as the at least one pixel is moved around the newly flashed area to form at least part of the layer.

2. The method of claim 1, wherein when moving the grid so that the border of the first tile of the grid aligns with the boundary of the layer to be printed, at least one side border of the first tile is aligned with a side boundary of the layer.

3. The method of claim 1, wherein a given pixel of the pixels of the first tile is positioned within the perimeter of the layer to be printed when at least a predetermined area percentage of the given pixel is within the perimeter of the layer to be printed.

4. The method of claim 3, wherein the predetermined area percentage is eighty-five percent (85%).

5. The method of claim 3, wherein the predetermined area percentage is one hundred percent (100%).

6. The method of claim 1, wherein the unflashed areas considered at d) each have an area that is equal to or greater than a predetermined percentage of an area of a given pixel of the tile are flashed.

7. The method of claim 6, wherein the predetermined percentage is ten percent (10%).

8. The method of claim 6, wherein the predetermined percentage is less than about twenty-five percent (25%).

9. The method of claim 1, further comprising:

determining whether the layer to be printed is complete, wherein when the layer to be printed is determined to be complete, the method iterates the method of claim 1 for subsequent layers to build up a component.

10. The method of claim 1, wherein each tile of the grid has a same number of rows of pixels as columns.

11. The method of claim 1, wherein the grid has four tiles.

12. The method of claim 1, wherein moving the at least one pixel of the plurality of pixels around the newly flashed area comprises moving the at least one pixel in a tracing motion around the perimeter of the layer.

13. The method of claim 1, wherein moving the at least one pixel of the plurality of pixels around the newly flashed area comprises moving the at least one pixel in a spiral motion around a predefined point.

14. The method of claim 1, wherein moving the at least one pixel of the plurality of pixels around the newly flashed area comprises moving the at least one pixel in a circular motion around a predefined point.

15. The method of claim 1, wherein moving the at least one pixel of the plurality of pixels around the newly flashed area comprises moving the at least one pixel in a zig-zag motion along a perimeter of the layer.

16. The method of claim 15, wherein the zig-zag motion includes moving the at least one pixel back and forth along the perimeter so that at least a portion of the at least one pixel is always aligned with the perimeter.

17. The method of claim 1, wherein moving the at least one pixel of the plurality of pixels around the newly flashed area comprises moving the at least one pixel in at least two of: a tracing motion around the perimeter of the layer, a spiral motion around a predefined point, a circular motion around a predefined point, and a zig-zag motion along the perimeter of the layer.

18. An additive manufacturing apparatus, comprising:

a radiant energy device;

a computing system having one or more processors, the one or more processors being configured to:

determine a number of tiles of a grid projected by an additive manufacturing apparatus needed to cover an area of a layer to be printed, wherein the number of tiles needed to cover the area of the layer to be printed is at least two tiles;

execute using a first tile of the grid to:

a) cause the grid to move so that a border of the first tile aligns with a boundary of the layer to be printed;

b) cause the radiant energy device to flash firstly at a first resolution, with the grid positioned so that the border of the first tile aligns with the boundary of the layer to be printed, pixels of the tile that are positioned within a perimeter of the layer to be printed;

c) determine whether further tile movement and flashing is needed using the first tile based at least in part on whether any unflashed areas are present within an area of the first tile, each of the unflashed areas having an area that is equal to or greater than a predetermined percentage of an area of a given pixel of the first tile;

d) iterate, until there are no further unflashed areas present within the area of the first tile:

causing the grid to move so that a subsequent border of the first tile aligns with a subsequent boundary of the layer to be printed;

flashing secondly at the first resolution, with the grid positioned so that the subsequent border of the first tile aligns with the subsequent boundary of the layer to be printed, the pixels of the first tile that are positioned within the perimeter of the layer to be printed;

repeat, using a subsequent tile of the number of tiles for each tile needed to cover the area of the layer to be printed to form a newly flashed area: a) causing the grid to move, b) causing the pixels to be flashed, c) the determining, and d) the iterating;

move at least one pixel of a plurality of pixels of any tile of the grid around the newly flashed area; and flash thirdly at a second resolution different from the first resolution the at least one pixel of the plurality of pixels with radiant energy from the radiant energy device as the at least one pixel moves around the newly flashed area to form at least part of the layer.

19. A non-transitory computer readable medium comprising computer-executable instructions, which, when executed by one or more processors of a computing system associated with an additive manufacturing apparatus, cause the one or more processors to:

determine a number of tiles of a grid projected by the additive manufacturing apparatus needed to cover an area of a layer to be printed, wherein the number of tiles needed to cover the area of the layer to be printed is at least two tiles;

executing using a first tile of the grid:

a) cause the grid to move so that a border of the first tile aligns with a boundary of the layer to be printed;

b) cause a radiant energy device to flash firstly at a first resolution, with the grid positioned so that the border of the first tile aligns with the boundary of the layer to be printed, pixels of the tile that are positioned within a perimeter of the layer to be printed;

c) determine whether further tile movement and flashing is needed using the first tile based at least in part on whether any unflashed areas are present within an area of the first tile, each of the unflashed areas having an area that is equal to or greater than a predetermined percentage of an area of a given pixel of the first tile;

d) iterate, until there are no further unflashed areas present within the area of the first tile:

causing the grid to move so that a subsequent border of the first tile aligns with a subsequent boundary of the layer to be printed;

flashing secondly at the first resolution, with the grid positioned so that the subsequent border of the first tile aligns with the subsequent boundary of the layer to be printed, the pixels of the first tile that are positioned within the perimeter of the layer to be printed;

repeat, using a subsequent tile of the number of tiles for each tile needed to cover the area of the layer to be printed to form a newly flashed area: a) causing the grid to move, b) causing the pixels to be flashed, c) the determining, and d) the iterating;

move at least one pixel of a plurality of pixels of any tile of the grid around the newly flashed area; and flash thirdly at a second resolution different from the first resolution the at least one pixel of the plurality of pixels with radiant energy from the radiant energy device as the at least one pixel moves around the newly flashed area to form at least part of the layer.

20. The non-transitory computer readable medium of claim 19, wherein a given pixel of the pixels of the first tile is positioned within the perimeter of the layer to be printed when at least a predetermined area percentage of the given pixel is within the perimeter of the layer to be printed.

* * * * *